(12) United States Patent
Tahara et al.

(10) Patent No.: US 6,524,534 B1
(45) Date of Patent: Feb. 25, 2003

(54) APPARATUS FOR REMOVING FLAMMABLE GAS

(75) Inventors: Mika Tahara, Kanagawa-ken (JP); Yasuo Osawa, Kanagawa-ken (JP); Yuji Yamamoto, Tokyo (JP); Kenji Arai, Kanagawa-ken (JP); Makoto Harada, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/358,433

(22) Filed: Jul. 22, 1999

(30) Foreign Application Priority Data

Jul. 23, 1998 (JP) .......................... 10-207452
Jun. 9, 1999 (JP) .......................... 11-161985

(51) Int. Cl.$^7$ ........................ G05B 9/00; B01D 53/34; G21C 9/00
(52) U.S. Cl. ........................ 422/105; 422/171; 422/177; 376/277; 376/301
(58) Field of Search ................ 376/300, 301, 376/277; 423/580.1, 580.2; 422/171, 177, 179, 190, 193, 211, 221, 222, 105

(56) References Cited

U.S. PATENT DOCUMENTS

| | | | | |
|---|---|---|---|---|
| 2,718,460 A | * | 9/1955 | Bowen, III | 422/179 |
| 2,847,284 A | * | 8/1958 | Busey | 422/205 |
| 3,660,041 A | * | 5/1972 | Moore et al. | 376/301 |
| 4,008,050 A | * | 2/1977 | Betz | 422/192 |
| 4,228,132 A | * | 10/1980 | Weems et al. | 422/174 |
| 4,252,690 A | * | 2/1981 | Kamiya et al. | 502/315 |
| 4,755,359 A | * | 7/1988 | Klatt et al. | 422/113 |
| 4,911,879 A | * | 3/1990 | Heck et al. | 376/301 |
| 4,992,407 A | * | 2/1991 | Chakraborty et al. | 502/327 |
| 5,167,908 A | | 12/1992 | Chakraborty | 376/301 |
| 5,301,217 A | | 4/1994 | Heck et al. | 376/301 |
| 5,467,375 A | | 11/1995 | Sasaki | 376/300 |
| 5,473,646 A | | 12/1995 | Heck et al. | 376/301 |
| 5,492,686 A | * | 2/1996 | Hill | 423/580.1 |

FOREIGN PATENT DOCUMENTS

| | | |
|---|---|---|
| CH | 494 449 | 9/1970 |
| DE | 3725290 | * 2/1989 |
| DE | 40 15 288 A1 | 11/1991 |
| DE | 42 02 089 A1 | 7/1993 |
| EP | 0 303 144 | 2/1989 |
| EP | 0 467 110 A1 | 1/1992 |
| EP | 0 499 677 A1 | 8/1992 |
| JP | 59-051480 | 3/1984 |
| JP | 61-293532 | 12/1986 |

* cited by examiner

Primary Examiner—Marian C. Knode
Assistant Examiner—Alexa A. Doroshenk
(74) Attorney, Agent, or Firm—Finnegan, Henderson, Farabow, Garrett & Dunner, L.L.P.

(57) ABSTRACT

An apparatus for removing flammable gas is started only when a concentration change in the flammable gas in a primary containment vessel is detected, so that the decrease in activity of a catalyst due to a catalyst poison is prevented. This apparatus has a catalytic recombining apparatus equipped with a catalyst 1 for reacting the flammable gas, a case 2 that houses the catalyst, and lids 4a and 4b installed at openings 3a and 3b of the case 2. Adhesive parts 5a and 5b which adhere the lids 4a and 4b and the case 2 is melted at high temperatures, and heating elements 6a and 6b composed of an oxidizing catalyst of hydrogen is installed in contact with the adhesive parts 5a and 5b. Thus, the lids are not only closed under normal conditions but opened when the adhesive parts 5a and 5b being melted along with the temperature increase in the surrounding atmosphere.

24 Claims, 27 Drawing Sheets

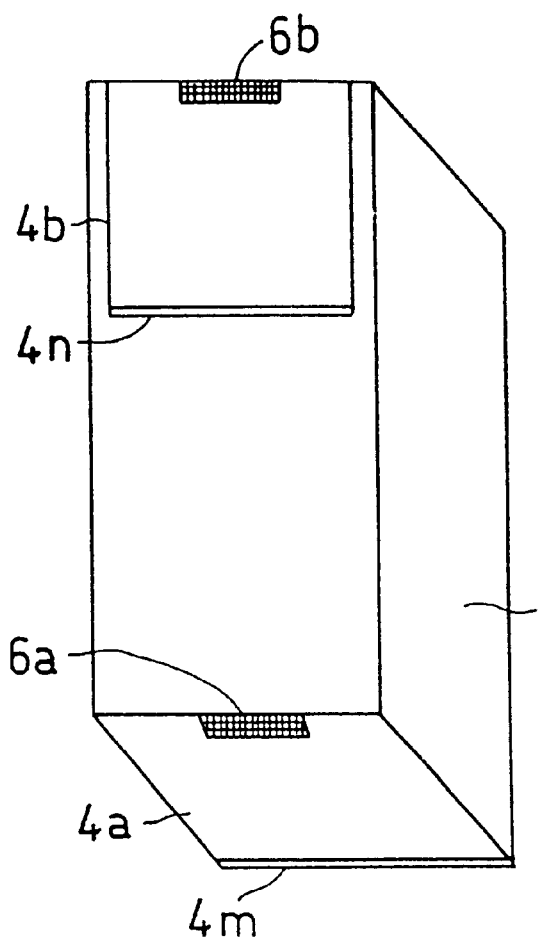
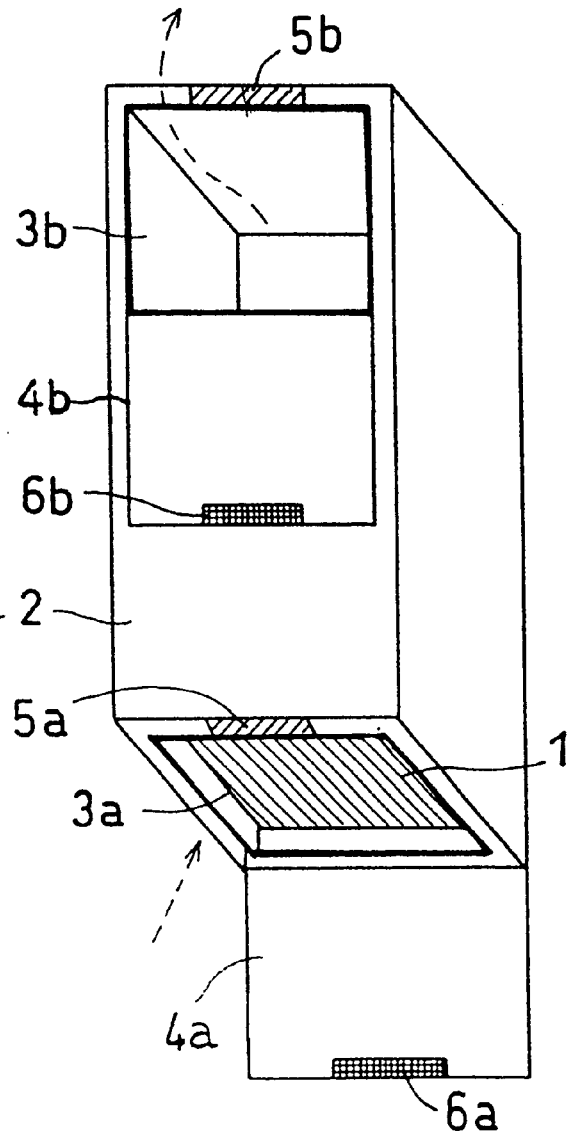
FIG 1a
FIG 1b

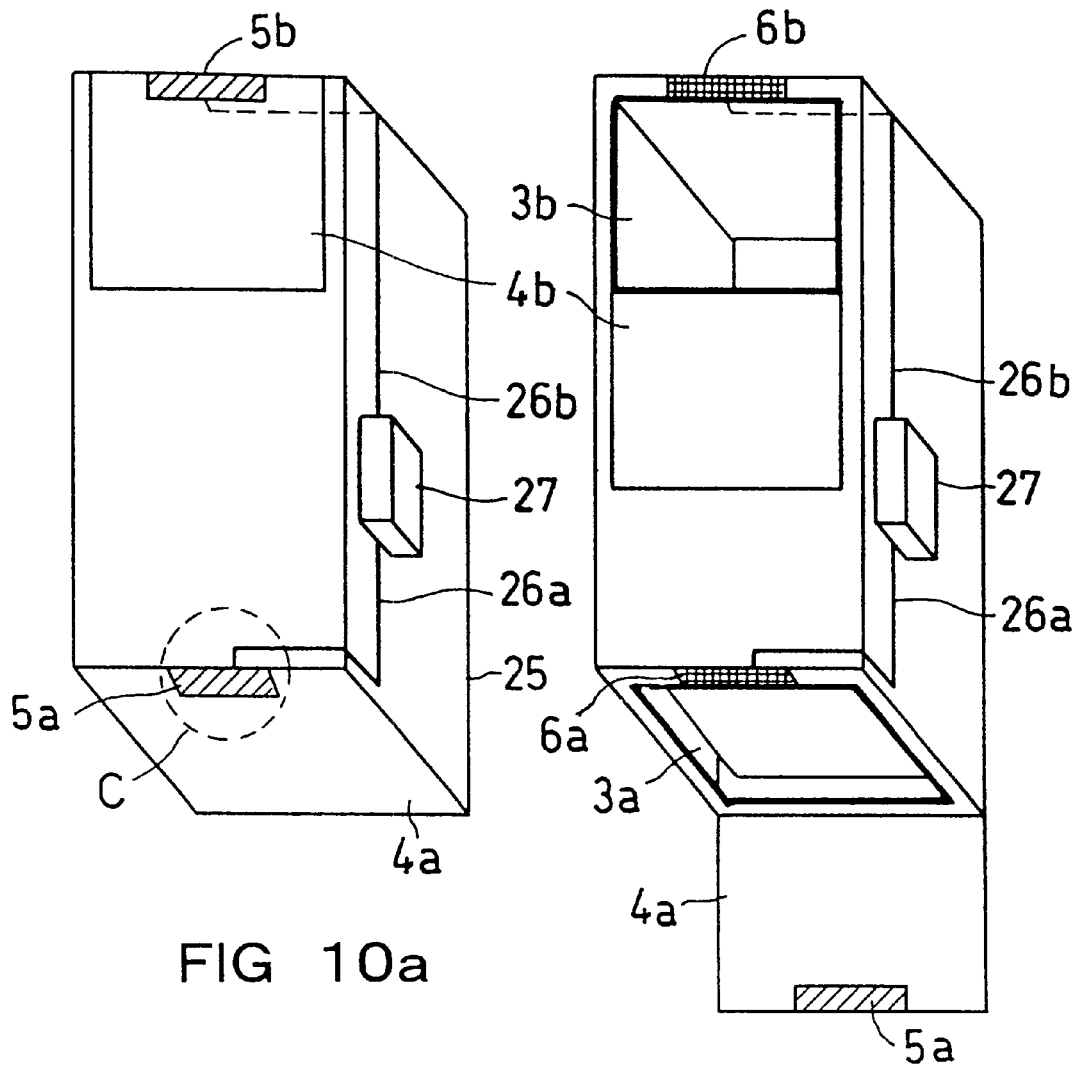
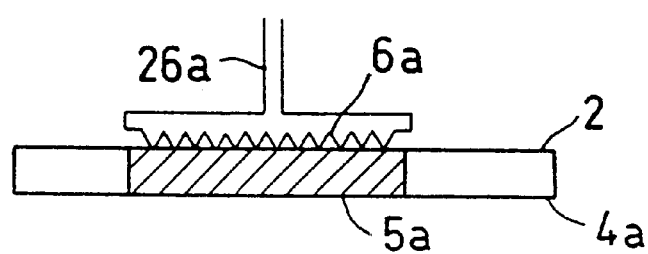
FIG 10a
FIG 10b
FIG 10c

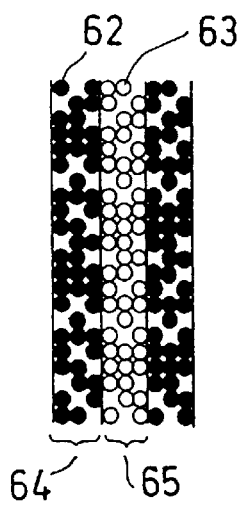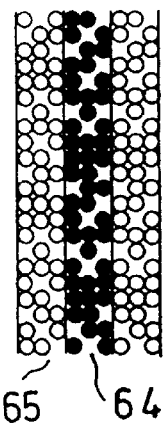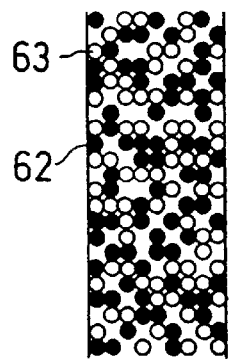
FIG 23a  FIG 23b  FIG 23c
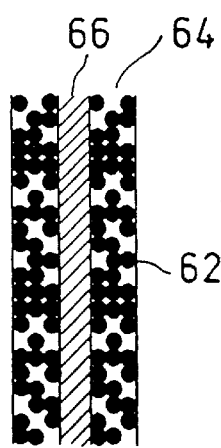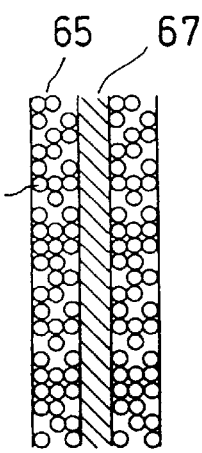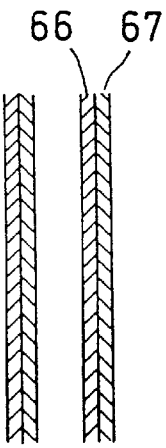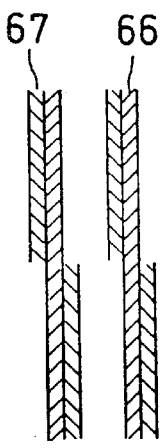
FIG 23d  FIG 23e  FIG 23f  FIG 23g

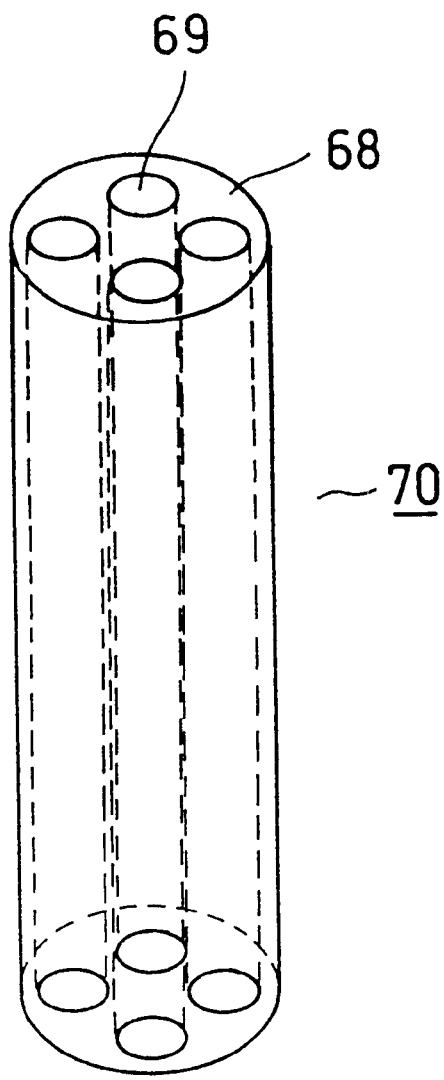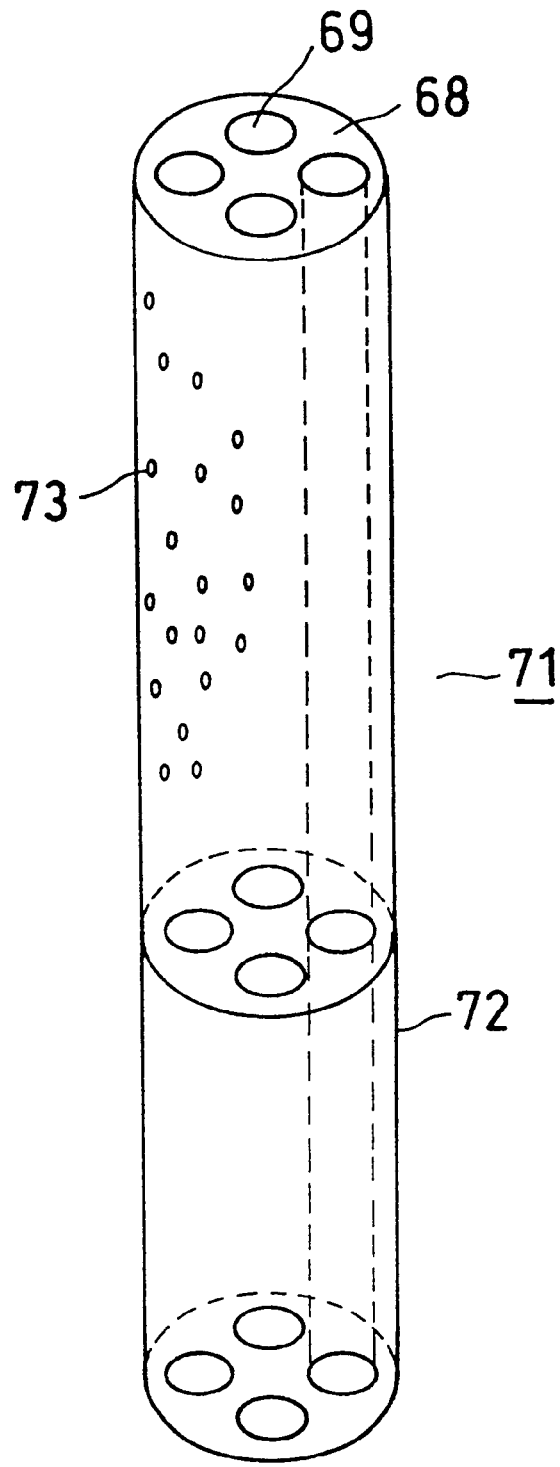
FIG 24a
FIG 24b

○ 0.06g/Nm³ I₂, IODINE GETTER MADE OF IRON, AND Na₂O PARTICLES

● 0.12g/Nm³ I₂, IODINE GETTER MADE OF IRON, AND Na₂O PARTICLES

△ 0.06g/Nm³ I₂, IODINE GETTER MADE OF IRON

▲ 0.12g/Nm³ I₂, IODINE GETTER MADE OF IRON

✕ 0.06g/Nm³ I₂

✱ 0.12g/Nm³ I₂

APPARATUS FOR REMOVING FLAMMABLE GAS

BACKGROUND OF THE INVENTION

The present invention pertains to an apparatus for removing flammable gas, which is generated by some reaction, especially hydrogen or oxygen.

An apparatus for removing flammable gas is used, as one of the useful examples, in a primary containment vessel (PCV) in an atomic power plant, and removes the flammable gas generated in PCV at the time of an accident. A general type of PCV and an apparatus for removing flammable gas contained in it are explained in reference to figures using the case of a boiling water reactor (BWR) as an example.

FIG. 31 is an outlined systemcross section showing a conventional primary containment vessel. A primary containment vessel (PCV) 102 houses a reactor pressure vessel (RPV) 101, in which a reactor core 107 is built, and comprises of an upper dry well 103 and a lower dry well 104 for enclosing the RPV 101 and a wet well 105 equipped with a suppression pool 105a connected via a vent pipe 106 to the upper dry well 103. And the RPV 101 is enclosed by a biological shield wall 108.

If a primary cooling system pipe of the atomic reactor, such as main vapor pipe 109 connected to the RPV 101, is broken, a high-temperature and high-pressure primary coolant of the atomic reactor is discharged into the upper dry well 103 in PCV 102, rapidly raising the pressure and temperature in the upper dry well 103. The high-temperature and high-pressure coolant discharged into the upper dry well 103 is mixed with a gas in the upper dry well 103, discharged into the water of the suppression pool 105a through the vent pipe 106, and cooled. Most of the thermal energy discharged from the RPV 101 is absorbed in the suppression pool 105a.

The water of the suppression pool 105a is poured into the RPV 101 by an emergency core cooling system, but the coolant absorbs decay heat from the reactor core in the long term and is discharged to the dry well from an opening in the broken pipe. So, at that time, the pressure and temperature in the upper dry well 103 are always higher than those of the wet well 105. Under such a long-term phenomenon, water, which is a coolant, is decomposed by radiation in a light water reactor of the atomic power plant, generating hydrogen gas and oxygen gas.

Furthermore, when the temperature of a fuel cladding is raised, a reaction is caused between the vapor and zirconium of the fuel cladding material (called a Metal-Water reaction), so that hydrogen gas is generated in a short time. The hydrogen gas generated in this manner is discharged into PCV 102 from the opening in the broken pipe, and the concentration of the hydrogen gas in PCV 102 is gradually raised. Also, since the hydrogen gas is noncondensable, the pressure in PCV 102 is also raised.

When a certain effective countermeasure to such a state cannot be taken and the concentration of the hydrogen gas and that of the oxygen gas are raised to 4 vol % and 5 vol %, respectively, that is, when the concentration of the flammable gas exceeds a certain flammability limit, the gases reach the flammable state. If the concentration of the hydrogen gas is further raised, there is a possibility that an explosive reaction will occur.

As an effective countermeasure to such a situation, in a conventional nuclear power plant of BWR, the inside of PCV is strictly prevented from becoming a flammable atmosphere due to a large amount of hydrogen gas generated in a short time by the Metal-Water reaction, by means of substituting the inside of PCV by nitrogen gas, so that the concentration of the oxygen gas is kept at a low level and therefore a special safety level is achieved.

Also, the gas in PCV is absorbed to the outside of PCV by a flammable gas concentration controller installed outside PCV to remove the hydrogen gas; it has a recombining apparatus and a blower, with the hydrogen gas and oxygen gas being recycled to water by recombination occurring by raising the temperature. The residual gas is cooled and recycled to PCV, so that an increase in the concentration of the flammable gas is suppressed.

Also, as a method that statically controls the flammable gas concentration without the above-mentioned external power source, a method that arranges several catalytic recombining apparatuses for promoting a recombination reaction using an oxidizing catalyst of hydrogen set in PCV has been developed. The constitution of such an apparatus for removing a flammable gas is described in U.S. Pat. Nos. 5,301,217, 5,473,646, 5,167,908, for instance.

FIG. 32 is an oblique view showing an outline of the conventional catalytic recombining apparatus 110 installed in PCV 102. A case 112 for housing an oxidizing catalyst of hydrogen 111 is equipped with two openings 113a and 113b that are always opened. Also, the gas in PCV is introduced into a catalyst layer from the opening 113b installed at the lower side of the case 112. If the concentration of the flammable gas in PCV is raised, the recombination reaction of hydrogen and oxygen is caused in the case 112 by the catalyst 111. The gas is warmed by the heat of the reaction and discharged from the opening 113a at the upper side of the case 112. A naturally circulating flow passing through the catalytic, recombining apparatus is then formed by the heat by the reaction due to the catalyst 111.

Compared with the conventional flammable gas concentration control system that absorbs the gas in PCV to the outside of PCV and recycles the hydrogen gas and the oxygen gas to water due to its recombination by raising the temperature, the above-mentioned catalytic recombining apparatus is economically excellent, and easily repaired without special operations at the time of an accident. However, the catalyst housed in the catalytic recombining apparatus may be poisoned by a substance represented by an iodine compound present in PCV at the time of an accident, so that there is a possibility that the performance of removing flammable gas is lowered.

In order to prevent the decrease in the catalyst function due to the catalyst poison, a method that separates the catalyst from the gas atmosphere in usual condition, releases the separation of the catalyst using the increase of the temperature in PCV as a trigger, and removes the catalyst poison by interposing a filter before passing a gas through the catalyst, is proposed. However, although the filter proposed by this method is suitable for the removal of grease particles or aerosol particles, it is not suitable for the removal of gaseous iodine, which has a large catalyst poison effect.

Also, when the temperature in PCV is used as a trigger for the release of the catalyst separation, there is a great possibility that the separation will be released although the oxygen concentration in PCV is still low at the initial stage of an accident, so it is not optimum as a timing of the separation release.

When the flammable gas concentration control system or the apparatus for removing flammable gas is not operated, several tens of hours pass until the atmosphere in PCV reaches a flammability limit at the time of an accident. In other words, even if the apparatus for removing a flammable gas is not operated for several tens of hours, it does not reach the flammability limit. So, separating the catalyst from the gas atmosphere during such a period is an effective way to prevent the decrease of the function of the catalyst.

However, in the above-mentioned catalytic recombining apparatus in which the openings are always opened, or in the above-mentioned catalytic recombining apparatus in which the temperature in PCV is used as a trigger to release the catalyst separation, the time exposed to a high-concentration catalyst poison present in the initial stage of the accident occurrence is so long that the function of the catalyst decreases. As a result, it can also be considered that the catalyst does not function sufficiently for the case wherein the promotion of the recombination reaction is much expected.

SUMMARY OF THE INVENTION

The present invention considered the above-mentioned problems, and its objective is to separate the catalyst from the atmosphere in the housing vessel when the action of the catalyst is not required, to prevent the decrease of the function of the catalyst due to the catalyst poison, to appropriately release the separation of the catalyst in accordance with the concentration of the flammable gas, and to maintain the concentration of the flammable gas at the flammability limit or less over a long term.

Furthermore, its purpose is to raise the activation of the catalyst by preheating the catalyst surface, to suppress poisoning of the catalyst poison, and to save the cost of the apparatus with the catalyst.

In order to achieve the above-mentioned objectives, the present invention provides an apparatus for removing a flammable gas, by using catalytic recombination means, comprising:

- a catalyst for reacting the flammable gas;
- a first case that houses the catalyst with at least one opening;
- at least one first lid mounted to the first case to cover the opening in a usual state and to uncover the opening in an emergency state,
- each first lid having a first lid attachment mechanism mounted to the opening of the first case and arranged to set the first lid to a closed state under the normal conditions,
- each first lid having a first lid detachment mechanism arranged to set the first lid to an open state by operating the lid attachment mechanism in response to the increase in the concentration of the flammable gas in the atmosphere in the vicinity of the outside of the first case.

With such a constitution, when the concentration of hydrogen and oxygen in PCV is low, the opening of the case of the apparatus is covered with the first lid, so that the degradation of the catalyst can be prevented. Also, if the concentration of hydrogen and oxygen increases, the first lid is opened and the apparatus is started, so that the atmosphere in PCV can be maintained to less than the flammability limit.

Moreover, the first lid attachment mechanism may comprise an adhesive part that adheres the first lid and the first case and is melted as soon as the temperature reaches above predetermined level, and the first lid detachment mechanism may comprise an oxidizing catalyst of hydrogen at least partially in contact with the adhesive part.

Thus, if the concentration of hydrogen and oxygen increases, since the catalyst installed at the first lid generates heat and weakens the action of the adhesive part, the first lid can be easily and reliably opened.

Moreover, the first lid attachment mechanism may comprise a magnetic material arranged at least partially on the opening of the first case, and the first lid detachment mechanism may comprises a vessel for housing a substance for generating a noncondensable gas in response to the increase in the temperature, which is installed in the vicinity of the inner wall surface of the first case; and the first lid is opened by transferring the noncondensable gas, which is generated in response to the increase in the temperature of the substance for generating the noncondensable gas, into the first case.

With such a constitution, if the substance for generating the noncondensable gas is heated, the noncondensable gas is discharged into the first case, so that the internal pressure of the first case is raised. Thereby, the first lid installed at the opening is opened, and as a result, the catalyst is activated. So the degradation of the catalyst due to the catalyst poison prior to the activation can be prevented.

Also, at this situation, it is appropriate that the oxidizing catalyst of hydrogen is arranged in the vicinity of the vessel for housing the substance for generating the noncondensable gas or at the outer wall of the case or its vicinity. Thus, only when the concentration of hydrogen and oxygen outside the first case increases, the temperature of the substance for generating the noncondensable gas is raised by the heat generated by a catalytic reaction or hydrogen occlusion reaction, and the noncondensable gas is discharged, so that the internal pressure of the first case is raised and thereby the first lid is opened and the catalyst is activated. For this reason, only when the concentration of hydrogen and oxygen reaches the degree that requires the catalyst is the apparatus started, so that the functional decrease of the catalyst due to the catalyst poison prior to starting can be prevented.

Instead of the oxidizing hydrogen catalyst, a hydrogen occlusion alloy may also be arranged. In this case, the hydrogen occlusion alloy is arranged so that it communicates with the external space of the first case via a filter. Thus, if the concentration of hydrogen in the external atmosphere of the first case increases, the hydrogen occlusion alloy absorbs the hydrogen and generates heat, which raises the temperature of the vessel for housing the substance for generating the noncondensable gas, so that the noncondensable gas is discharged into the case through the filter, thereby increasing the internal pressure of the first case.

Thereby, the first lid is opened and the catalyst is activated, so the atmosphere in PCV can be maintained at less than the flammability limit. Also, in this case, since the first lid of the case is opened after detecting the increase in the concentration of hydrogen outside of the first case, the catalyst can be prevented from being unnecessarily exposed to the catalyst poison.

Moreover, the first lid attachment mechanism may comprise an adhesive part that adheres the first lid and the first case and is melted as soon as the temperature reaches above a predetermined level, and the first lid detachment mechanism may comprise a heating element installed at least partially at the first lid in contact with the adhesive part. And it is preferable to set a flammable gas sensor installed outside of the first case that sends a current in response to the increase in the concentration in the flammable gas, and an electroconductive substance for connecting the heating element and the flammable gas sensor.

With such a constitution, when the concentration of the flammable gas in PCV exceeds a prescribed concentration, a prescribed current flows to the electroconductive means from the flammable gas sensor and the adhesive part is melted by raising the temperature of the heating element, so that the lid is opened, thereby activating the catalyst. As a result, when the concentration of the flammable gas of the atmosphere in PCV is under the concentration that requires the catalyst, the catalyst is separated from the gas atmosphere, so that the degradation due to the catalyst poison can be prevented.

Moreover, the first lid attachment mechanism may comprise a lid support means installed in connection with the first lid and supports the first lid from the inside of the first case, and the first lid detachment mechanism may comprise a flammable gas sensor installed outside of the first case that sends a current in response to the increase in the concentration of the flammable gas. And it is preferable to set a vessel for housing a substance for generating a noncondensable gas in response to the increase in the temperature, which is installed inside the first case, and a heating element installed in contact with the vessel for housing the substance for generating the noncondensable gas, and an electroconductive substance for connecting the heating element and the flammable gas sensor, and a pressure driving means for driving the first lid support means in response to the increase in the internal pressure of the vessel for housing the substance for generating the noncondensable gas, driven by the generation of the noncondensable gas so that the first lid attachment mechanism is operated, thereby opening the first lid.

With such a constitution, particularly when a metal hydride is used as the substance for generating the noncondensable gas, when the concentration of the flammable gas of the atmosphere outside the first case increases up to a first prescribed concentration, the temperature of the heating element is raised in accordance with the current output from the flammable gas sensor, and the hydrogen is discharged by heating the metal hydride.

The first lid is opened by the pressure driving means being driven by the pressure due to the hydrogen discharge from the metal hydride, so that the catalyst is activated. Also, if the concentration of the flammable gas of the atmosphere outside the first case decreases to a second prescribed concentration, the hydrogen is absorbed into the metal hydride by a reverse process so that the first lid installed at the opening of the case is closed. In this way, the degradation due to the catalyst poison of the catalyst housed in the case can be suppressed.

Moreover, the first lid attachment mechanism may comprise a wire whose one end is connected to the side surface of the first case and the other end is connected to the first lid, and which closes the first lid by a certain tension level under the usual state, and the first lid detachment mechanism may comprise a wire cutter installed halfway at the wire that cuts the wire in response to the increase in the concentration of the flammable gas.

With such a constitution, the wire is cut at a preset temperature, so that the lid can be opened.

In this case, it is preferable to set an auxiliary wire installed in a branched state and a dashpot for supporting one end of the auxiliary wire. With the action of the dashpot, a time delay is given until the first lid installed at the opening of the first case is fully opened, so that the exposure time of the catalyst to the atmosphere outside the first case is delayed. Thereby, the functional decrease of the catalyst due to the catalyst poison can be suppressed.

Instead of the wire cutter mentioned above, it is also preferable to set a wire cutting means, equipped with a heating element installed at an expected cut part of the wire and is melted as soon as the temperature reaches a predetermined level, and a heating means for increasing the temperature of the heating element in response to the increase in the concentration of the surrounding flammable gas.

For example, when an oxidizing hydrogen catalyst is used as the heating means, heat of reaction is generated along with the increase in the concentration of hydrogen, and the temperature of the expected cut part of the wire is increased, so that the heating element is melted, thereby being able to reliably cut the wire.

Furthermore, the heating means may be equipped with a power source, and an electroconductive circuit composed of an electroconductive substance for connecting the power source and the heating element, and a circuit switch installed in the middle of the electroconductive circuit. In this case, the circuit switch is equipped with a vessel for housing a hydrogen occlusion alloy, which includes a hydrogen inclusion alloy, and is set to the ON state as the volume of the hydrogen occlusion alloy increases with the increase in response to the increase in the concentration of the surrounding hydrogen gas surrounding the hydrogen occlusion alloy. It connects the circuit of the flammable gas sensor utilizing a volume expansion by the hydrogen absorption of the hydrogen occlusion alloy.

Thus, the consumption of the power source of the gas sensor under normal standby conditions and erroneous operation of the flammable gas sensor at the time of regular inspection are suppressed. At the same time, at the time of an accident, the increase in the concentration of hydrogen is detected and the circuit of the gas sensor can be automatically connected.

Furthermore, the apparatus for removing a flammable gas may further comprise a second case that houses the catalyst with at least one opening and is contiguous to the first case. And the first lid detachment mechanism is arranged to set to the first lid to an open state by operating the first lid attachment mechanism in response to the increase in the concentration of the atmosphere in the second case.

With such a constitution, after starting of the catalyst in the second case, the first lid of the first case is opened after a delay-time lapse required in the opening operation of the first lid detachment mechanism by a catalytic heat of reaction generated in the first case of the apparatus. Thus, even after the function of the catalyst in the second case is lowered by the action of the catalyst poison, the catalyst in the first case is started, so that the atmosphere in PCV can be maintained at less than the flammability limit.

Also, the apparatus using catalytic recombining means is not limited to two units; when starting of the catalyst is required over many more steps, the other case that houses the catalyst can also be adjacently arranged. At that time, the catalyst in the other case on standby can be operated in accordance with the degree of influence of the catalyst poison on the second case by respectively changing the transformation temperature of each shape-memory alloy being carried into the each case, so that the reliability as an entire system of the apparatus for removing the flammable gas is improved.

Moreover, it is also preferable to set a shape-memory alloy being carried into the second case, and a connection means for connecting the first lid attachment mechanism and the first lid detachment mechanism. And the first lid detachment mechanism is arranged to set to the first lid to an open state by operating the first lid attachment mechanism in response to the increase in the concentration of the atmosphere in the second case, and the connection means is operated by changing the shape of the shape-memory alloy in response to the temperature in the second case so that the first lid attachment mechanism is operated to set the first lid to be opened.

Thus, several cases house the catalyst can be more easily and reliably started with favorable timing.

Furthermore, it is desirable to have a third case that houses the catalyst with at least one opening, at least one second lid mounted to the third case to cover the opening in a usual state and to uncover the opening in an emergency state, each second lid having a second lid attachment mechanism and a second lid detachment mechanism, shape-memory alloys being carried into the first and second cases, a first connection means for connecting the first lid attachment mechanism and the first lid detachment mechanism, a second connection means for connecting the second lid attachment mechanism and the second lid detachment mechanism.

In this situation, the first lid detachment mechanism are arranged to set to the first lid to an open state by operating the first lid attachment mechanism in response to the increase in the concentration of the atmosphere in the second case, and the second lid detachment mechanism are arranged to set to the second lid to an open state by operating the second lid attachment mechanism in response to the increase in the concentration of the atmosphere in the first case. And the first and second connection means are operated first by changing the shape of the shape-memory alloy in the second case in response to the temperature in the second case so that the first lid attachment mechanism is operated to set the first lid to be opened, and is operated second by changing the shape of the shape-memory alloy in the first case in response to the temperature in the first case so that the second lid attachment mechanism is operated to set the second lid to be opened.

With such a constitution, after starting of the catalyst in the second case, the first lid is opened after the lapse of a delay time required for the temperature increase of the shape-memory alloy device by a catalytic heat of reaction, starting a catalytic reaction. Thereby, even after the function of the catalyst of the second case is lowered by the action of the catalyst poison, the second and third catalytic recombining reactions are sequentially started, so that the atmosphere in PCV can be maintained at less than the flammability limit.

Furthermore, it is also preferable to set a vessel for housing a substance for generating a noncondensable gas in response to the increase in the temperature which is installed in the second case, and a pressure driving means which opens the first lid of the first case by operating the first lid attachment mechanism in response to the increase in the internal pressure of the vessel for housing the substance for generating the noncondensable gas.

With such a constitution, after starting the catalyst in the second case, which is thought that its opening is always opened, the noncondensable gas is discharged by a catalytic heat of reaction, and the pressure inside the cylinder is raised. After a delay time required for the pressure increase, the first lid of the first case is opened, so that a catalytic reaction is started. Thus, even after the function of the catalyst in the second case is lowered by the action of the catalyst poison, the catalyst in the first case is started, so that the atmosphere in PCV can be maintained at less than the flammability limit.

Furthermore, it is also preferable to set the first lid attachment mechanism comprises an adhesive part that adheres the first lid and the first case and is melted as soon as the temperature reaches a predetermined level, and the lid detachment mechanism comprises a heating element installed at least partially at the first lid in contact with the adhesive part, and a flammable gas sensor installed in the second case and sends a current in response to the increase in the concentration of the flammable gas. And an electro-conductive substance for connecting the heating element and the heating element and the flammable gas sensor is also arranged.

With such a constitution, after the catalyst in the second case is started, only when the function is lowered and the atmosphere in PCV reaches a preset flammable gas concentration or more, since the first lid of the first case is opened, the functional decrease due to the catalyst poison in the first case can be prevented. Furthermore, the concentration of the flammable gas can be maintained at less than the flammability limit for a long time.

Also, the flammable gas sensor is appropriately installed inside the second case and at the upper part of the catalyst layer.

When the concentration of the flammable gas that passes through the catalyst layer is low and the catalyst functions normally, the concentration of the flammable gas detected by the flammable gas sensor is less than a prescribed concentration, and the first lid of the first case connected to the flammable gas sensor is not opened as normal. On the other hand, if the function of the catalyst positioned at the lower part of the flammable gas sensor is lowered and the concentration of the flammable gas that passes through the catalyst layer is raised and reaches a prescribed concentration, the first lid is opened, so that the reaction is started by a new catalyst that is not exposed to the catalyst poison. Thereby, the concentration of the flammable gas in PCV can be maintained at less than the flammability limit for a long time.

Furthermore, the apparatus for removing the flammable gas may further comprises a vessel operation means for operating the gas sensor housing vessel to be moved in response to the increase in the concentration of the surrounding flammable gas of the gas sensor housing vessel.

The flammable gas sensor appears only when the vessel operation means is operated. Thus, since the flammable gas sensor connected to the first case is exposed to the gas that passes through the catalyst layer after the catalyst in the second case is completely started, the possibility of an early separation release due to erroneous operation can be reduced.

The vessel operation means is equipped with a shape-memory alloy installed in the gas sensor housing vessel. In the means using the shape-memory alloy in the opening of the gas sensor housing vessel, the catalyst layer arranged at the lower side of the flammable gas sensor starts a reaction; if the temperature of the shape-memory alloy is raised by the heat of reaction and reaches the transformation temperature, the vessel is deformed along with the transformation of the shape-memory alloy, so that covering of the flammable gas sensor is removed.

The vessel operation means may also be equipped with a piston connected to the gas sensor housing vessel, a cylinder for housing the piston, and a vessel for housing a substance for generating the noncondensable gas, which is connected to the cylinder and includes the substance for generating the noncondensable gas when the temperature is high. In a method using the noncondensable gas generating substance in the opening of the gas sensor housing vessel, the catalyst layer arranged at the lower side of the flammable gas sensor starts a reaction. If the temperature of the substance is raised by the heat of reaction, the noncondensable gas is generated, so that the internal pressure of the vessel for housing the substance for generating the noncondensable gas is raised, thereby removing the covering of the gas sensor housing vessel.

Also, the apparatus for removing a flammable gas further comprises a heating element selected from the group consisting calcium oxide, sodium oxide, potassium oxide, magnesium oxide, rubidium oxide, strontium oxide, and hydrogen occlusion alloy, which is arranged in contact with the catalyst. If the calcium oxide or sodium oxide is used, since it causes an exothermic reaction with vapor included in the gas exposed to the heating element and generates a hydroxide, the temperature of the catalyst layer is raised, so that the catalyst is activated. Also, if the hydrogen occlusion alloy is used, the catalyst is similarly activated by the heat generation due to a hydrogen absorption reaction. Therefore, the recombination reaction by the catalyst can be further promoted.

Also, the catalyst of the apparatus for removing the flammable gas comprises at least one substance selected from the group consisting of platinum, ruthenium, and palladium; and at least one substance selected from the group of silver, cobalt, manganese, copper and their oxide. The former promotes the oxidation reaction of hydrogen even at normal temperature, but it is generally expensive. Although the latter is inexpensive, the reaction-start temperature is high. With a combination of these, the action of the catalyst is well maintained and the cost can be reduced.

Also, the lid detachment mechanism may comprise a vessel for housing a substance for generating a noncondensable gas is installed in the vicinity of the inner wall surface of the first case, with the substance for generating the noncondensable gas comprising at least one substance selected from the group consisting of calcium-containing hydrocarbon, sodium-containing hydrocarbon, thallium (I) carbonate, iron (II) carbonate, and a metal hydride. Then the first lid is opened by transferring the noncondensable gas, which is generated in response to the increase in the temperature of the substance for generating the noncondensable gas, into the first case. Along with heating, hydrogen is generated by the metal hydride, with carbon dioxide being generated by the above-mentioned other four kinds of substances.

Also, the catalyst of the apparatus for removing a flammable gas comprises at least one metallic substance unit and its oxide selected from the group consisting platinum, ruthenium, and palladium. Thus, the oxide is reduced by the increase in the hydrogen concentration, and a catalyst composed of the metal unit is newly generated. The removal efficiency of the flammable gas is improved by the catalyst that is newly generated. Also, with the heat generation during the reduction reaction, the temperature of the surface of the catalyst composed of the metal unit is raised, with the activation of the catalyst also being raised. At the same time, poisoning by the catalyst poison can be suppressed.

Also the present invention also provides an apparatus for removing a flammable gas, by using catalytic recombination means, comprising:

a catalyst for reacting the flammable gas;

a case with at least one opening;

a carrier for the catalyst installed in the case, which is a porous columnar body, comprising at least one substance selected from the group consisting of aluminum oxide, silicon oxide, copper, and bronze, whose fine-hole diameter is arranged to set in the range between 1 nm and 1000 nm, with a passage for circulating gas being installed as a cavity in the columnar body.

With such a constitution, instead of a conventional large-scale apparatus for removing a flammable gas, a static flammable gas removal can be realized by a small-scale apparatus with a high efficiency.

Moreover, the columnar body comprises at least one substance selected from the group consisting of platinum, ruthenium, and palladium as the catalyst at a ratio in the range between 1 wt % and 10 wt %. This range is the most appropriate ratio for well maintaining the catalyst performance.

Moreover, the apparatus for removing a flammable gas may further comprise a catalytic support selected from the group consisting active carbon and iron, whose specific surface area is over 500 $m^2/g$, installed by connecting with a columnar body constituting the catalyst, which is molded in a columnar shape in which a passage for gas circulation is installed as a cavity. Iron oxide is generated by the oxygen in the gas before the gas passes through the catalyst body, and the heat generated by the reaction promotes the recombination reaction of hydrogen and oxygen.

BRIEF DESCRIPTION OF THE DRAWINGS

In the accompanying drawings:

FIG. 1a is an perspective diagram showing the apparatus for removing flammable gas, which is a first embodiment of the present invention;

FIG. 1b is an oblique view showing the case in which a lid in FIG. 1a is opened.

FIG. 2c is an enlarged cross section of the lid in FIG. 2a.

FIG. 3b is an enlarged cross section showing a part B enclosed by broken lines in FIG. 3a.

FIG. 10a is an oblique view showing the apparatus for removing a flammable gas, which is a fifth embodiment of the present invention;

FIG. 10b is an oblique view showing the case where a lid in FIG. 10a is opened;

FIG. 10c is an enlarged cross section showing a part C enclosed by broken lines in FIG. 10a.

FIG. 11b is a block diagram corresponding to FIG. 11a.

FIG. 21b is an outlined constitutional diagram showing the ON state of FIG. 21a.

FIG. 22b is an outlined constitutional diagram showing the ON state of FIG. 22a.

FIGS. 23a, 23b, 23c, 23d, 23e, 23f, 23g are schematic cross sections showing the shape of an oxidizing catalyst of hydrogen present in the apparatus for removing a flammable gas, which are examples of a tenth embodiment of the present invention.

FIGS. 24a and 24b are oblique views showing a catalyst body arranged in the apparatus for removing a flammable gas, which is a thirteenth embodiment of the present invention.

Figure 2A:
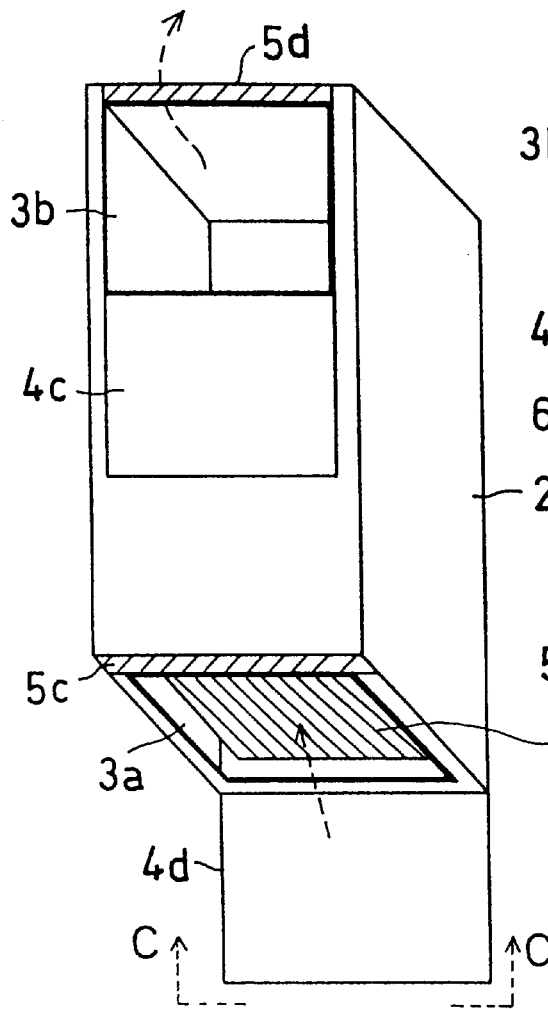
FIG. 2a is an oblique view showing the apparatus for removing a flammable gas, which is the first embodiment of the present invention and shows a state in which the lid is closed.

DESCRIPTION OF THE PREFERRED EMBODIMENTS (First Embodiment)

FIGS. 1a and 1b are perspective diagrams showing a apparatus for removing flammable gas of a primary containment vessel (PCV) of the first embodiment of the present invention. This apparatus is a catalytic recombining apparatus; since its basic constitution is similar to the conventional apparatus diagram shown in FIG. 32, only the characteristic constitution of this embodiment is explained below.

In this embodiment, openings 3a and 3b are installed in a case 2 of the catalytic recombining apparatus equipped with a oxidizing catalyst 1 of hydrogen in it. Openings 3a and 3b are covered with respective lids 4a and 4b. Adhesion parts 5a and 5b are installed at the part in contact with one of four sides of the lids 4a and 4b of the case 2, respectively, with the lids 4a and 4b being attached to the case 2 by the adhesive action. As the adhesion parts 5a and 5b, for example, an organic polymer that melts at the range between 100° C. and 500° C. or an alloy represented by a solder is appropriately used.

The lids 4a and 4b are axial adhesive structure, opened and closed by rotation about the sides (respectively shown by 4m and 4n in FIG. 1a) opposite to the adhesion parts 5a and 5b among these four sides as an axis. Also, the lids 4a and 4b include heating elements 6a and 6b, respectively, in contact with the adhesion parts 5a and 5b of the lids 4a and 4b. The heating elements 6a and 6b are formed from an oxidizing catalyst of hydrogen and arranged so that they are exposed to the gas atmosphere in PCV when the lids 4a and 4b are closed.

When the hydrogen and oxygen concentration in PCV reaches the concentration for starting a catalytic reaction, the heating elements 6a and 6b generate heat due to the catalytic reaction; if the temperature of the heating elements 6a and 6b reaches the melting point of the adhesion parts 5a and 5b, said adhesion parts 5a and 5b are melted, so that the lids and the adhesion parts are disconnected. Consequently, as shown in FIG. 1b, the lids 4a and 4b are rotated about the respective lid rotating axes 4m and 4n due to gravity and are opened.

Thus, the gas atmosphere in PCV is introduced into the case 2 of the apparatus from the opening 3a installed so that it is opened to the lower side of the case 2. It is then subjected to a recombination reaction by the catalyst 1 and discharged from the opening 3b installed at the upper side of the case 2.

According to such an embodiment, the oxidizing catalyst of hydrogen in the catalytic recombining apparatus is separated from the gas atmosphere in PCV until the hydrogen and oxygen concentration in PCV reaches the starting concentration of the catalyst, with the catalyst promoting the recombination reaction of the gas atmosphere in PCV only when it reaches the starting concentration of said catalyst. Thus, the decrease in the catalytic function due to the catalyst poison is prevented, so that the catalytic effect can be exerted to the maximum.

In this embodiment, the parts in contact with the adhesion parts 5a and 5b of the lids 4a and 4b have been noted as the heating elements 6a and 6b composed of a catalyst. However, as a modified example, catalytic recombining apparatuses shown by perspective diagrams in FIGS. 2a and 2b can also be considered. In the case of FIG. 2a, the surface area of the adhesion parts 5c and 5d is larger than the above-mentioned adhesion parts 5a and 5b, respectively. In this case, a series of lid openings and closings, in which the lid is in a closed state under normal conditions and is opened by heat generation, can be reliably carried out.

Also, in this case, instead of the above-mentioned lids 4a and 4b, lids 4c and 4d attached to the case 2 are constituted by respectively superposing double plates and cover the openings 3a and 3b, respectively. FIG. 2c is a side view showing the lid 4d observed from direction C in FIG. 2a (the lid 4c also has a similar structure).

This lid 4d (or the lid 4c) is made by superposing a plate composed of the heating element 6 formed from the oxidizing catalyst of hydrogen and a metallic plate 7. The surface of the lid 4d (or 4c) exposed to the gas atmosphere in PCV is constituted by the catalyst, and the surface in contact with the adhesion part 5d (or 5c) composed of the catalyst is constituted by the metallic plate 7. The area of the heating element 6 composed of the catalyst is large, compared with the case of FIG. 1, so that this apparatus is also adaptable to the case within the area of the adhesion part 5d (or 5c) is larger than that of the adhesion part 5b (or 5a) of the case of FIG. 1.

Figure 2B:
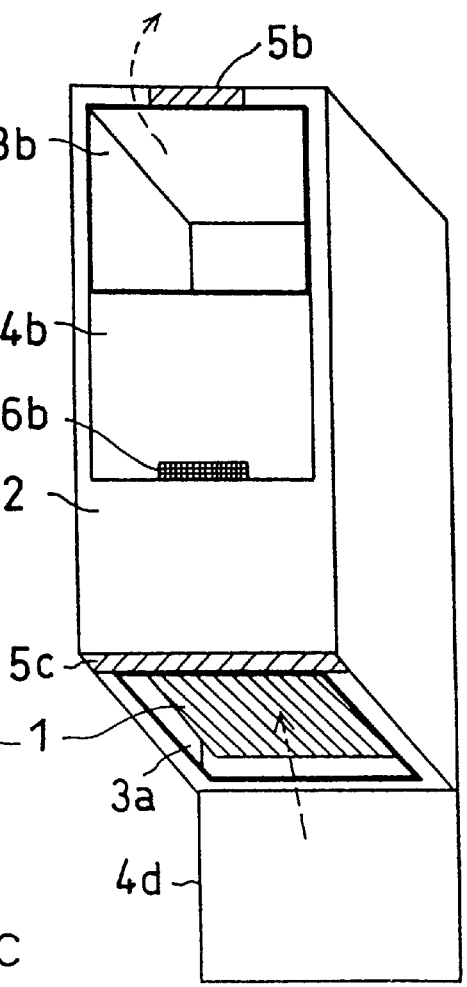
FIG. 2b is an oblique view showing the case in which the lid in FIG. 2a is opened.
Figure 2C:
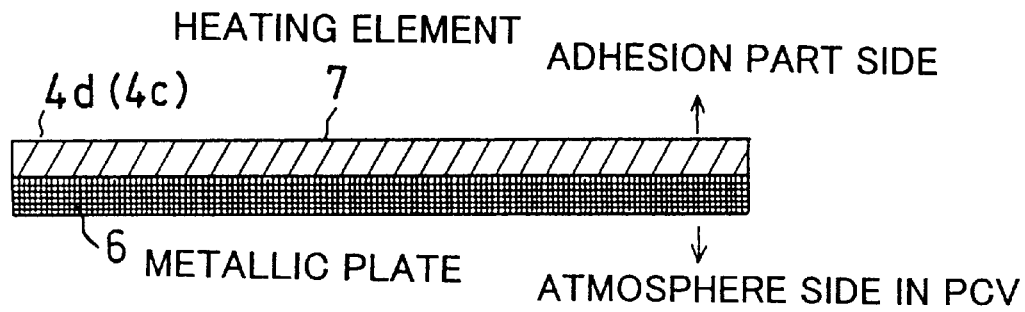

Also, as shown in FIG. 2b, a catalytic recombining apparatus, in which the lid 4d which covers the opening 3a as the gas inflow port has a superposing structure consisting of a metallic plate and the catalyst as in FIG. 2a, and in which the lid 4b which covers the opening 3b as the gas outflow port as in FIG. 1, can also be considered. In this apparatus shown in FIG. 2b, a lid 4c and the corresponding adhesion part 5d shown FIG. 2a are substituted by the lid 4b and the corresponding adhesion part 5b, respectively. Thus the amount of heat generated at the gas inflow port is set to be larger than the amount of heat generated at the gas outflow port, so that the formation of a naturally circulating flow passing through the catalytic recombining apparatus is promoted.

(Second Embodiment)

Figure 3A:
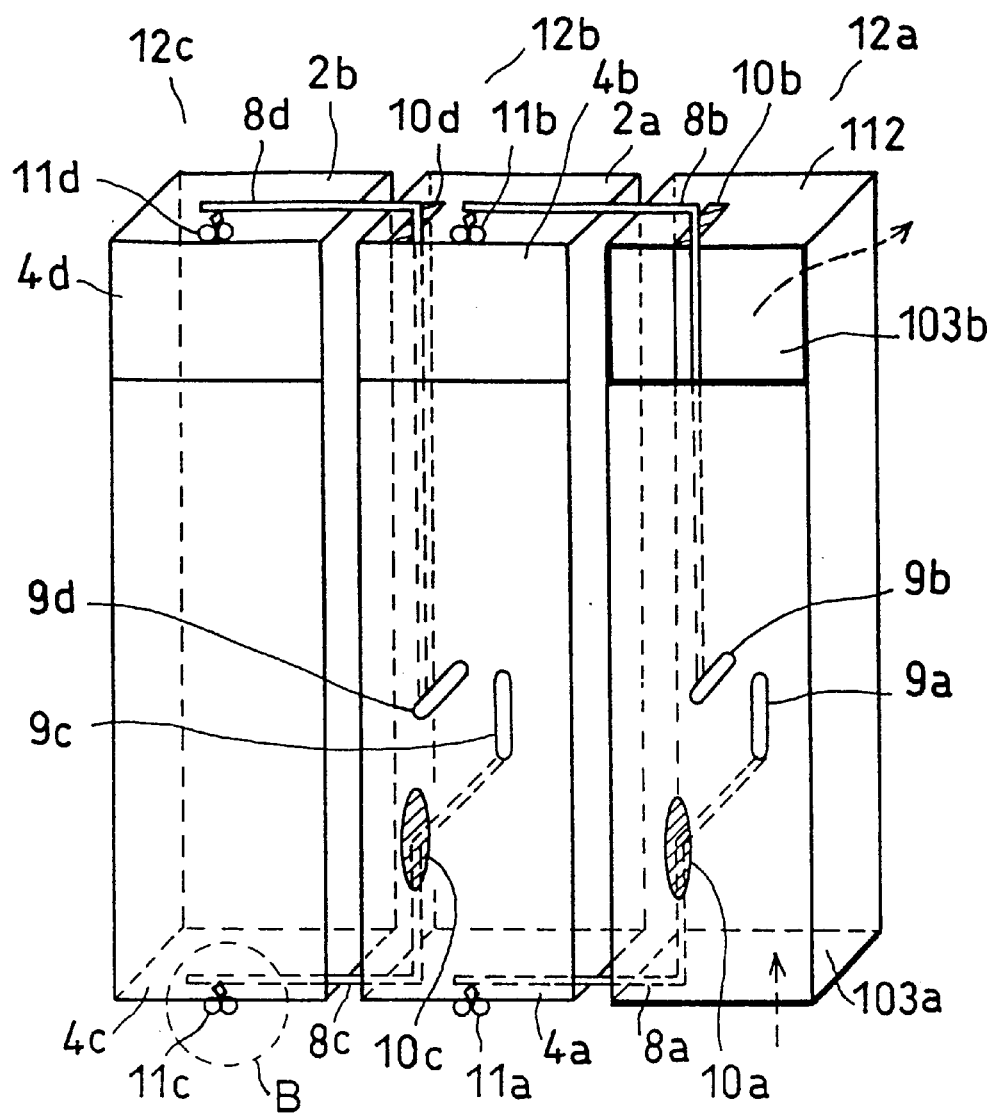
FIG. 3a is an oblique view showing the apparatus for removing a flammable gas, which is a second embodiment of the present invention.
Figure 3B:
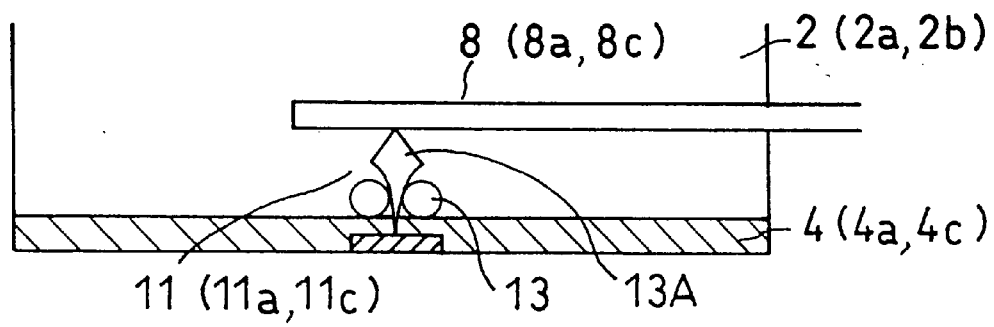
Figure 4:
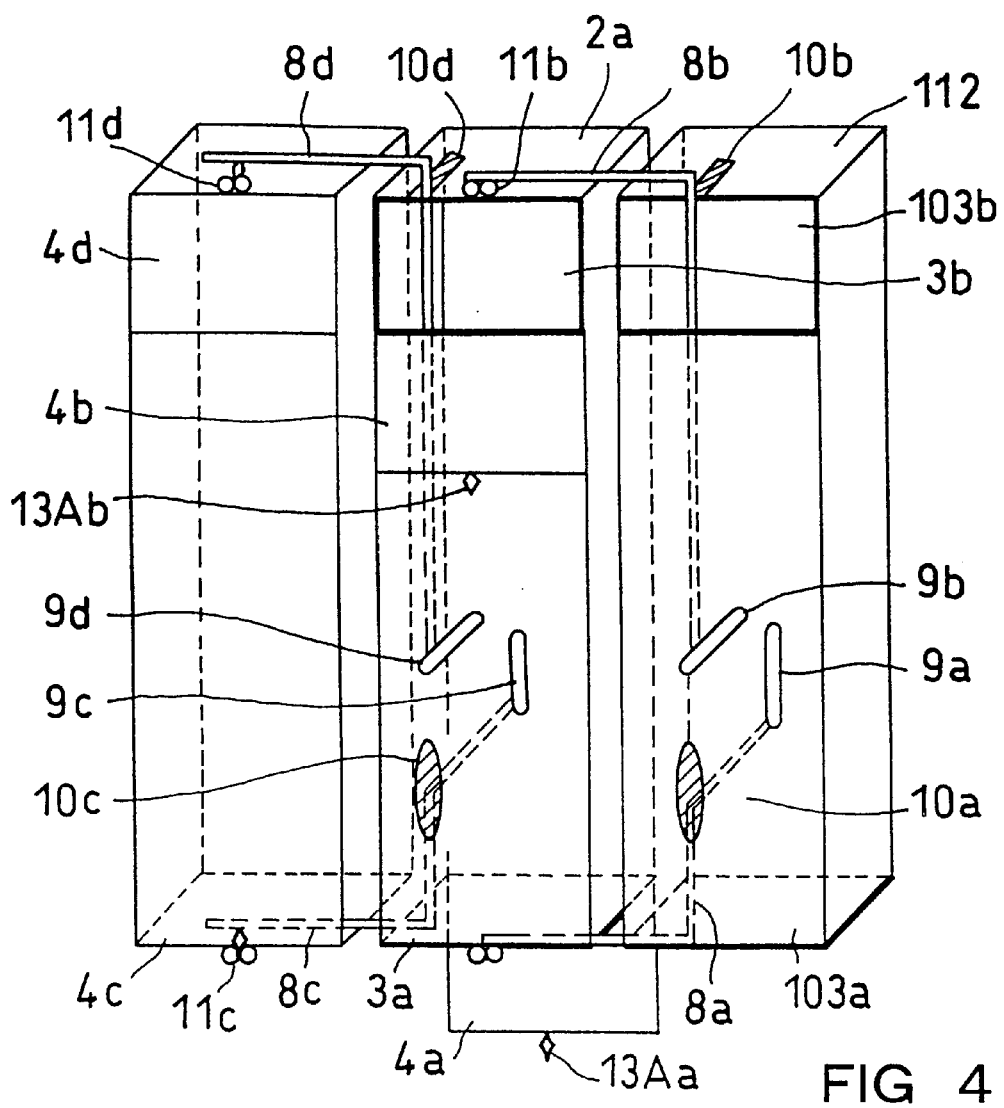
FIG. 4 is an oblique view showing the case where the lid of the apparatus for removing a flammable gas shown in FIG. 3 is opened.

Using FIGS. 3 and 4, the apparatus for removing a flammable gas of a reactor containment vessel, which is the second embodiment of the present invention, is explained. The same reference number is given to the same constitutional part as that of the first embodiment, so its explanation is omitted. In FIGS. 3 and 4, for clarifying, the catalyst placed inside the case 2 is omitted.

Figure 32:
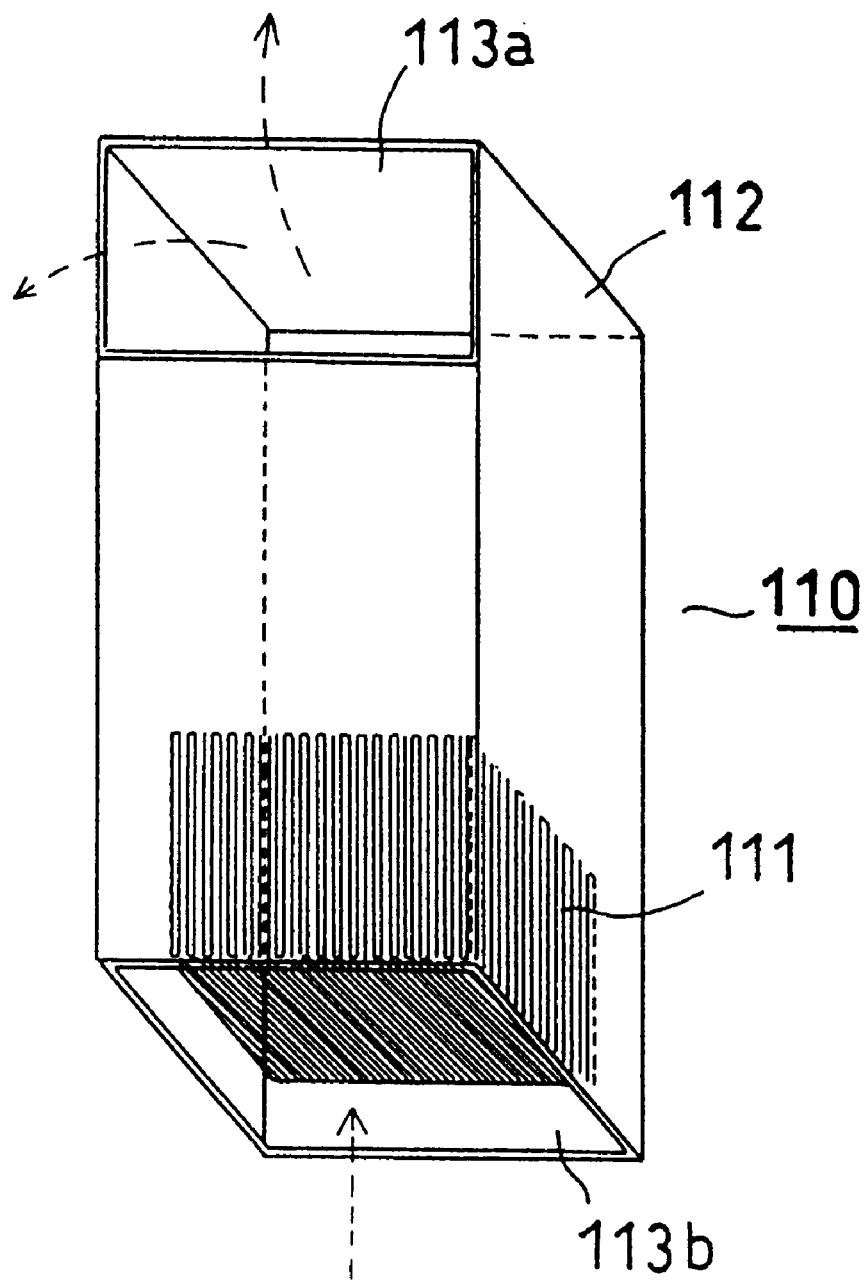
FIG. 32 is an oblique view showing the outline of a conventional catalytic recombining apparatus.

In this embodiment, apparatus for removing flammable gas, in which at least one unit of catalytic recombining apparatus having the lid mentioned in the first embodiment is arranged adjacently to the catalytic recombining apparatus mentioned in the background of the invention of FIG. 32, which openings are always open, are arranged.

FIG. 3a is an oblique view showing a normal operation state of the apparatus for removing a flammable gas in this embodiment. In this case, three units of catalytic recombining apparatuses are adjacently arranged. A first catalytic recombining apparatus 12a arranged at the rightmost side is equipped with a catalyst in a case 112 having openings 103a and 103b, which are always opened, without lids. The structure of the case 112 itself is the same as that of the conventional case shown in FIG. 32. Two rods 9a and 9b formed from a shape-memory alloy are arranged in the vicinity of the catalyst layer (not shown in the figure) of the first catalytic recombining apparatus 12a so that they don't make contact with each other in usual state.

Also, carriage shafts 8a and 8b, which are connected to each shape-memory alloy rod 9a and 9b respectively, and which carry the rods 9a, 9b into the case 112, are installed. These carriage shafts 8a and 8b are constituted by a shaft body such as wire. The carriage shaft 8a is attached onto the side surface of the case 112 by an attachment means 10a, and the carriage shaft 8b is attached onto the upper surface of the case 112 by an attachment means 10b. As the attachment means 10a and 10b, a sealing material composed of a heat-resistant rubber or heat-resistant silicon with excellent flexibility is appropriately used. The carriage shafts 8a and 8b are led to the outside of the case 112 via the attachment means 10a and 10b.

A second catalytic recombining apparatus 12b is arranged adjacently to the first catalytic recombining apparatus 12a. In the second catalytic recombining apparatus 12b, the opening parts 3a and 3b installed at the same positions as those of the openings 103a and 103b of the first catalytic recombining apparatus in the case 2a are covered by the lids 4a and 4b. The lids 4a and 4b are coupled with the case 2a by hooks 11a and 11b installed as an attachment and detachment means.

The hooks 11a and 11b consist of toggles and rollers, with the toggle being slid between two rollers while deforming. In general, they are often used in opening and closing doors of furniture. In this case, the toggles are fixed to the lids 4a and 4b, while the rollers are installed at the junction of the lids 4a and 4b of the openings 3a and 3b.

FIG. 3b is an enlarged cross section showing part B enclosed by broken lines shown in FIG. 3a and shows a coupling state of the lid 4c and the case 2c by a hook 11c. Also, since the structure of other hooks 11a, 11b, and lid is similar to that of hook 11c, only the details of the hook 11a are explained below.

A toggle 13A fixed to the lid 4a and a roller 13B installed near the opening 3a of the case 2a are hooked so that the lid 4a is coupled with the case 2a, thereby blocking the opening 3a. On the other hand, the carriage shaft 8a leading to the outside of the case 112 of the first catalytic recombining apparatus 12a is arranged adjacently to the tip of the toggle 13A of the hook 11a. Similarly, the lid 4b blocks the opening 3b by hooking of the toggle and the roller of the hook 11b, with the carriage shaft 8b being arranged adjacently to the tip of the toggle of the hook 11b.

Also, in the case 2a of the second catalytic recombining apparatus 12b, there are shape-memory alloy rods 9c and 9d, and carriage shafts 8c and 8d which connect and carry the rods 9c and 9d, respectively, into the case 2a, are installed. These carriage shafts 8c and 8d are attached onto the side surface or upper surface of the case 2a by attachment means 10c and 10d, respectively, and lead to the outside of the case 2a.

Furthermore, a third catalytic recombining apparatus 12c, which is adjacent to the second catalytic recombining apparatus 12b is arranged, with a case 2b and lids 4c and 4d. The lids 4c and 4d respectively cover the openings by hooks 11c and 11d consist of the toggles and the rollers. And the carriage shafts 8c and 8d of the shape-memory alloy are respectively arranged adjacently to the tips of the toggles of the hooks 11c and 11d.

When an atomic reactor is normally operated, the apparatus for removing flammable gas of this embodiment is on standby. However, when a design reference phenomenon or a phenomenon exceeding the design reference occurs and the concentration of the flammable gas in PCV increases, the first catalytic recombining apparatus 12a equipped with the openings 103a and 103b, which are always opened, is first started, then the recombination reaction of hydrogen and oxygen in the atmosphere of PCV introduced into the case 112 is started. The broken line arrowhead in the figure shows the flow of the gas atmosphere from the reactor containment vessel to the case 112 at that time.

Here, with the recombination reaction, if the temperature in the case 112 of the first catalytic recombining apparatus 12a is raised and reaches the transformation temperature of the shape-memory alloy constituting the rods 9a and 9b, the shape storage alloy rods 9a and 9b are respectively extended in the axial direction. Thus the carriage shafts 8a and 8b are respectively moved toward the hooks 11a and 11b of the second catalytic recombining apparatus 12b. As a result, the toggles 13Aa and 13Ab of each hook 11a and 11b, respectively, are shifted, so that the lids 4a and 4b are opened. FIG. 4 shows an oblique view of this case.

In a specific setup of the transformation temperature of the shape-memory alloy constituting the rods 9a and 9b, the performance decrease of the catalytic recombining apparatuses due to the catalyst poison, which is expected to be discharged when a certain accident occurs, should be considered. In other words, by setting the transformation temperature of the shape-memory alloy constituting the rods 9a and 9b to the temperature in which it assumes that the catalyst layer of the first catalytic recombining apparatus 12a is degraded, the flammable gas thereafter can be treated by the starting of the second catalytic recombining apparatus 2a, even after the function of the catalyst of the first catalytic recombining apparatus 12a is lost.

Furthermore, if the temperature in the case 2a of the second catalytic recombining apparatus 12b increases and the shape-memory alloy rods 9c and 9d respectively extend in the axial direction, the carriage shafts 8c and 8d are also operated along with them, so that the lids 4c and 4d of the case 2b of the third catalytic recombining apparatus 12c are opened, thereby starting the third catalytic recombining apparatus 12c.

In this embodiment explained above, three units of catalytic recombining apparatuses have been adjacently installed; however, the number of units is not limited to this situation. It is also preferable that the apparatus for removing flammable gas comprises several catalytic recombining apparatuses constituted by carrying shape-memory alloy rods having several transformation temperatures in each case. If the fourth catalytic recombining apparatus is arranged adjacently to the third catalytic recombining apparatus 12c, it is better that the transformation temperature of the shape-memory alloy rods carried into the case of the third catalytic recombining apparatus is set higher than that of the second catalytic recombining apparatus 12b. Thus the catalytic recombining apparatuses on standby can be operated in accordance with the degree of influence of the catalyst poison on the first catalytic recombining apparatus 12a, so that the entire reliability of the apparatus for removing flammable gas can be raised.

Figures 5A, 5B:
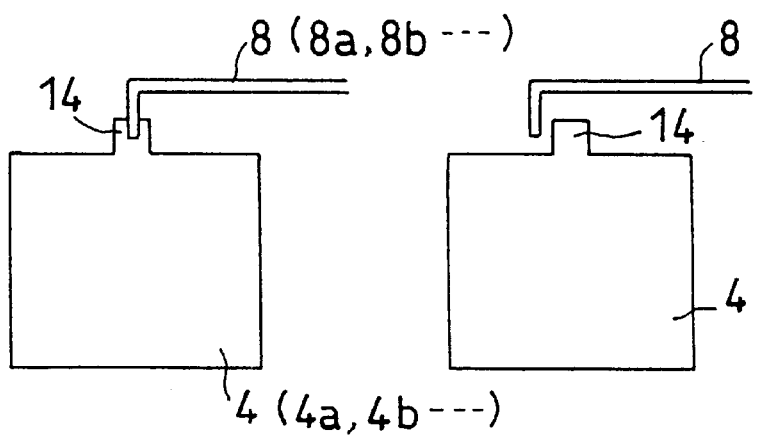
FIG. 5a is a side view showing a coupling state of the lid of the apparatus for removing a flammable gas, which is the second embodiment of the present invention.
FIG. 5b is an oblique view showing the case where the lid in FIG. 5a is opened.

FIGS. 5a and 5b are side views showing the coupling structure of the lid of the second catalytic recombining apparatus 2b of the apparatus for removing a flammable gas, which shows a modified example of this embodiment. FIG. 5a shows the case in which the lid 4b is closed; FIG. 5b shows the case in which the lid 4b is opened.

Also, as a modified example of this embodiment, at the coupling part of the lid and the case 2 (2a, etc.), as a means for coupling the lid 4 (4a, etc.) and the case 2 instead of the above-mentioned hook consisting of the toggle and roller, a projection part 14 is installed at the lid 4, and the projection part 14 is supported by the carriage shaft 8 (8a, etc.) so that the lid 4 is not opened under normal conditions. The carriage shaft 8 acts as a stopper of the lid 4. If the shape-memory alloy rod 9 (9a, etc.) is deformed by the heat of reaction generated by the catalyst and the carriage shaft 8 as the stopper is displaced and shifted from the position of the projection part 14 of the lid (the state of FIG. 5b), the lid 4 is opened by its own weight. With such a constitution, the action equivalent to the hook can be obtained by a simpler constitution.

(Third Embodiment)

Figure 6:
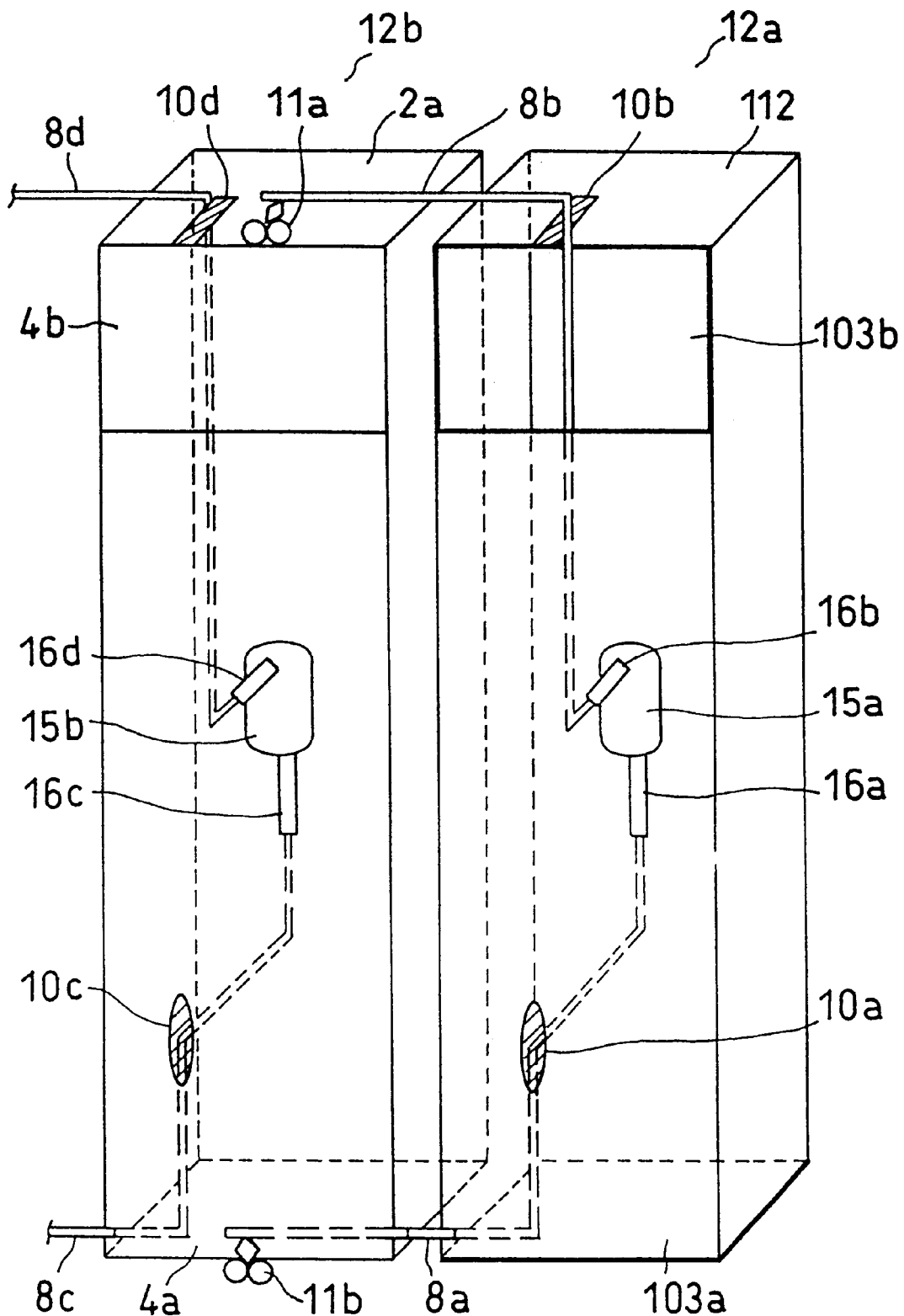
FIG. 6 is an oblique view showing the apparatus for removing a flammable gas, which is a third embodiment of the present invention.

FIG. 6 is a perspective view of the apparatus for removing flammable gas of PCV of the third embodiment of the present invention. In this embodiment, instead of the rods composed of a shape-memory alloy in the above-mentioned second embodiment shown in FIGS. 3 and 4, a vessel for housing a substance for generating a noncondensable gas is installed in the case.

In this embodiment, instead of the shape-memory alloy rods 9a and 9b in the second embodiment shown in FIG. 3a, a vessel 15a for housing a substance used to generate a noncondensable gas, and cylinders 16a and 16b connected to the vessel 15a are arranged in the case 112 of the first catalytic recombining apparatus 12a. Also, pistons 19a and 19b are respectively installed in each cylinder 16a and 16b.

The carriage shafts 8a and 8b for carrying the pistons 19a and 19b and the cylinders 16a and 16b are connected to the case 112. The leading position at the outside of the case 112 of the carriage shafts 8a and 8b and the arrangement of the attachment means 10a and 10b and the hooks 11a and 11b are similar to those of the above-mentioned second embodiment.

Figure 7:
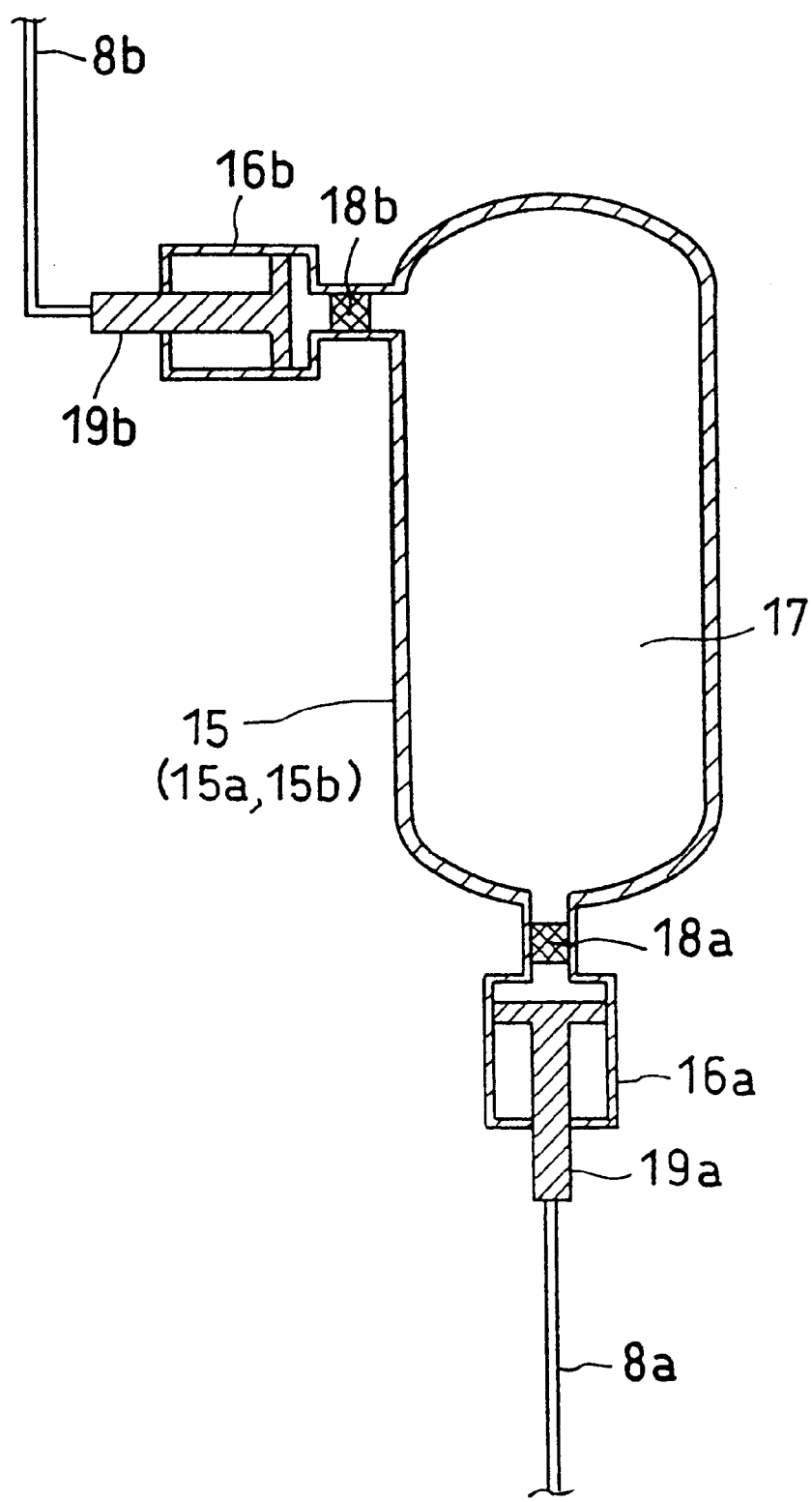
FIG. 7 is a cross section showing the outline of a vessel for housing a substance for generating a noncondensable gas installed in a case of the apparatus for removing a flammable gas shown in FIG. 6.

FIG. 7 is an enlarged cross sectional view showing the details of the vessel 15 for housing a substance for generating noncondensable gas and the cylinders 16a and 16b shown in FIG. 6. In the figure, a substance 17 generates noncondensable gas.

A powder of the substance 17 for generating noncondensable gas is filled into the vessel 15, and the cylinders 16a and 16b are respectively connected to the upper part and the lower part of the vessel 15. In order to prevent the powder of the substance 17 for generating a noncondensable gas from being directly mixed into the cylinders 16a and 16b, filters 18a and 18b are respectively installed at the junctions of the cylinders 16a and 16b and the housing vessel 15. In each cylinder 16a and 16b, pistons 19a and 19b respectively connected with the carriage shafts 8a and 8b, formed of a wire for instance, are installed.

If the recombination reaction by the catalyst is started in the first catalytic recombining apparatus 12a, the substance 17 for generating noncondensable gas is heated by the heat of reaction, so that the noncondensable gas is generated in the housing vessel 15. The internal pressure of the housing vessel 15 is raised by the noncondensable gas generated, with the internal pressure of the cylinders 16a and 16b also being raised by it, so that the pistons 19a and 19b are pushed out. Thus, the carriage shafts 8a and 8b are displaced and the tips of the carriage shafts 8a and 8b are shifted with regard to the hooks 11a and 11b, so that the lids 4a and 4b, which are installed at the upper side part and on the bottom face of the second catalytic recombining apparatus 12b, are opened.

Also, third, fourth, or additional, catalytic recombining apparatuses can be installed adjacently to the second catalytic recombining apparatus 12b utilizing the action of the substance for generating the noncondensable gas on the pistons.

As the substance 17 for generating the noncondensable gas in this embodiment, a metal hydride used as a substance for discharging hydrogen is appropriate. As the kind of metal hydride for discharging hydrogen, Mg system, MgNi system, MgCu system, MgZn system, MgNiCu system, MgNiFe system, MgCa system, CaMgNi system, $CeMg_{12}$ system, $ZrMn_2$ system, $TiCo_xFe_yZr_z$ system, $TiFe_xNi_yV_z$ system, TiCoNi system, TiVCo system, ZrMn system, Pd system, and TiCo system metals or their alloys having a relatively high hydrogen dissociation temperature and dissociation pressure are appropriate. And potassium-containing hydrocarbon, sodium-containing hydrocarbon, thallium (I) carbonate, and iron (II) carbonate, used as a substance for discharging carbon dioxide, are also appropriate as the substance 17.

With such a constitution, the catalytic recombining apparatuses 12b, or additional, other than the first catalytic recombining apparatus 12a, are not exposed to the catalyst poison atmosphere at a high concentration which seems to be generated at the initial stage of an accident. Thus the decrease in the catalyst function can be suppressed.

(Fourth Embodiment)

Figures 8A, 8B:
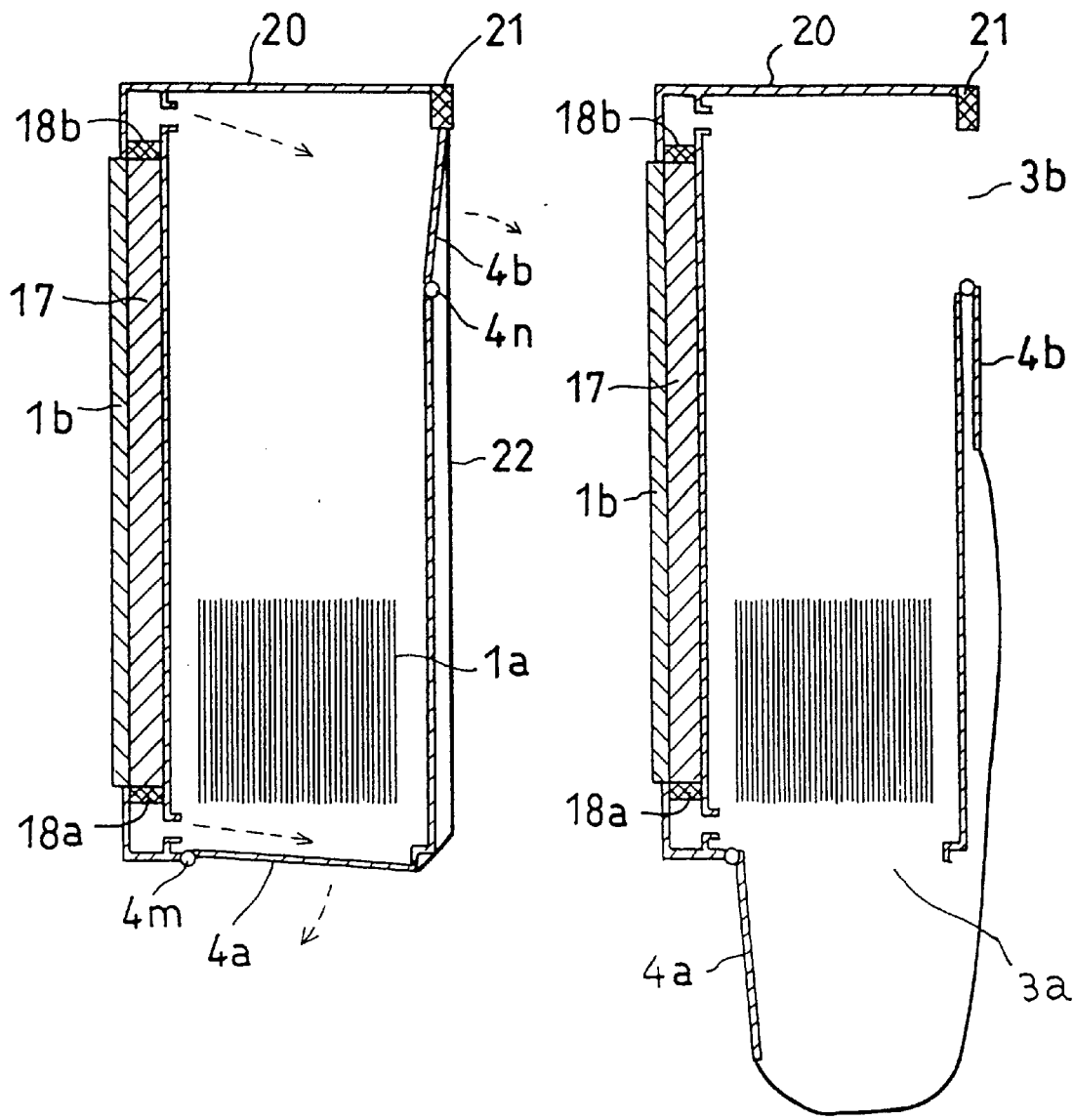
FIG. 8a is a cross section showing the apparatus for removing a flammable gas, which is a fourth embodiment of the present invention.
FIG. 8b is a cross section showing the case where a lid in FIG. 8a is opened.

FIGS. 8a and 8b are cross sections showing the outline of the apparatus for removing flammable gas, which is the fourth embodiment of the present invention. This embodiment is similar to the above-mentioned first embodiment in that the lids 4a and 4b are installed at the openings 3a and 3b of the case of the apparatus and that the lids 4a and 4b are respectively rotated and opened via the lid rotating shafts 4m and 4n. In the figures, a catalyst layer composed of an oxidizing catalyst of hydrogen arranged in a case 20 of the catalytic recombining apparatus is shown by 1a. FIG. 8a shows a state in which the lids 4a and 4b are closed, and FIG. 8b shows an open state.

In this embodiment, at least part of the lid 4b associated with the case 20 is made of a metal, with a magnet 21 being arranged at a position in contact with the lid 4b installed at the side of the case 20. Under normal conditions, the metallic part of the lid 4b makes contact with the magnet 21, and the lid 4b is in a closed state. The lid 4a, which is installed on the bottom face of the case 20, and the lid 4b are connected at the outside of the case 20 by a wire 22, and the two lids 4a and 4b are interlocked and opened. Under normal conditions, the lid 4a, which is connected to the lid 4b by the wire 22, are closely attached to the case 20 by pulling them out upward by the wire 22 and are in a closed state, as well as the lid 4a.

On the other hand, as shown in FIG. 8b, if the lid 4b is opened, the lid 4a is also interlocked with it and opened by being released from the pulling of the wire 22. In this embodiment, the structure, in which these two lids 4a and 4b are interlocked and opened, is not limited to wire, and any means for connecting the two lids 4a and 4b may be adopted.

Furthermore, in this embodiment, the substance 17 for generating noncondensable gas is arranged at the side of the case 20 of the catalytic recombining apparatus. As the substance 17 for generating noncondensable gas, any compound for discharging noncondensable gas by heating may be used, and any of the compounds mentioned in detail in the above-mentioned third embodiment is appropriately used. Also, a catalyst layer 1b composed of an oxidizing catalyst of hydrogen is installed at the position, adjacent to the substance 17 for generating noncondensable gas and is in direct contact with the atmosphere in PCV, on the side surface of the case 20. The substance 17 for generating noncondensable gas is connected to the internal space of the case 20 via the filters 18a and 18b.

If the concentration of flammable gas in PCV increases, the catalyst 1b installed on the side surface of the case 20 starts the recombining reaction, and the substance 17 for generating noncondensable gas is heated by the heat of reaction. The noncondensable gas discharged from the substance 17 for generating the noncondensable gas is filled into the case 20 of the catalytic recombining apparatus through the filters 18a and 18b. If the internal pressure of the case 20 increases and exceeds a threshold, the lids 4a and 4b are opened. At that time, the lids 4a and 4b are interlocked with the wire 22 and opened.

With such a constitution, in a state in which the concentration of flammable gas in PCV is low, the functional decrease of the catalyst due to the catalyst poison is prevented by separating the catalyst from the gas atmosphere, and the atmosphere in PCV can be maintained at less than the flammability limit by detecting the increase of the concentration of the flammable gas in PCV, then opening the lids of the case of the catalytic recombining apparatus.

Figure 9:
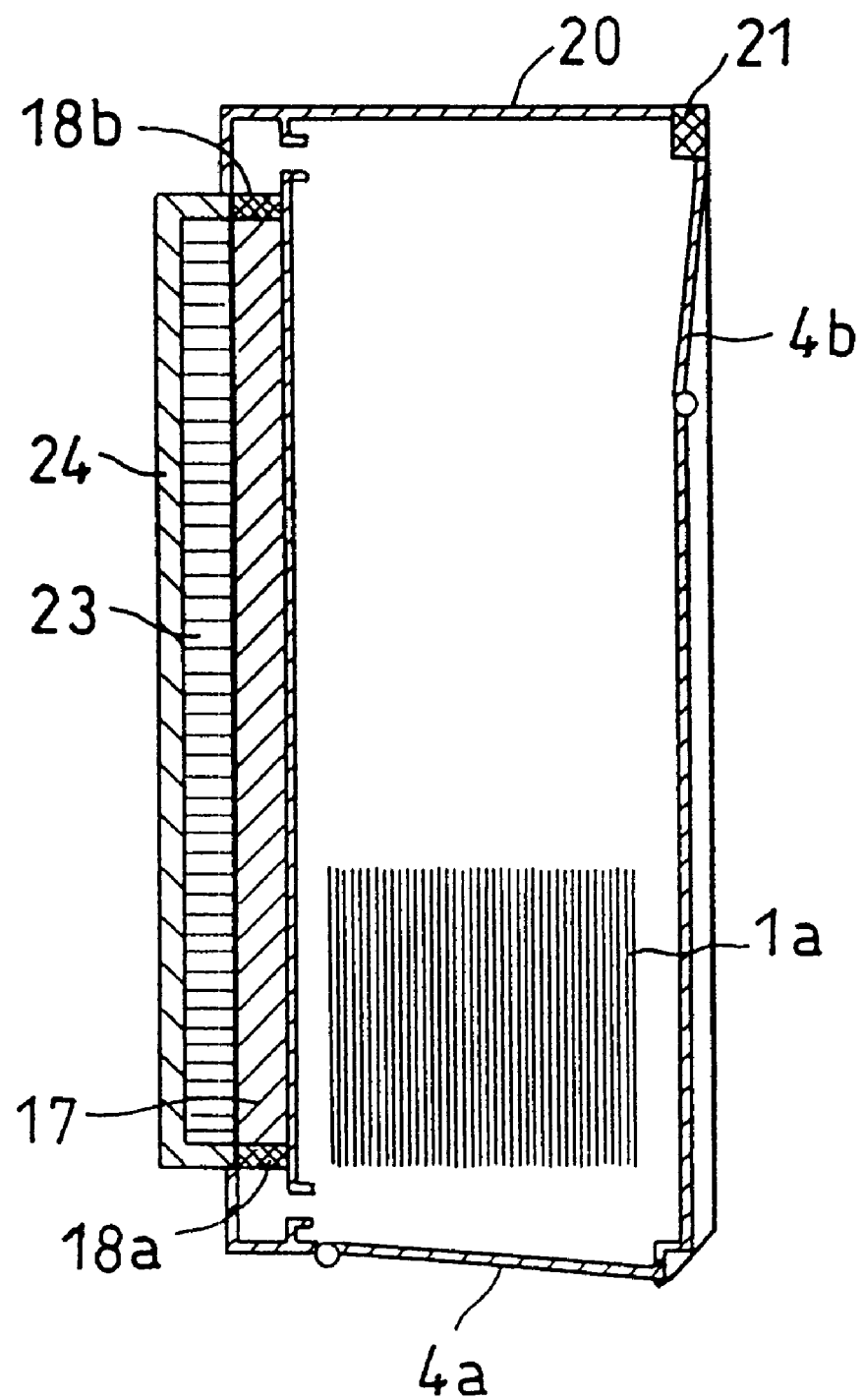
FIG. 9 is a cross section showing the apparatus for removing a flammable gas, which is also a fourth embodiment of the present invention.

Also, as a modified example of this embodiment, there is a method using a hydrogen occlusion alloy 23 covered with a filter 24, which also serves as a housing vessel, instead of the catalyst 1b. FIG. 9 is a cross sectional view of the apparatus for removing flammable gas of this case.

In FIG. 9, the hydrogen occlusion alloy 23 is exposed to the atmosphere in the housing vessel interposed by the filter 24; if the concentration of hydrogen in PCV increases, the hydrogen is absorbed by the hydrogen occlusion alloy 23, so that heat is generated. The substance 17 is heated and then produces the noncondensable gas, so that the internal pressure of the case of the catalytic recombining apparatus 20 is raised, thereby opening the lids 4a and 4b. With such a structure, a result similar to the above-mentioned effect can be obtained.

(Fifth Embodiment)

FIGS. 10a and 10b are cross sectional view of the apparatus for removing flammable gas of the fifth embodiment of the present invention. Also, FIG. 10c is an enlarged side view showing part C enclosed by broken lines of FIG. 10a.

In this embodiment, under normal conditions, the lids 4a and 4b installed at two openings of the case 25 are maintained in a closed state by the adhesion parts 5a and 5b installed on the contact surface of the case 25 of the lids 4a and 4b. As a material constituting the adhesion parts 5a and 4b, an organic polymer or solder that melts at the range between 100° C. and 500° C. is appropriate. Also, the heating elements 6a and 6b make contact with the part of the adhesion parts 5a and 5b of the case 25. The above setup has a constitution similar to that of the above-mentioned first embodiment.

One characteristic of this embodiment is that the heating elements 6a and 6b are connected to the flammable gas sensor 27 installed in the case 25 via lead wires 26a and 26b composed of an conductor of electricity, respectively. As the flammable gas sensor 27, a conventional hydrogen sensor or oxygen sensor is appropriate. The flammable gas sensor 27 sends a current proportional to the concentration of the hydrogen or oxygen in the surrounding atmosphere. As the oxygen sensor, for example, a room-temperature operation type of limited-current sensor using $LaF_3$ is appropriate. Next, using the case wherein the oxygen sensor is representatively used as the flammable gas sensor 27 as an example, the operation of this embodiment is explained below, but the case using the hydrogen sensor can also be similarly explained.

If the concentration of oxygen in PCV increases, a current proportional to the oxygen concentration is sent via the lead wires 26a and 26b from the flammable gas sensor 27, and the surface temperature of the heating elements 6a and 6b is raised by the current. If the concentration of oxygen exceeds a preset threshold, the surface temperature of the heating elements 6a and 6b reaches the melting point of the adhesion parts 5a and 5b, and the adhesion parts 5a and 5b are melted, so that the lids 4a and 4b are opened.

Thus, since the lids of the case are opened only when the concentration of the flammable gas of the atmosphere in PCV is increased to some degree and the operation of the apparatus for removing the flammable gas is required, the catalyst can be separated from the gas atmosphere when the flammable gas concentration is low, so that the decrease in the catalyst function due to the catalyst poison can be prevented.

Figure 11A:
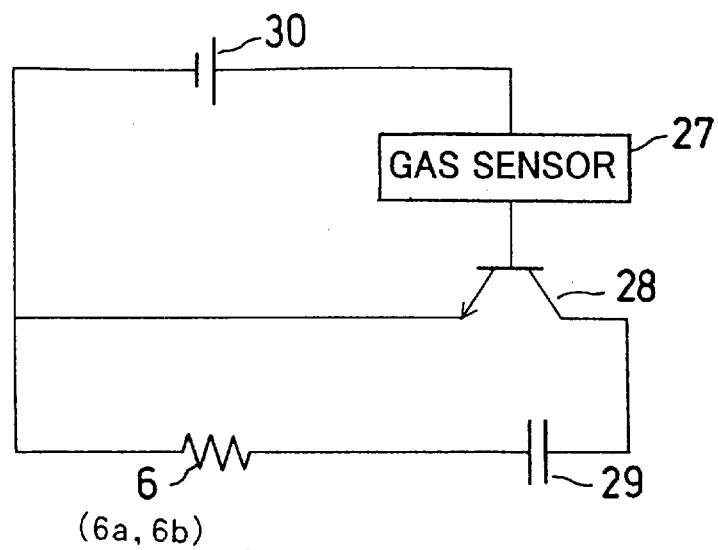
FIG. 11a is a circuit diagram showing the apparatus for removing a flammable gas, which is also the fifth embodiment of the present invention.
Figure 11B:
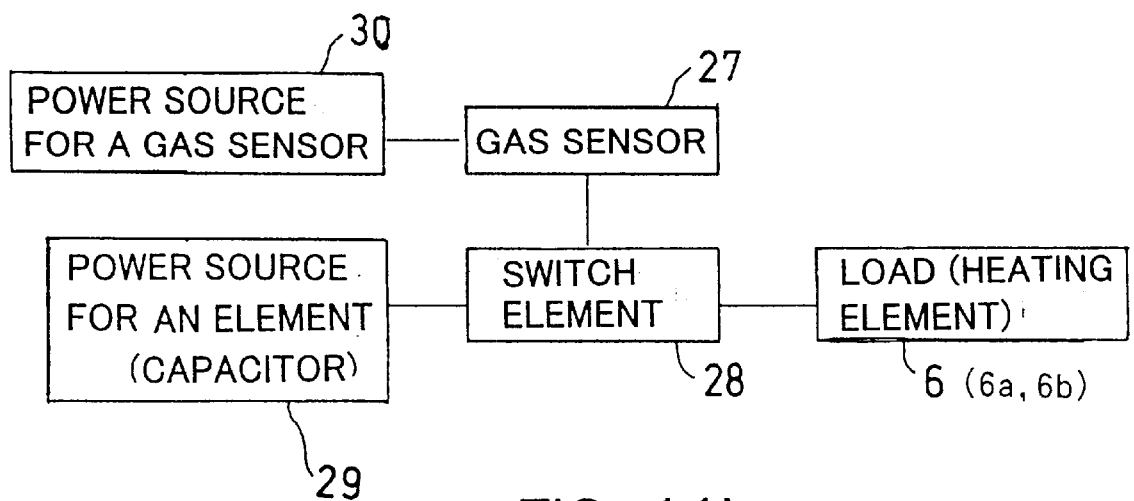

Also, in this embodiment, when the current output from the flammable gas sensor 27 is small, since a circuit shown in FIG. 11 is formed, a power sufficient for melting the adhesion parts 5a and 5b can be supplied. FIG. 11a is a circuit diagram showing the relation between the flammable gas sensor 27 and the heating elements 6a and 6b (shown by reference number 6 in the figure); FIG. 11b is a block diagram corresponding to FIG. 11a.

A switch element 28 is connected to the flammable gas sensor 27, with a power source 30 of the flammable gas sensor 27 and a power source 29 for the switch element 28 being installed. In FIG. 11a, as an appropriate example of these power sources 29 and 30, the case wherein a cell is used as the power source 30 of the flammable gas sensor 27 and a capacitor is used as the power source 29 for the switch element 28 is shown, but the power sources 29 and 30 are not limited to these.

In this embodiment, a fuse may also be used in the adhesion parts 5a and 5b if the weight of the lids 4a and 4b can be supported. In this case, a current is directly sent to the fuse without passing through the elements 6a and 6b. When the concentration of oxygen exceeds a preset threshold, the power required for jumping flows to the circuit. Thus, it is possible to obtain an effect similar to the case wherein a substance such as an organic polymer or solder that melts at a high temperature is used in the adhesion parts 5a and 5b.

(Sixth Embodiment)

The sixth embodiment which is a modified embodiment of the above-mentioned fifth embodiment, is the case wherein several catalytic recombining apparatuses forming the apparatus for removing flammable gas are constituted so that their lids are stepwise separated and released. As an example of the case, an oblique view showing the apparatus for removing flammable gas of the sixth embodiment by adjacently installing two catalytic recombining apparatuses is shown in FIG. 12a.

The first catalytic recombining apparatus with a case 25a has the above-mentioned constitution shown in FIG. 10. In other words, a flammable gas sensor 27a is arranged adjacently to the case 25a, and the adhesion parts 5a and 5b of the lids 4a and 4b are connected via the lead wires 26a and 26b. The second catalytic recombining apparatus having a case 25b is arranged adjacently to the first catalytic recombining apparatus.

Figure 12A:
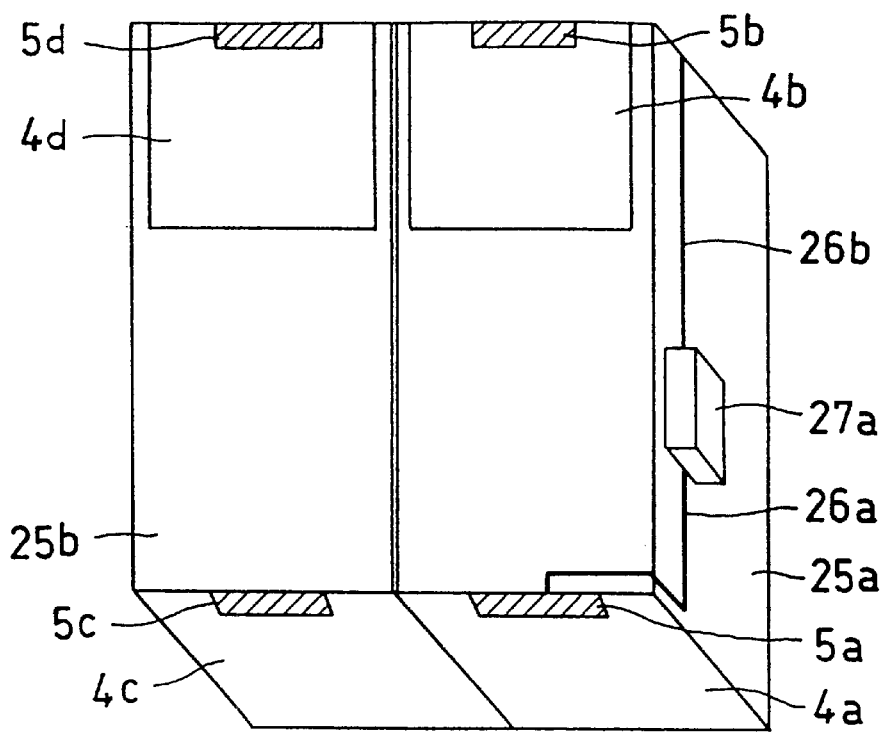
FIG. 12a is an oblique view showing the apparatus for removing a flammable gas, which is a sixth embodiment of the present invention.
Figure 12B:
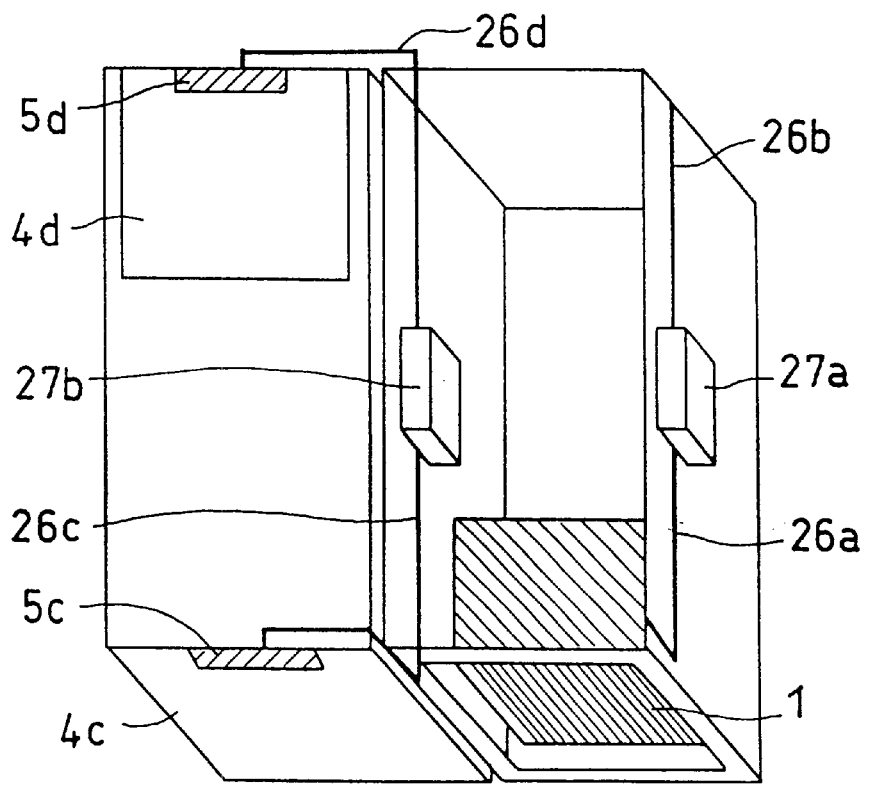
FIG. 12b is an oblique view showing part of FIG. 12a for explanation.

FIG. 12b is an oblique view showing a state in which the front of the case 25a of the first catalytic recombining apparatus and the lids 4a and 4b in FIG. 12a are removed for explanation. Similarly to the first catalytic recombining apparatus, a flammable gas sensor 27b is connected to the adhesion parts 5c and 5d of the lids 4c and 4d of the second catalytic recombining apparatus with the case 25b via lead wires 26c and 26d. The flammable gas sensor 27b is installed in the case 25a of the first catalytic recombining apparatus.

If the lids 4a and 4b are opened by the increase in the concentration of flammable gas in PCV and the catalyst of the first catalytic recombining apparatus is started, the concentration of the flammable gas in the gas that passes through the catalyst layer (not shown in the figure) of the first catalytic recombining apparatus is raised. When the concentration of the flammable gas exceeds a preset threshold, the lids 4c and 4d of the second catalytic recombining apparatus are opened by the electrification from the flammable gas sensor 27b installed in the case 25a, that is, a mechanism similar to the first catalytic recombining apparatus.

In this modified example, if, as soon as the lids 4a and 4b of the first catalytic recombining apparatus are opened, the flammable gas sensor 27b is operated by the flammable gas component of a small amount of reverse-current gas introduced into the case 25a by the reverse current from the opening 3b corresponding to a gas outlet, the lids 4c and 4d of the second catalytic recombining apparatus will be continuously opened. Thus, in order to prevent the lids from being opened continuously, it is effective to apply this modified example in combination with any of the following means:

(A) The material of the adhesion parts 5a and 5b is selected so that the melting point of the substance used in the adhesion part 5a, which adheres the lid 4a of the opening 3a corresponding to a gas suction port when the catalytic recombining apparatus is steadily operated, is lower than the melting point of the substance used in the adhesion part 5b, which adheres the lid 4b of the opening 3b corresponding to the gas discharge port.

(B) The mass of each adhesion part 5a and 5b is adjusted so that the time required for melting the substance used in the adhesion part 5a, which adheres the lid 4a of the opening 3a when the catalytic recombining apparatus is steadily operated, is shorter than the time required for melting the adhesion part 5b which adheres the lid 4b of the opening 3b.

(C) The amount of heat generated in the heating elements 6a and 6b in contact with each adhesion part 5a and 5b is adjusted so that the time required for melting the adhesion part 5a, which adheres the lid 4a of the opening 3a when the catalytic recombining apparatus is steadily operated, is shorter than the time required for melting the adhesion part 5b which adheres the lid 4b of the opening 3b.

(D) A dashpot, which will be mentioned later (shown by 55 in FIG. 20), is installed to connect the lid 4b and the case 25a by the wire via. When the adhesion parts 5a and 5b are melted, the lid 4a is immediately opened after melting. However, since a great restriction is applied on the rotation speed of the lid 4b in which the dashpot is interposed, the lid 4b is slowly opened, so that a fixed time is required to fully open it. Thus the lid 4a of the opening 3a corresponding to the gas suction port is opened faster than the lid 4b of the opening 3b corresponding to the gas discharge port when the catalytic recombining apparatus is steadily operated.

(E) The flammable gas concentration sensor 27b in the case 25a is arranged so that it is separated from the gas atmosphere flowing into the case 25a until the catalyst in the case 25a of the first catalytic recombining apparatus is operated and a naturally circulating flow is formed.

According to any of the above-mentioned methods (A)–(E), first, the lid 4a is opened, with part of the atmosphere in PCV being introduced into the case 25a, and the lid 4b is opened after the lapse of a certain time. Thus, the gas passing through the case 25a is fixed in one direction, and the situation in which the gas flows from the opening 3b corresponding to the lid 4b into the case 25a, that is, the reverse-current phenomenon, can be strictly prevented.

Also, in FIGS. 12a and 12b, two catalytic recombining apparatuses are arranged, but the catalysts can be started in a more stepwise manner by increasing the number of catalytic recombining apparatus, if necessary, to 3, 4, and so on.

(Seventh Embodiment)

The seventh embodiment of the present invention has the structure of (E) mentioned in the above-mentioned sixth embodiment. In this embodiment, a gas sensor housing vessel for housing the flammable gas sensor 27b is installed in order to separate the flammable gas sensor 27b installed in the case 25a of the first catalytic recombining apparatus in the above-mentioned sixth embodiment from the atmosphere in the case 25a, while the gas passing through the case 25a forms a naturally circulating flow.

Figure 13:
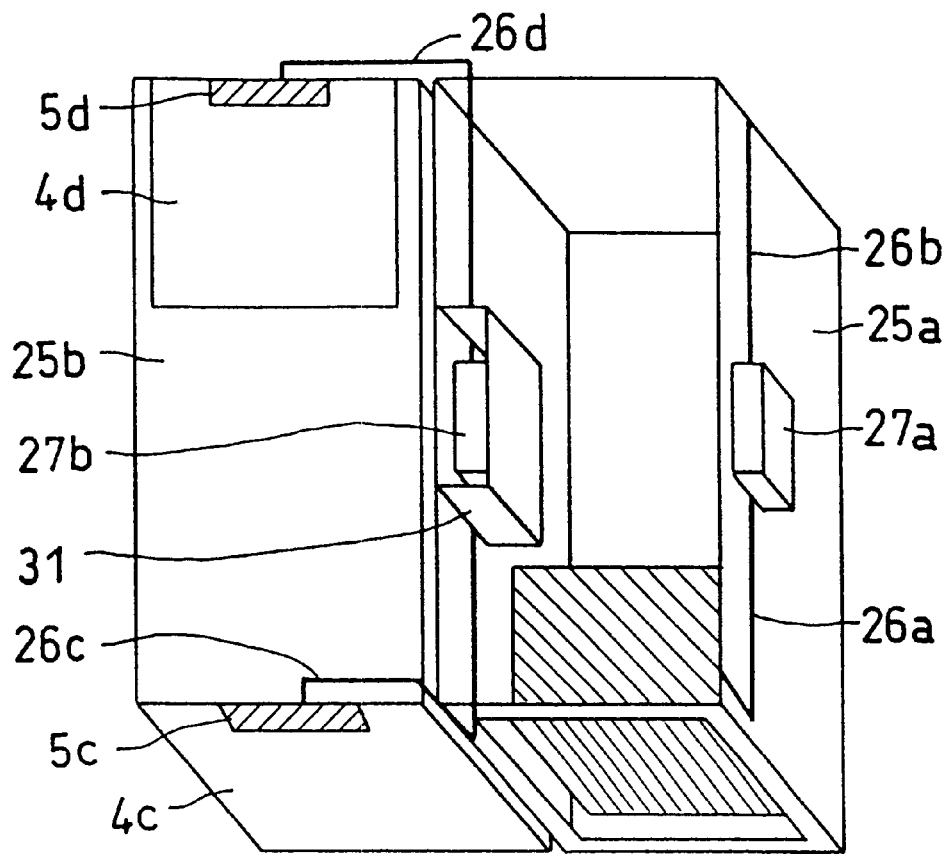
FIG. 13 is an oblique view showing part of the apparatus for removing a flammable gas, which is a seventh embodiment of the present invention.
Figures 14A, 14B:
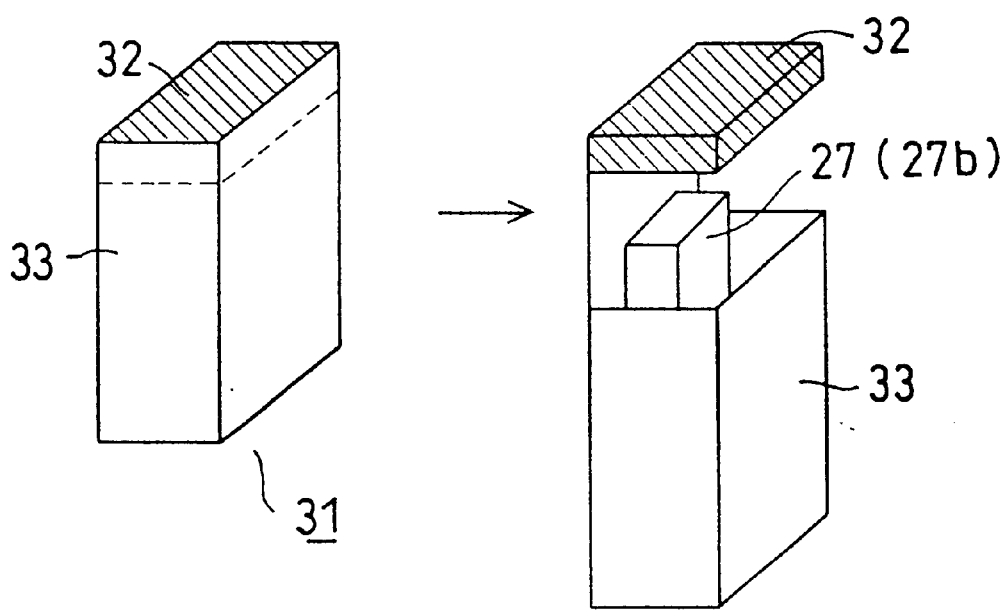
FIG. 14a is an oblique view showing a gas sensor housing vessel shown in FIG. 13.
FIG. 14b is an oblique view of when the gas sensor housing vessel in FIG. 14a is in a partially open state.

FIG. 13 is an oblique view showing the apparatus for removing flammable gas of this embodiment. In this figure, part of the case 25a, lids 4a and 4b, and gas sensor housing vessel 31 are omitted for explanation. FIGS. 14a and 14b are oblique views of the gas sensor-housing vessel 31 shown in FIG. 13. FIG. 14a shows a state in which the gas sensor housing vessel 31 is closed, and FIG. 14b shows a state in which the gas sensor housing vessel 31 is partially opened. This embodiment in FIG. 13 is similar to that of the above-mentioned sixth embodiment except for installing the housing vessel 31.

The gas sensor housing vessel 31 is usually in a closed state; however, if the first catalytic recombining apparatus is started and a catalytic reaction is advanced, the housing vessel 31 is heated by the heat of reaction and opened. FIG. 14a shows an example of the gas sensor housing vessel 31 to which a shape-memory alloy is applied. The gas sensor housing vessel 31 consists of an upper housing case 32 and a lower housing case 33. In the figure, as an example, the upper housing case 32 has a lid shape and is fixed to the inner wall of the case 25a; the lower housing case 33 installed under the upper housing case 32 has a vessel shape whose lid is the upper housing case 32. Of these, the upper housing case 32 shown by slanted lines in the FIGS. 14a and 14b is formed of the shape-memory alloy.

Under normal condition, the upper housing case 32 and the lower housing case 33 of the gas sensor housing vessel 31 are fitted and adhered to each other, and the flammable gas sensor 27b is completely separated from the atmosphere in the case 25a of the first catalytic recombining apparatus. However, if the concentration of the flammable gas in the atmosphere increases, the gas sensor housing vessel 31 is heated by the heat of reaction generated by the catalyst in the case 25a. If the shape memory alloy constituting the upper housing case 32 eventually reaches the transformation temperature, since the volume of the upper housing case 32 is reduced and a gap is formed between the upper housing case 32 and the lower housing case 33, the fitted state is released and, as shown in FIG. 14b, the lower housing case 33 moves downward. Thus, the internal flammable gas sensor 27b is exposed to the atmosphere of the gas circulating in the case 25a of the first catalytic recombining apparatus.

Figures 15A, 15B:
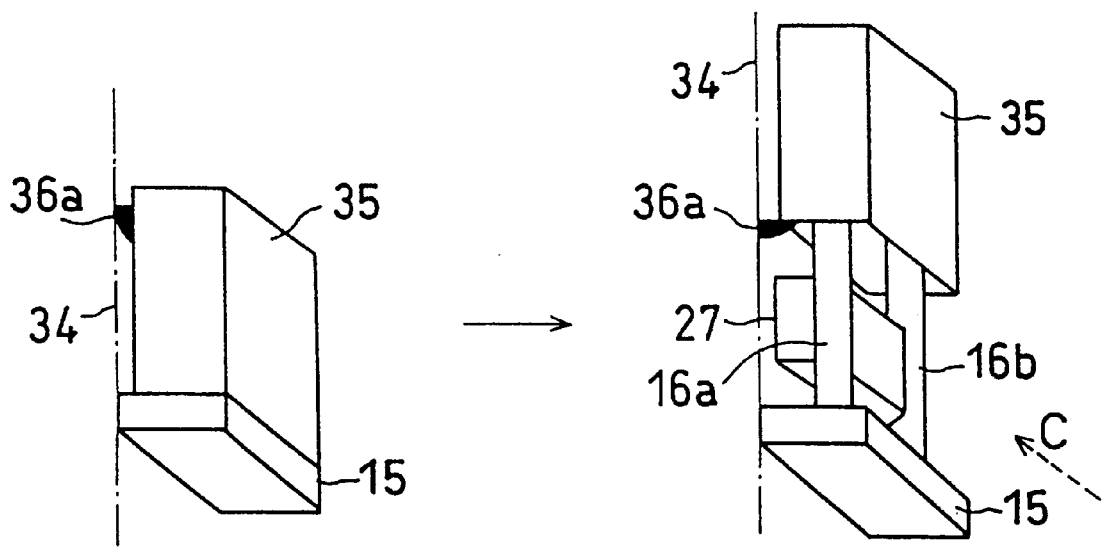
FIG. 15a is an oblique view showing a gas sensor housing vessel utilizing a substance for generating a noncondensable gas applied to the apparatus for removing a flammable gas of the seventh embodiment of the present invention.
FIG. 15b is an oblique view showing the case in which the gas sensor housing vessel in FIG. 15a is in a partially open state.
Figure 15C:
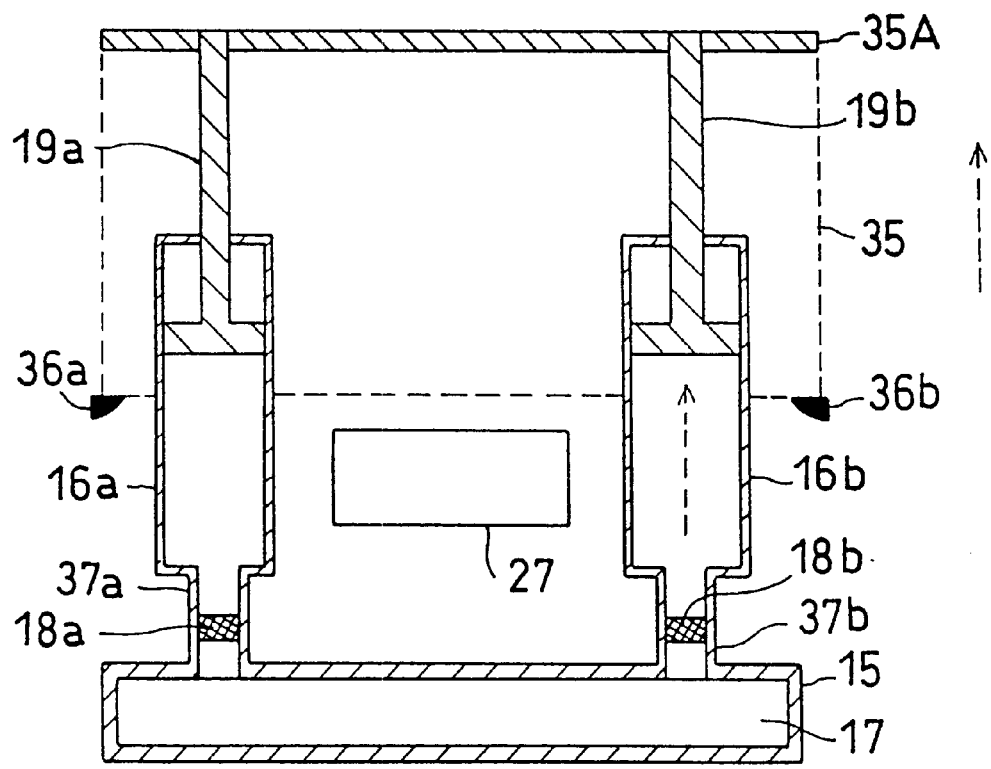
FIG. 15c is a side view observed from direction C in FIG. 15b.

The gas sensor housing vessel utilizes the properties of the shape-memory alloy; however, it is also appropriate that the gas sensor housing vessel is made of the substance for generating a noncondensable gas illustrated in the above-mentioned third embodiment. FIG. 15a is an oblique view showing the gas sensor housing vessel 35, FIG. 15b is an oblique view showing a state in which the gas sensor housing vessel 35 is in a closed state, and FIG. 15c is a front view showing the gas sensor housing vessel 35 observed from the direction C in FIG. 15b. Also, an alternating long and short dashed line 34 in FIGS. 15a and 15b shows a side surface level of the case 25a.

Gas sensor housing vessel 35 has an opening at the bottom. Also, the vessel 15 for housing the noncondensable gas generating substance 17, shown in FIG. 7, is fixed on the inner wall of the case 25a below the gas sensor housing vessel. The flammable gas sensor 27 is fixed on the inner wall of the case 25a. The flammable gas sensor 27 is usually placed in gas sensor housing vessel 35 and is separated from the atmosphere in the case 25a.

Also, the cylinders 16a and 16b equipped with the pistons 19a and 19b are installed via connection parts 37a and 37b above the vessel 15 for housing the substance for generating noncondensable gas. The tips of the pistons 19a and 19b are fixed to an upper surface 35A of the gas sensor housing vessel 35 in FIG. 15c.

If the vessel 15 for housing the substance for generating noncondensable gas is heated by a catalytic reaction in the case 25a of the first catalytic recombining apparatus, the noncondensable gas is generated from the substance 17. Thus the internal pressure of the cylinders 16a and 16b connected to the vessel 15 is raised, and the pistons 19a and 19b are driven upward. The pistons 19a and 19b push up the gas sensor housing vessel 35, so that the flammable gas sensor 27 is exposed to the gas circulating in the case 25a of the first catalytic recombining apparatus as shown in FIG. 15b or 15c.

Stoppers 36a and 36b in the FIG. 15c are installed on the side surface of the case 25a and that fix the position of the gas sensor housing vessel 35 which is once pushed up. If the gas sensor housing vessel 29 is once opened by the stoppers 36*a* and 36*b,* it is not closed again, so that even if the first catalytic recombining apparatus loses its function, it cannot cause problems in the starting of the second catalytic recombining apparatus.

While the first catalytic recombining apparatus functions sufficiently, the catalyst in the second catalytic recombining apparatus is separated from the gas atmosphere in PCV, so that the degradation of the catalyst due to the catalyst poison is prevented. Also, when the function of the first catalytic recombining apparatus is lowered and the concentration of the flammable gas in PCV reaches a preset threshold, the lids 4*c* and 4*d* installed at the opening of the second catalytic recombining apparatus are opened, and the catalytic reaction is started.

Thus, since the flammable gas can be continuously and stably removed by starting the catalytic recombining apparatus in several steps in accordance with the increase in the concentration of the flammable gas and the degradation of the catalyst, the atmosphere in PCV can be maintained at less than the flammability limit over the long term, even when the catalyst poison exists.

(Eighth Embodiment)

Figure 16:
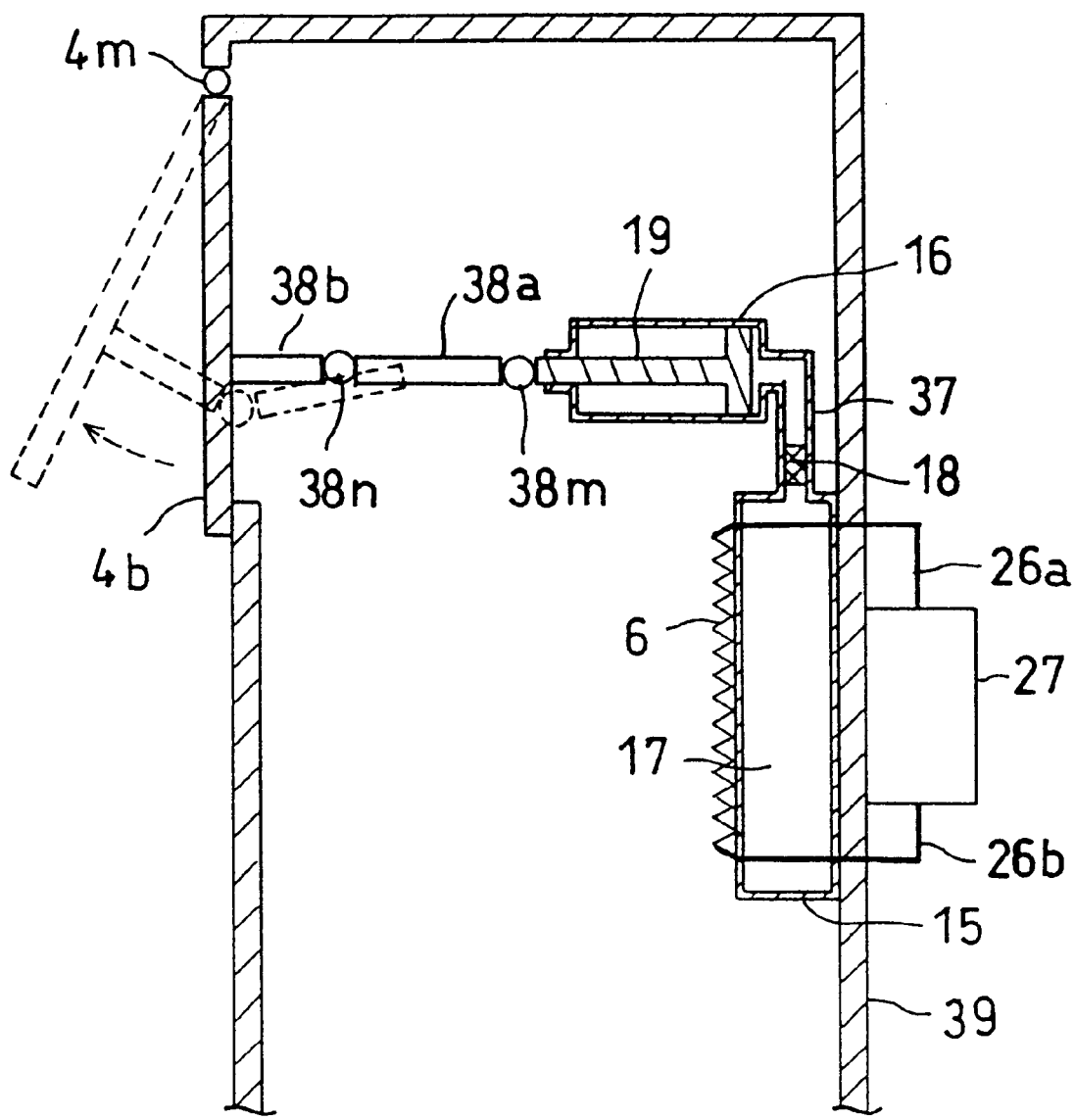
FIG. 16 is a cross section showing the apparatus for removing a flammable gas, which is an eighth embodiment of the present invention.

The eighth embodiment of the present invention pertains to an apparatus for removing flammable gas in which a flammable gas sensor and a substance for generating the noncondensable gas are combined. FIG. 16 is a sectional view of an apparatus for removing the flammable gas in the first application example of this embodiment.

In this application example, the flammable gas sensor 27 is installed on the outer side surface of a case 39 of the apparatus for removing flammable gas, and the vessel 15 for housing a substance 17 for generating noncondensable gas is installed on the inner side surface of the case 39. The heating element 6 is arranged on the surface of the vessel 15, and connected with the flammable gas sensor 27 outside of the case 39 via the lead wires 26*a* and 26*b* composed of an electroconductor The cylinder 16 is connected via the connection part 37 to the vessel 15 for housing the substance for generating a noncondensable gas, and the piston 19 in the cylinder 16 is connected with a support rod 38*a* via a joint 38*m*. The support rod 38*a* is connected to the support rod 38*b* with one end fixed to the lid 4*b* via a joint 38*n*.

If the concentration of the flammable gas in PCV increases, a current proportional to the concentration of the flammable gas flows to the heating element 6 from the flammable gas sensor 27. If the vessel 15 for housing the substance for generating the noncondensable gas is heated by the heating element 6, the substance 17 discharges the noncondensable gas, so that the internal pressure in the cylinder 16 is raised. Thereby, the piston 19 is driven, and the support rod 35*a* is pushed out to the side of the lid 4*b*. The support rods 35*a* and 35*b* are pushed out via the joints 38*m* and 38*n* as shown by broken lines in the FIG. 16, and the lid 4*b* is opened in the broken-line arrow direction of the FIG. 16.

If the substance 17 for generating the noncondensable gas cannot be sufficiently heated by only the current output from the flammable gas sensor 27, it is preferable to use the circuit shown in FIG. 11*a* for connecting the heating element 6 and the power source which is able to heat the substance for generating the noncondensable gas sufficiently when the concentration of the flammable gas reaches a preset threshold.

In this case, when a metal hydride-for generating hydrogen by heating is used as the substance for generating the noncondensable gas and a hydrogen sensor is applied as the flammable gas sensor, if the concentration of oxygen in PCV decreases and the catalytic reaction starts, the temperature of the metal hydride is lowered by holding, and the hydrogen discharged is reabsorbed by the metal hydride. As a result, the piston is operated in reverse to the previous case, and the lid 4*b* is closed.

With such a constitution, since the catalyst is exposed to the atmosphere containing the flammable gas only when the flammable gas concentration in the reactor containment vessel is high, an unnecessary exposure time to the catalyst poison is to a great extent eliminated, and the functional decrease in the catalyst due to the catalyst poison can be suppressed.

Figure 17:
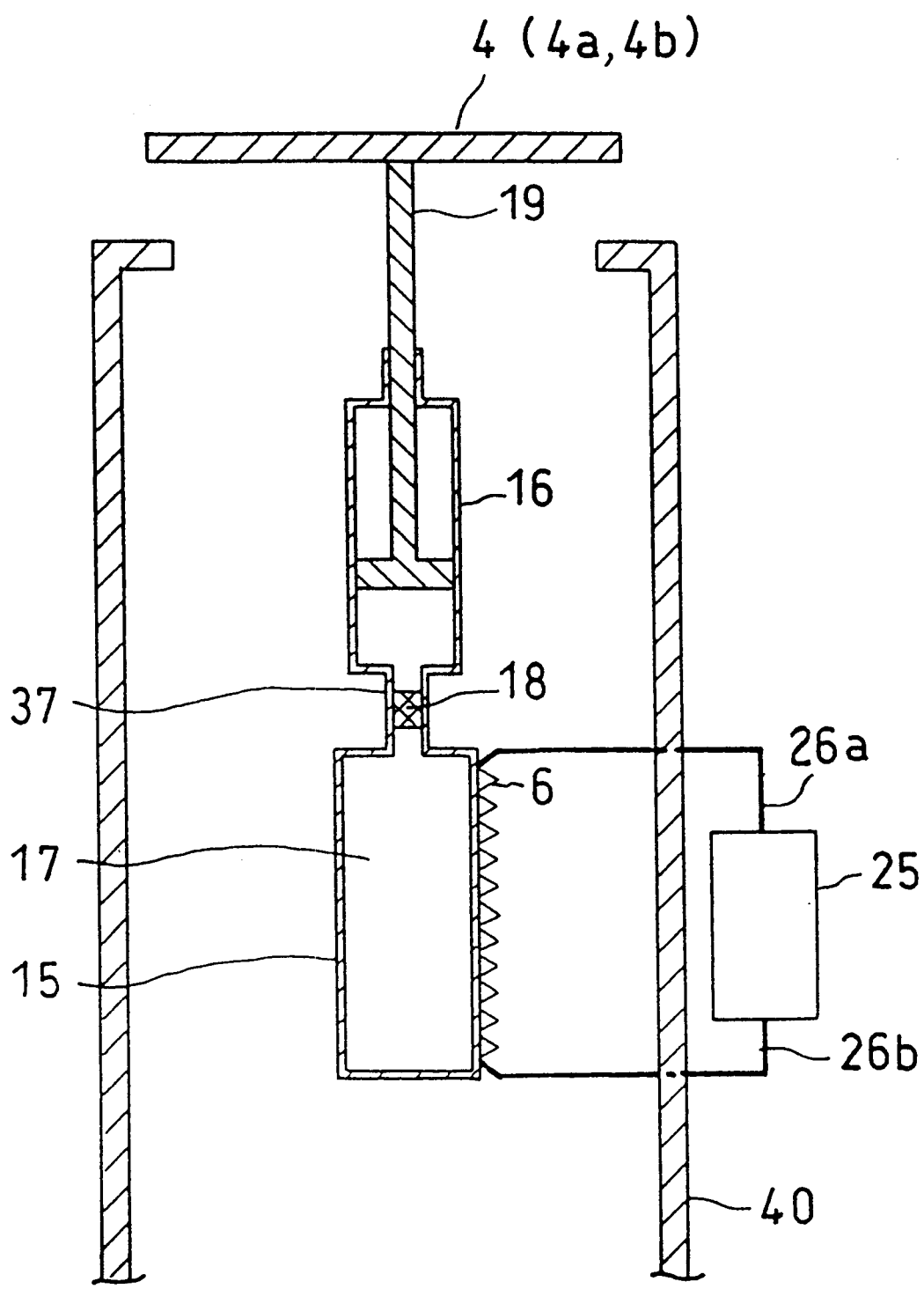
FIG. 17 is a cross section showing the apparatus for removing a flammable gas, which is also the eighth embodiment of the present invention.
Figure 18:
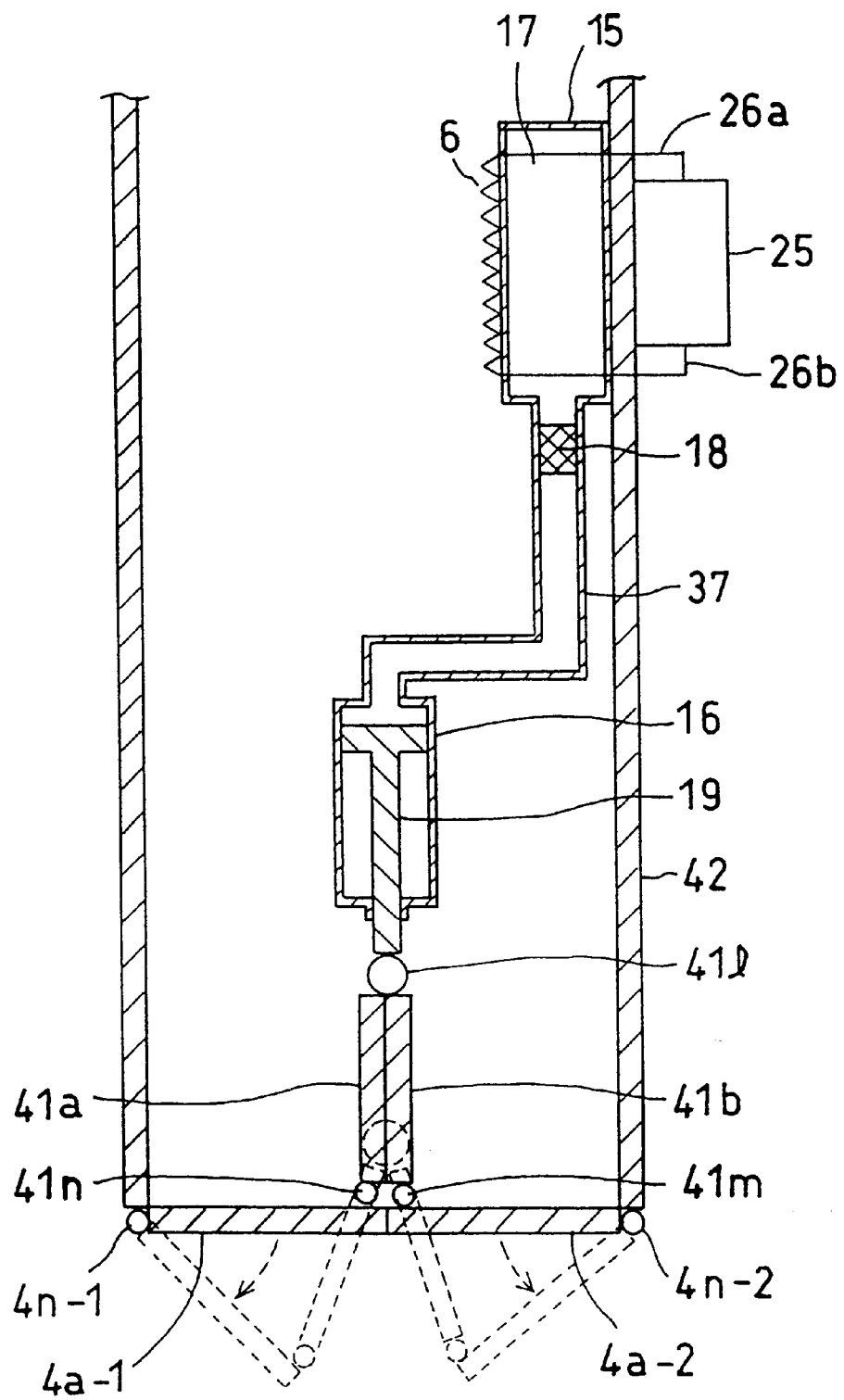
FIG. 18 is a cross section showing the apparatus for removing a flammable gas, which is also the eighth embodiment of the present invention.
Figure 19:
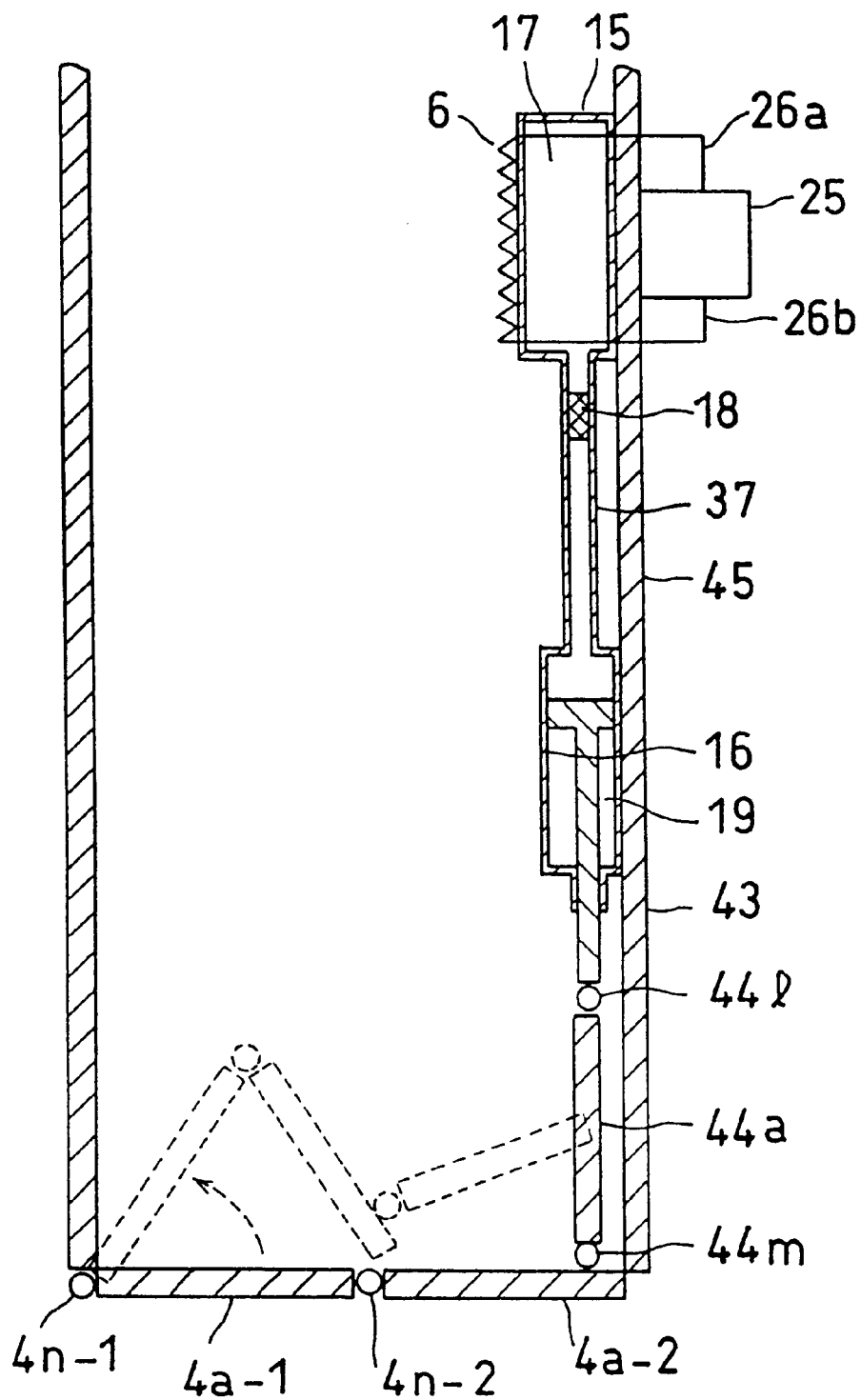
FIG. 19 is a cross section showing the apparatus for removing a flammable gas, which is also the eighth embodiment of the present invention.

Hereto, the constitution of FIG. 16 has been explained as the first application example of this embodiment, but apparatuses with various shapes for removing a flammable gas can be considered. FIGS. 17, 18, and 19 are respectively cross sectional views showing the apparatuses for removing the flammable gas, which are the second, third, and fourth application example of this embodiment.

The second application example of FIG. 17 assumes the case in which the lid 4 (either 4*a* or 4*b*) is positioned on the upper surface (or the lower surface) of a case 40. In this case, the piston 19 and the cylinder 16 are arranged perpendicularly to the lid 4, and the lid 4 is directly pushed up (or pushed down) by the piston 19.

The third application example of FIG. 18 assumes the case in which lids 4*a*-1 and 4*a*-2 opened and closed in the form of a door are positioned on the lower surface of a case 42. The cylinder 16 and the piston 19 are arranged perpendicularly to the lids 4*a*-1 and 4*a*-2, and the tip of the piston 19 is connected with support rods 41*a* and 41*b* via a joint 411. Each lid 4*a*-1 and 4*a*-2 can be opened and closed by lid rotating shafts shown by 4*n*-1 and 4*n*-2 and connected with the support rods 41*a* and 41*b* via joints 41*n* and 41*m*. With the action of the piston 19, these support rods 41*a* and 41*b* and the lids 4*a*-1 and 4*a*-2 are operated in the broken-line arrow direction of the figure, and the lids 4*a*-1 and 4*a*-2 are opened in the form of a door as shown by the broken lines in the figure.

The fourth application example of FIG. 19 assumes the case in which the lids 4*a*-1 and 4*a*-2, open and close in the form of a folding screen, are on the bottom of a case 45. The cylinder 16 and the piston 19 are arranged perpendicularly to the lids 4*a*-1 and 4*a*-2, and the tip of the piston 19 is connected with a support rod 44*a* via the joint 441. The lid 4*a*-1 is rotated by the lid rotating shaft 4*n*-1, and the lid 4*a*-2 is connected to the lid 4*a*-1 by the lid rotating shaft 4*n*-2 and connected to the support shaft 44*a* by a joint 44*m*. With the action of the piston 19, these lids 4*a*-1 and 4*a*-2 are operated in the broken-line arrow direction of the figure and opened in a folding screen shape as shown by the broken lines of the figure.

With these constitutions shown in FIGS. 17, 18 and 19, an effect similar to the above-mentioned first application example of this embodiment can also be obtained.

Also, in each cross section shown in FIGS. 16–19, needless to say, the vertically or horizontally reversed case of the cross sectional view or the cross sectional view rotated by 90° can be considered as an application example of this embodiment. Also, each support rod is not limited to a particular rod shape, as long as it is a part for supporting the lid.

(Ninth Embodiment)

Figure 20:
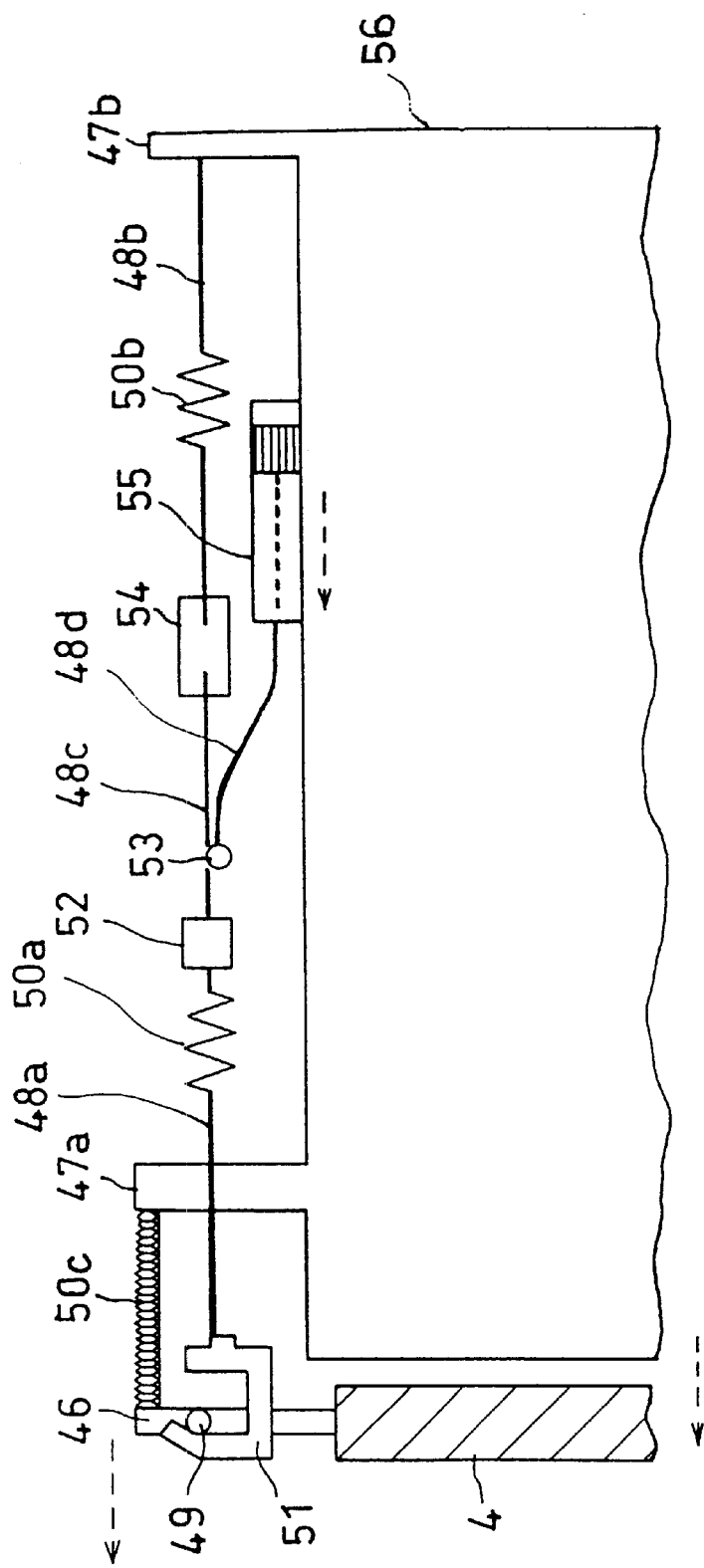
FIG. 20 is an enlarged front view showing the side surface circumference of the apparatus for removing a flammable gas, which is a ninth embodiment of the present invention.

This embodiment pertains to an apparatus for removing the flammable gas that can set a lid of a catalytic recombining apparatus to the open state by cutting off a wire at high temperature utilizing the heat-generation characteristic of the wire. FIG. 20 is an enlarged front view showing the side surface circumference of a case 57 of the apparatus for removing the flammable gas of this embodiment.

The opening mechanism of the lid of the apparatus for removing a flammable gas in this embodiment is explained below. A lug 46 is installed at the lid 4, and a columnar metal fitting 49 is installed at part of the lug 46, and lugs 47a and 47b are installed at the case 56. Of these, the lug 46 installed at the lid 4 and the lug 47a opposite to it are connected by a spring 50c.

A wire 48b is fixed to the lug 47b, with a spring 50b being interposed in the wire 48b. The other end of the wire 48b is connected with a wire 48c via a wire cutter 54. The wire 48c is connected with a wire 48a via an adjuster 52 for adjusting the wire length and a spring 50a. A U-letter type metal fitting 51 is installed at the other end of the wire 48a, with the metal fitting 51 being coupled with the metal fitting 49 fixed to the lug 46.

Two springs 50a and 50b interposed between the wires 48a, 48b, and 48c are installed to set the wires 48a, 48b, and 48c to a tight state by adjusting the tension, and the spring 50c is interposed between the lugs 46 and 47a and connects them. Thus, when the wires 48b and 48c are cut off at the installation position of the wire cutter 54, the tension of the wire 48a is eliminated, and as a result, the tension is exerted on the wire 48d.

The wire 48c between the wire cutter 54 and the adjuster 52 is branched into two forks at a branch point 53. And the wire 48d of the side at which the wire cutter 54 is not connected has a slight slackness and is connected to the dashpot 55 installed on the outer side surface of the case 2.

In order to cut the wires 48b and 48c at high temperature by the wire cutter 54, the wire cutter 54 is constituted by any of the following means.

(a) Expected cut parts of the wires 48b and 48c are formed from an organic polymer with a low melting point or a solder, with an oxidizing catalyst of hydrogen being arranged in contact with them.

Thus, the concentration of hydrogen and oxygen of the atmosphere in PCV is raised, and the catalyst installed at the expected cut parts of the wires is reacted so that the expected cut parts are melted and cut by the heat of reaction generated at that time.

(b) The expected cut parts of the wires 48b and 48c are formed from the organic polymer with a low melting point or solder, with a heating element being arranged in contact with them so that a circuit for connecting the heating element and the power source is constituted as shown in FIGS. 11a and 11b, for instance. A switch element is installed in the circuit, with a flammable gas sensor for controlling switching of the switch element also being installed.

Thus, if the concentration of the flammable gas in PCV is raised, a current proportional to the gas concentration is output from the gas sensor; if the current exceeds a preset threshold, the switch of the circuit. for connecting the heating element and the power source is turned on, so that power is supplied to the heating element, thereby melting and cutting the expected cut parts of the wires.

(c) The expected cut parts of the wires 48b and 48c are formed from the organic polymer with a low melting point or solder, with a vessel containing a hydrogen occlusion alloy being arranged in contact with them. The gas in the hydrogen occlusion alloy housing vessel is connected to the atmosphere in PCV via a filter.

Thus, if the concentration of hydrogen in PCV is raised, the hydrogen occlusion alloy absorbs the hydrogen and generates heat. Utilizing the heat generated, the expected cut parts of the wires are melted and cut.

According to the wire cutter 54 constituted by any. of above-mentioned (a), (b), and (c), if the concentration the flammable gas concentration of the atmosphere in PCV reaches a specified value, the wires 48b and 48c are cut at the parts of the cutter 48 by the heat generated. The spring 56 connected to with the lugs 46 and 47a is operated by the cutting, and a certain force is exerted in the opening direction of the lid 4 shown by a broken line arrow in the figure. Thus tension is exerted on the wire 48d and a piston, which is not shown in the figure, in the dashpot 55 receives a load in the direction (shown by a broken line arrow in the figure) of the wire 48d by the wire 48d in a completely pulled state.

Since fine holes are installed in the piston of the dashpot 55, the displacement of the piston depends on the volume of the air or fluid passing through the fine holes. Therefore, in general, the piston of the dashpot 55 operates slowly, and when the piston reaches a certain specified displacement, the tension of the wire 48d is zero.

When the piston of the dashpot 55 is slowly operated until reaching the specified displacement, the metal fitting 51 is coupled with the metal fitting 49 of the lug 46 by the tension of the wire 48d, with the coupled part of the metal fitting 51 being pressed against the metal fitting 49. If the tension of the wire 49 is eventually lost, the coupling state of these two metal fittings 49 and 51 is released, with the metal fitting 49 being slipped and dropped from the metal fitting 51. As a result, the lid 4 is opened by its own weight.

The amount of piston moved per unit time can be increased and decreased by adjusting the design of the dashpot 55, its piston, and the fine holes formed in said piston. So the time from the cutting of the wires 48b and 48c to opening of the lid 4 can be optionally set.

According to this embodiment, when the concentration of the flammable gas in PCV exceeds a prescribed concentration, the lid of the catalytic recombining apparatus is opened with a certain time delay, and the exposure timing of the catalyst to the catalyst poison can be delayed as much as the time delay.

Also, for example, with the use of this embodiment as a means for opening the lid 4d of the opening corresponding to the gas discharge port of the second catalytic recombining apparatus for removing the flammable gas shown in FIG. 12 in the fifth embodiment of the present invention, an erroneous opening of the lid 4d of the second catalytic recombining apparatus, which is caused by the reverse current of the atmosphere in PCV when the lids 4a and 4b of the first catalytic recombining apparatus are opened, can be prevented.

(Tenth Embodiment)

In each of the above-mentioned embodiments, particularly when the oxygen sensor is used as a flammable gas sensor, the lid of the catalytic recombining apparatus is likely to be erroneously opened when it is necessary to raise the concentration of oxygen at the time of the periodic inspection of the atomic reactor compared with a normal case. The tenth embodiment of the present invention pertains to a structure for preventing such an erroneous opening of the lid at the time of periodic inspection.

Figure 21A:
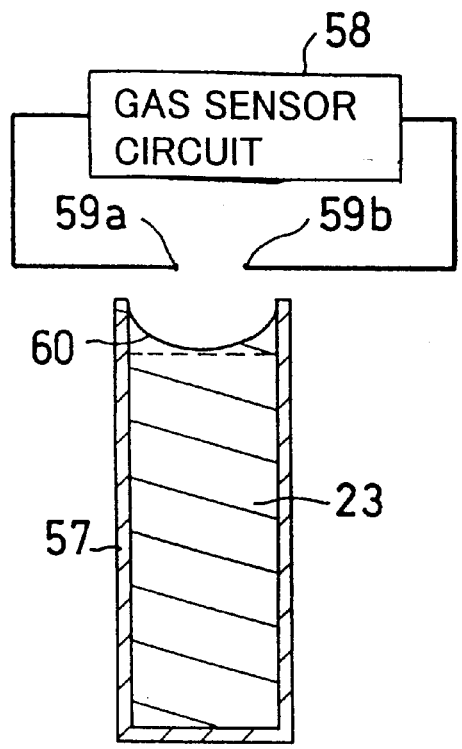
FIG. 21a is an outlined constitutional diagram showing the OFF state of a start switch of a flammable gas sensor of the apparatus for removing a flammable gas of the ninth embodiment of the present invention.
Figure 21B:
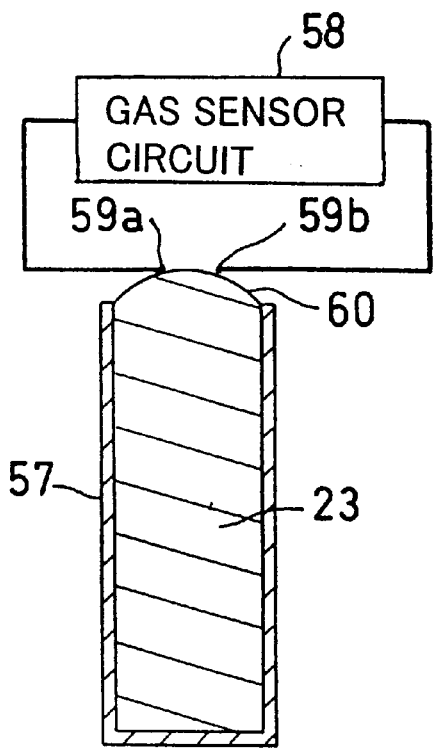

FIGS. 21a and 21b are outlined constitutional diagrams showing a start switch of the flammable gas sensor of the apparatus for removing a flammable gas of PCV of this embodiment. In a gas sensor circuit 58 formed by the flammable gas sensor 27, at least one part is intentionally disconnected at terminals 59a and 59b. In the figures, the gas sensor circuit 58 denotes a part that is not disconnected in the gas sensor circuit.

The hydrogen occlusion alloy housing vessel 57, which houses the hydrogen occlusion alloy 23 and also serves as a filter, is installed in the vicinity of the terminals 59a and 59b of the gas sensor circuit 58. The surface opposite to the terminals 59a and 59b of the hydrogen occlusion alloy housing vessel 57 is formed from an electroconductive thin film 60 which can be deformed by the internal pressure of the hydrogen occlusion alloy housing vessel 57.

As shown in FIG. 21a, under normal conditions, that is, when the concentration of hydrogen in the surrounding atmosphere is low, although the electroconductive thin film 60 is adjacent to the terminals 59a and 59b, the film 60 does not contact them. On the other hand, if the concentration of hydrogen in the atmosphere is raised, as shown in FIG. 21b, as the hydrogen occlusion alloy 21 absorbs the hydrogen of the atmosphere and the volume is expanded, the electroconductive thin film 60 is pushed to the outside, so that the terminals 59b and 59b and the electroconductive thin film 60 are contacted. As a result, the circuit of the flammable gas sensor is completely connected and started.

Also, although the concentration of hydrogen in the atmosphere decreases and the volume of the hydrogen occlusion alloy 23 decreases, since the electroconductive thin film 60 deformed once maintains its shape, the circuit 58 of the flammable gas sensor is not disconnected again.

With such a constitution, an erroneous opening of the lid of the catalytic recombining apparatus due to the oxygen concentration increase at the time of periodic inspection, can be suppressed and the power consumption of the flammable gas sensor on standby can be reduced.

Figure 22A:
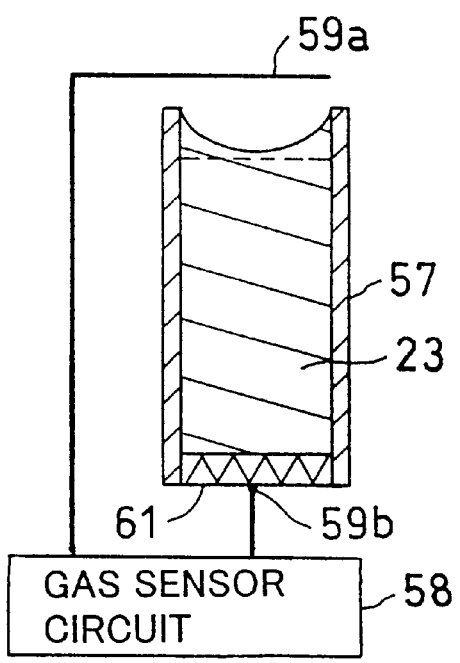
FIG. 22a is an outlined constitutional diagram showing the OFF state of the start switch of the flammable gas sensor of the apparatus for removing a flammable gas of the ninth embodiment of the present invention.
Figure 22B:
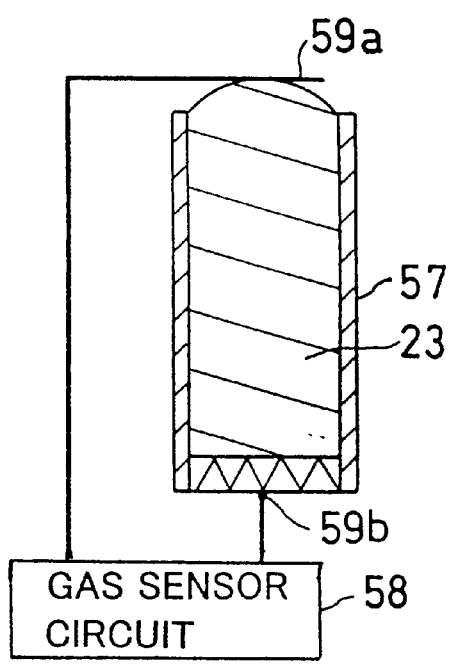

A modified example of this embodiment is shown in FIGS. 22a and 22b. The surface of the hydrogen occlusion alloy housing vessel 57 opposite to the surface formed from the electroconductive thin film 60 is made of an electroconductor 61; the electroconductor 61 is connected with one end 59b of the circuit of the flammable gas sensor. On the other hand, the other end 59a of the flammable gas sensor is installed adjacently to the electroconductive thin film 60; however, as shown in FIG. 22a, the gas sensor circuit 58 and the electroconductive thin film 60 are set so that they do not make contact with each other under normal conditions. Here, particles of the hydrogen occlusion alloy 23 are coated with an electroconductive substance. At that time, as the coating substance, in particular, copper is appropriate.

If the concentration of hydrogen of the atmosphere increases and the volume of the hydrogen occlusion alloy 23 is expanded, the electroconductive thin film 60 and one end 59a of the gas sensor circuit 58 make contact with each other. Thus, the coating substance of the hydrogen occlusion alloy 23 sends a current, so that the circuit of the flammable gas sensor 27 is newly formed. Also, the circuit is automatically cut off if the concentration of hydrogen is decreased and the volume of the hydrogen occlusion alloy 21 is reduced.

Therefore, in this case, since the switch of the flammable gas sensor is turned on only when the concentration of hydrogen in PCV increases, an erroneous opening of the lid of the catalytic recombining apparatus of the apparatus for removing the flammable gas during the periodic inspection can be prevented.

(Eleventh Embodiment)

The eleventh embodiment of the present invention pertains to the shape of the oxidizing catalyst of hydrogen present in the apparatus for removing the flammable gas in each of the above-mentioned embodiments. The catalyst is constituted in a cartridge shape that is easily handled. FIGS. 23a–23g are schematic cross sectional view showing the shape of the catalyst cartridge.

As the catalyst cartridge, there is a special cartridge filled with the catalyst molded in a small ball shape and a cartridge in which the catalyst is spread on a sheet. In this embodiment, the heating element is arranged adjacently to the catalyst. When the catalyst is molded in a small ball shape, the heating element is also molded in a small ball shape 53 and filled into the special cartridge. A catalyst ball 62 is shown by a black circle and a heating elementball 63 is shownbyawhite circle in FIGS. 23a–23g.

A catalyst ball cartridge 64 constituted by filling the catalyst ball 62 and a heating element ball cartridge 65 constituted by filling the heating element ball 63 are arranged so that the heating element ball cartridge 65 is interposed between the catalyst ball cartridges 64. FIG. 23a is a cross sectional view of this case.

As shown in FIG. 23b, they are arranged so that the catalyst ball cartridge 64 is interposed between the heating element ball cartridges 65. As shown in FIG. 23c, the catalyst ball 62 and the heating element ball 63 may also be mixed and filled into one cartridge.

As a method using a small ball-shaped substance and a sheet, as shown in FIG. 23d, it is considered that a heating element sheet 66 constituted by molding the heating element in a sheet or plate shape is arranged so that it is interposed between the catalyst ball cartridges 64 constituted by filling the catalyst ball 63. As shown in FIG. 23e, a catalyst sheet 67 constituted by molding the catalyst in a sheet or plate shape may also be arranged so that it is interposed between the heating element ball cartridges 65 constituted by filling the heating element ball 63.

Also, as shown in FIGS. 23f and 23g, the heating element sheet 66 constituted by molding the heating element in a sheet shape and the catalyst sheet 67 may be arranged so that they are attached to each other. Furthermore, there is a method that mixes the catalyst and the heating element and forms a catalyst-heating element mixed sheet or a method that molds a mixture of the catalyst and the heating element in a ball shape and fills it as a catalyst-heating element mixed ball into the cartridge, although it is not shown in the figure.

As the heating element of this embodiment, a calcium oxide or hydrogen occlusion alloy is appropriate. When the heating element is calcium oxide, since the calcium oxide has a certain level of moisture absorption, with a combination of any of the above-mentioned first to tenth embodiments of the present invention, under normal conditions where the apparatus for removing the flammable gas is not used, it is desirable to separate the calcium oxide from the gas atmosphere in PCV.

In this case, if the lid of the case of the apparatus for removing the flammable gas is opened and the gas atmosphere in PCV is introduced into the case, calcium hydroxide is generated by an exothermic reaction of the vapor and calcium oxide included in the gas atmosphere.

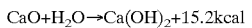

$$CaO+H_2O \rightarrow Ca(OH)_2+15.2kcal$$

The catalyst layer is heated by the exothermic reaction, so that the catalyst is activated. Furthermore, since iodine, which is a catalyst poison, reacts with hydrogen on a Pt catalyst at 300° C. or higher and forms HI, poisoning of the catalyst by the iodine, that is, the catalytic activation degradation, can be prevented by selectively adsorbing the iodine.

Also, if water droplets are present on the catalyst surface, the catalytic activation is markedly lowered; however, with the use of calcium oxide, the water droplets can be prevented from attaching onto the catalyst surface before the temperature of the catalyst surface is raised.

If the catalyst surface temperature increases and reaches about 580° C., water molecules are discharged from the calcium hydroxide and recycled to the calcium oxide. Since the reaction is endothermic, opposite to the reaction shown in the above-mentioned chemical reaction equation, the catalyst temperature can be strictly prevented from being abnormally raised and exceeding the ignition point.

Also, the calcium oxide and calcium hydroxide in these reactions are absorbents of carbon dioxide and prevent the decrease in pH of the water of the suppression pool in PCV due to the carbon dioxide, so that the iodine, which is a catalyst poison, can be prevented from revolatilizing from the suppression pool.

Also, even when sodium oxide is used instead of calcium oxide, an effect that is almost the same as the above-mentioned one is exerted.

On the other hand, when the hydrogen occlusion alloy is used as the heating element, if the concentration of hydrogen in PCV increases, the catalyst is heated by the hydrogen absorption reaction of the hydrogen occlusion alloy. Poisoning of the catalyst due to the iodine can be suppressed by the increase in the temperature of the catalyst.

(Twelfth Embodiment)

In the twelfth embodiment of the present invention, the catalyst for reacting the flammable gas used in the above-mentioned first to eleventh embodiments is composed of at least two kinds of catalytic substances, and at least one of these is used to advance the oxidation reaction of hydrogen at normal temperature. As the catalyst for advancing the oxidation reaction of hydrogen at normal temperature, platinum and palladium are appropriate.

Apart from the substance for advancing the oxidation reaction of hydrogen at normal temperature, at least one kind selected from oxide catalysts such as $Co_3O_4$, $Ag_2O$, $MnO_2$, and CuO, which are relatively inexpensive substances, or an Ag catalyst, is used. These catalytic substances do not react at normal temperature, and preheating of these is required to start a reaction. Accordingly, first, the reaction is started using platinum or palladium for advancing the reaction at normal temperature, and the reaction is continued by heating an oxide catalyst or silver catalyst by way of the catalytic heat of reaction.

Thus, with a combination of the catalyst, which is inexpensive but has a high reaction-start temperature, and the catalyst, which advances the oxidation reaction of hydrogen at normal temperature, the cost can be reduced without lowering the effect of the catalyst.

Also, since some of the above-mentioned inexpensive catalyst is sensitive to vapor, the degradation of the catalyst function is prevented by applying the additional method to this embodiment. The additional method is circulating the gas, from which vapor discharged from the heat removal system in PCV is removed, in the catalyst layer in the case with catalyst, or protecting the catalyst from vapor by installing a dehumidifier in the case or in the vicinity of the outside.

When the dehumidifier is used, the calcium oxide explained in the eleventh embodiment is appropriate. Also, the method using the calcium oxide applied by the method in the eleventh embodiment together with two or more catalysts in this embodiment is effective.

(Thirteenth Embodiment)

The thirteenth embodiment of the present invention pertains to the shape of a carrier for carrying a catalyst installed in the case in the apparatus for removing the flammable gas of each of the above-mentioned embodiments. FIGS. 24a and 24b are perspective diagrams showing the catalyst of the apparatus for removing the flammable gas of this embodiment.

A carrier 70 for the catalyst shown in FIG. 24a is formed as a porous columnar body 68 in which a catalyst is molded in a columnar shape with fine holes included, with a cavity-shaped gas flow passage 69, constituted by a columnar cavity and that circulates the atmosphere in it, installed. Such a configuration is so-called the honeycomb shape.

As the catalyst of the carrier 70, $Al_2O_3$ or $SiO_2$ is appropriately used. In addition, any of the substances mentioned in detail in the above-mentioned twelfth embodiment may also be used. It is appropriate to arrange the substance into the apparatus for removing the flammable gas of the above-mentioned embodiments so that the columnar body 68 is almost vertically installed.

Figure 25:
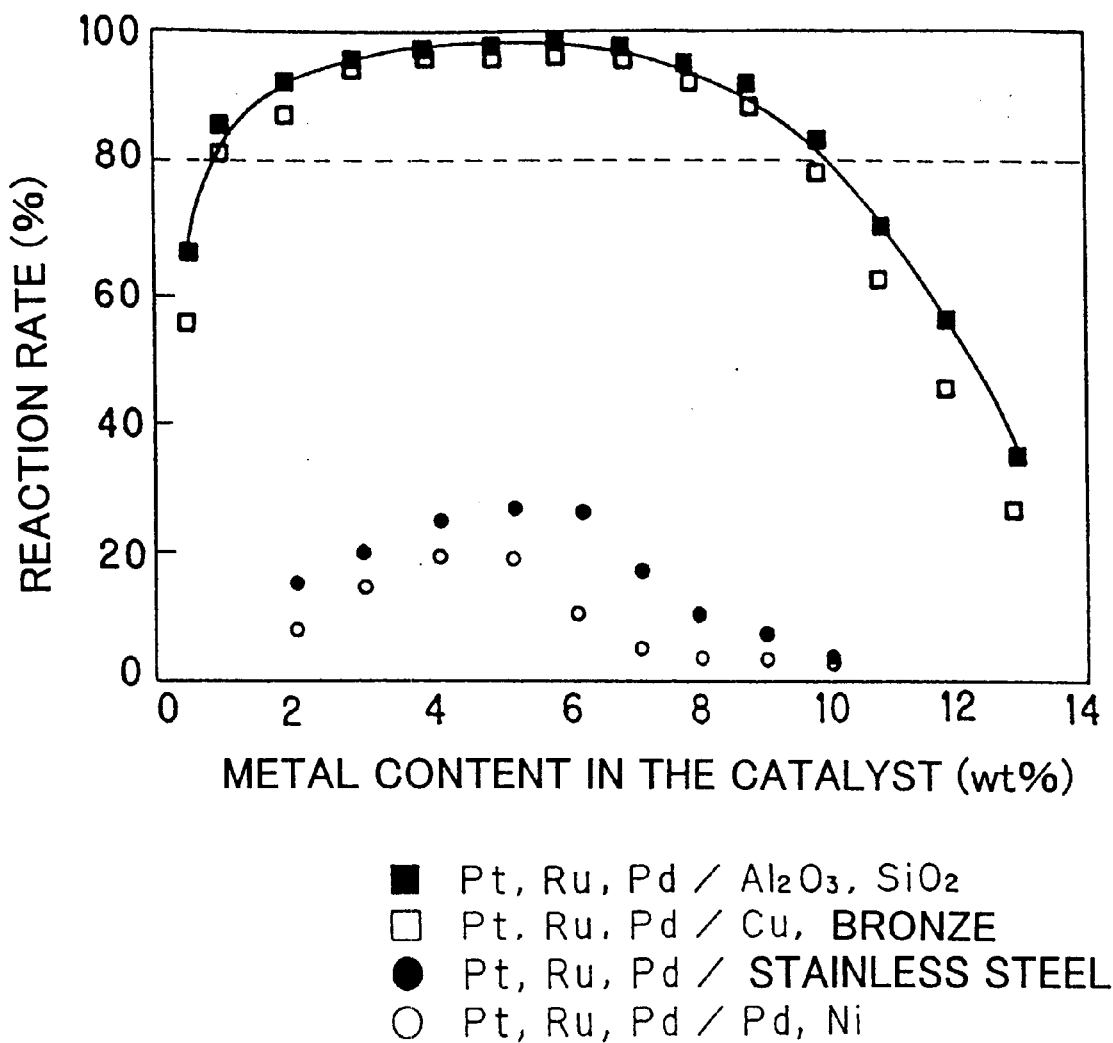
FIG. 25 is a graph showing the relation between the weight ratio of a metal catalyst included in the catalyst body of the thirteenth embodiment of the present invention and the reaction rate of the recombination reaction of hydrogen and oxygen.

Also, as mentioned in the twelfth embodiment, it is appropriate to carry at least one of platinum, ruthenium, or palladium used as a catalyst metal on carrier 70. FIG. 25 shows the content ratio of the catalyst carrier 70 and a metal selected from at least one of platinum, ruthenium, or palladium included in the carrier and its reaction rate, which pertains to the oxidation reaction of hydrogen.

As shown in FIG. 25, it is understood that as the catalyst carrier, in particular, it is appropriate to use $Al_2O_3$ or $SiO_2$. Also, when the metal content rate in the catalyst is between 1 wt % to 10 wt %, in particular, the reaction rate is 80% or more, so that the catalytic effect appears to reach a maximum. On the contrary, if the metal content rate is less than 1 wt % or more than 10 wt %, the catalytic activation is lowered.

Figure 26:
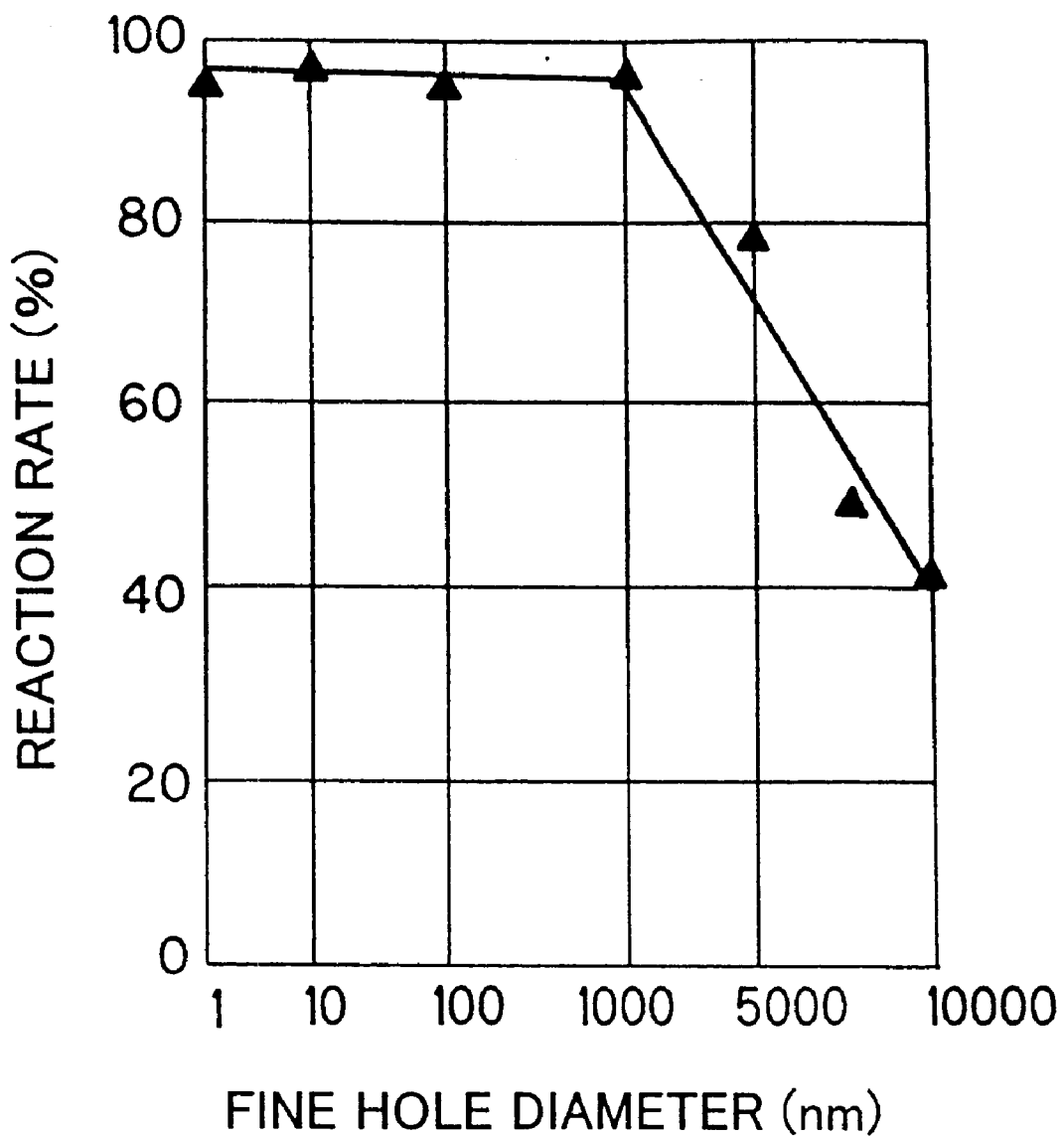
FIG. 26 is a graph showing the relation between the fine-hole diameter of a porous columnar body constituting the catalyst body of the thirteenth embodiment of the present invention and the reaction rate of the recombination reaction of hydrogen and oxygen.

FIG. 26 is a graph showing the relation between the fine-hole diameter and the reaction rate of a catalyst body constituted by several porous columnar bodies 69 shown in FIG. 24a. FIG. 26 shows the case wherein $Al_2O_3$ or $SiO_2$ is used as the porous columnar body 69, which is a matrix of the catalyst. As shown in FIG. 26, if the diameter of the fine hole in the porous columnar body 69 is more than 1000 nm, the catalytic performance is markedly lowered. Therefore, the fine-hole diameter is preferably in the range between 1 nm and 1000 nm.

Also, instead of $Al_2O_3$ or $SiO_2$, using copper or bronze as the catalyst carrier is considered. According to FIG. 25, although the catalytic performance is almost equal or slightly inferior to the case wherein $Al_2O_3$ or $SiO_2$ is used as the catalyst carrier, using copper or bronze, a relatively high catalytic performance is exhibited. On the other hand, if stainless steel, lead and nickel are used as a metal constituting the carrier, the catalytic activation is greatly lowered.

Also, in this embodiment, as shown in FIG. 24b, a catalyst body 71 constituted by arranging a catalyst carrier 72 molded in a columnar shape by iron can also be adopted in connection with the porous columnar body 68 composed of the catalyst. In a catalyst carrier 72 made of iron, a passage is installed in connection with the cavity-shaped gas flow passage 69 installed in the porous columnar body 68 and circulating gas.

The catalyst carrier 72 carries another porous columnar body 68 composed of the catalyst and is usually positioned at the side lower than the porous columnar body 68. The iron is arranged upstream of the flow passage of the gas circulating in the gas flow passage 69. In this case, it is preferable that the specific surface area of the catalyst carrier 72 made of iron is arranged over 500 $m^2/g$, because of the same reason of the case using carbon as the catalyst carrier explained below.

Thus, when the gas containing oxygen circulates as the atmosphere in PCV into the passage 69, it first passes through the oxidation reaction by the iron to form the catalyst carrier 72 and is then guided to the catalyst. The iron is transformed into iron oxide by the oxidation, with the exothermic reaction. Then the catalyst positioning above the catalyst carrier 72 is heated, so that the recombination reaction of hydrogen and oxygen is promoted.

Also, in the catalyst body 71, calcium oxide is included in a particle shape in the catalyst. The calcium oxide particles 73 has, as mentioned in the above-mentioned eleventh embodiment, the function of preventing poisoning of the catalyst due to iodine by selectively adsorbing said iodine. As the particles, sodium oxide may be used.

Figure 27:
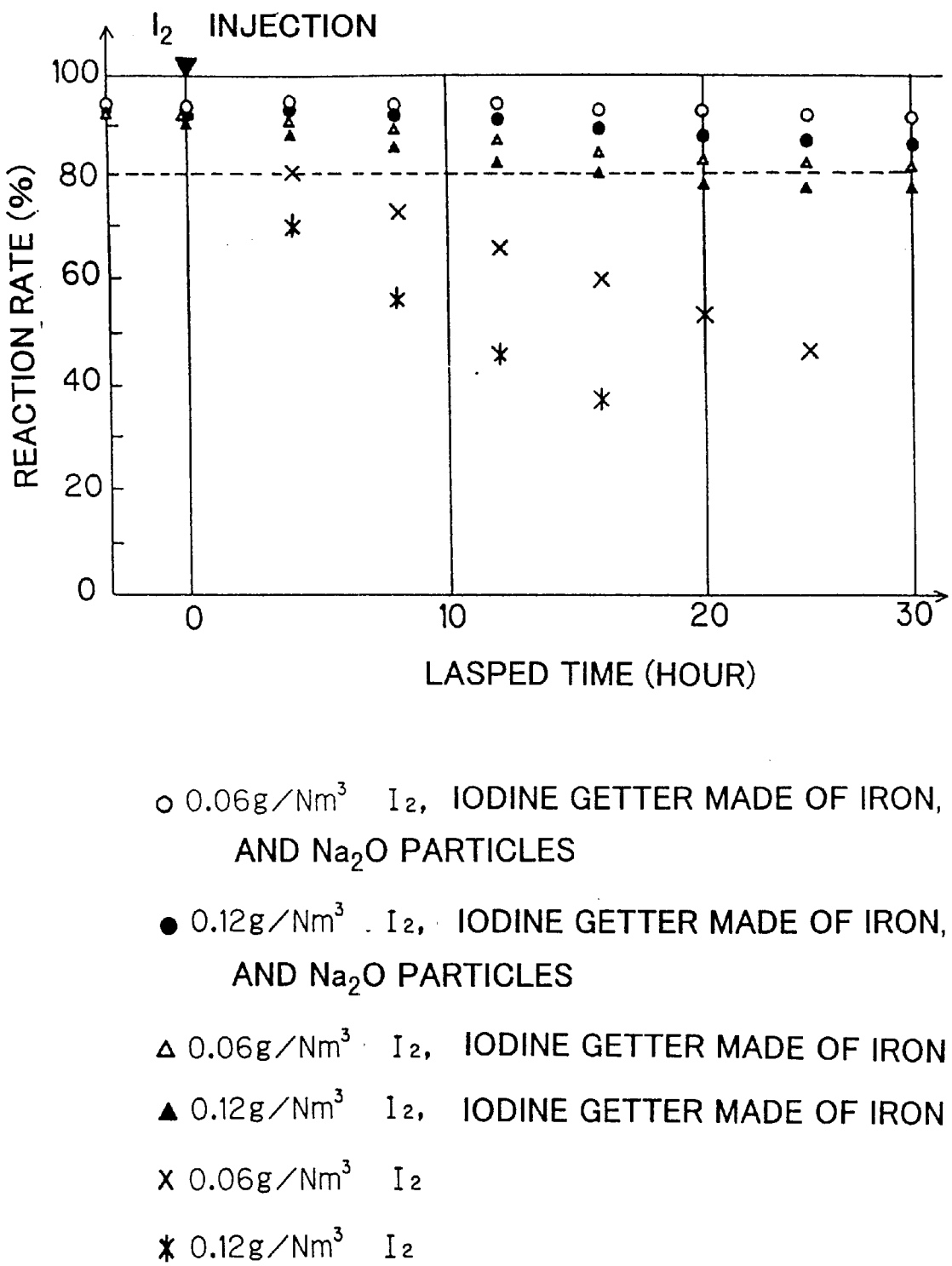
FIG. 27 is a graph showing the time lapse with the reaction rate of the recombination reaction of hydrogen and oxygen, which shows the effect of iodine adsorption by iron and sodium oxide (or calcium oxide) in the thirteenth embodiment of the present invention.

The iron constituting the catalyst carrier 72 has the effect of preventing the catalyst performance degradation due to the iodine adsorption by efficiently adsorbing onto the iodine circulating in the passage 69. FIG. 27 is a graph showing the iodine adsorption effect of iron. As shown in FIG. 27, when the iodine injection is started, the reaction rate of the recombination reaction of hydrogen and oxygen is shifted to a high level over the long term by passing through the catalyst carrier 72 made of iron. As shown in FIG. 27, with the combination of iron and sodium oxide (or calcium oxide), the reaction rate can be maintained at a high level.

Figure 28:
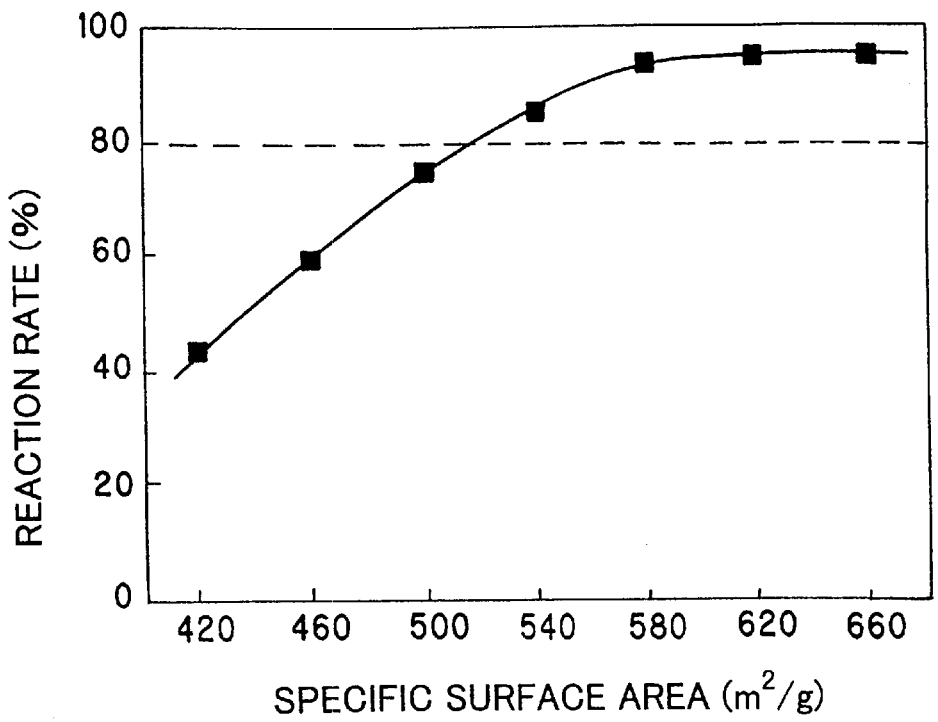
FIG. 28 is an enlarged cross section showing the surface of a catalyst carrier of the apparatus for removing a flammable gas, which is a fourteenth embodiment of the present invention.

In this embodiment, it is also preferable to use active carbon instead of iron as the catalyst carrier 72. Active carbon functions efficiently as the means of selectively adsorbing iodine and protecting the catalyst. FIG. 28 is a graph showing the relation between the specific surface area of an active carbon included in the catalyst body and the reaction rate of the recombination reaction of hydrogen and oxygen.

As shown in FIG. 28, the reaction rate is over 75% when the specific surface area is over 500 $m^2/g$. Thus, the effect of the catalyst can be preferably maintained without degrading the catalyst performance by setting the specific surface area to the preferable range. And more prefer situation is that the specific surface area is more than 540 $m^2/g$, so that the reaction rate is over 80% .

Figure 29:
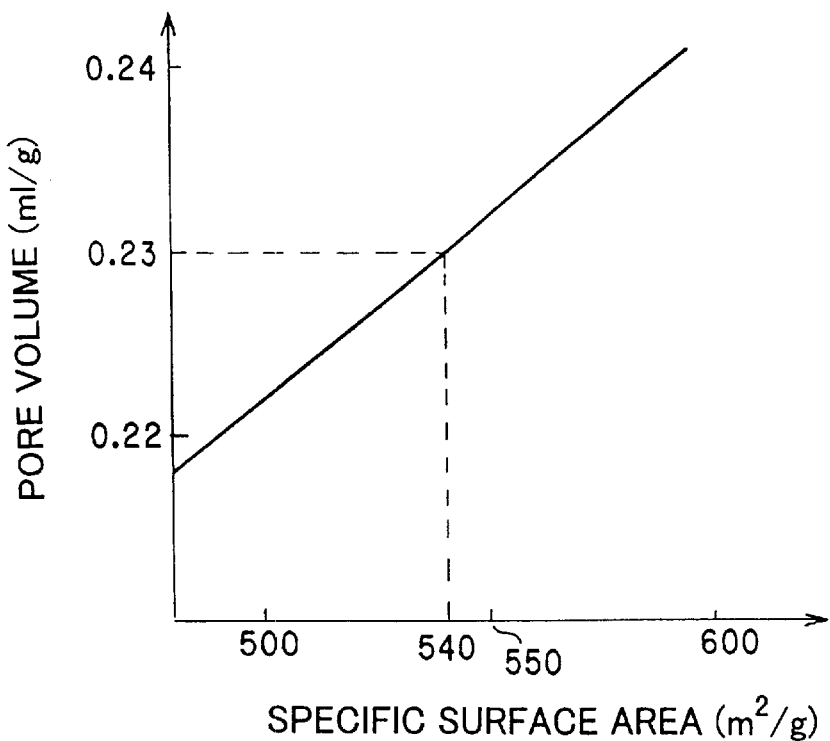
FIG. 29 is a graph showing the relation between the specific surface area of an active carbon included in the catalyst body of the fourteenth embodiment of the present invention and the reaction rate of the recombination reaction of hydrogen and oxygen.

FIG. 29 is a graph showing the relation between the specific surface area of the active carbon included in the catalyst body and the pore volume of the active carbon. According to FIG. 29, it is preferable that the pore volume of the active carbon is set over 0.23 ml/g, so that the specific surface area is over 540 $m^2/g$.

(Fourteenth Embodiment)

Figure 30:
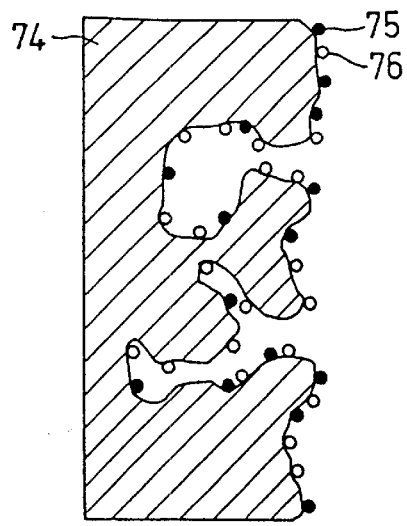
FIG. 30 is a graph showing the relation between the specific surface area of an active carbon included in the catalyst body of the fourteenth embodiment of the present invention and the pore volume of the active carbon.
Figure 31:
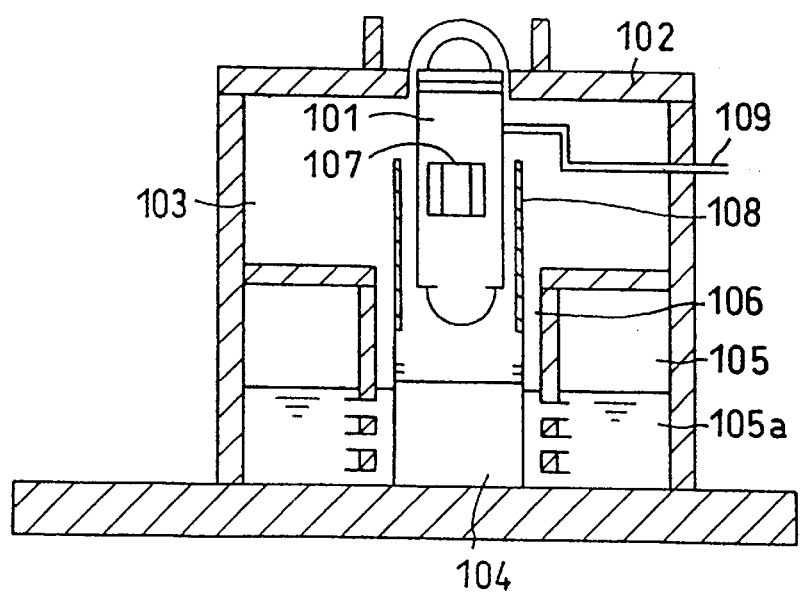
FIG. 31 is an outlined system cross section showing a conventional primary containment vessel (PCV).

The fourteenth embodiment of the present invention pertains to the shape of the carrier installed in the apparatus for removing the flammable gas of each of the above-mentioned embodiments and the carrier for the catalyst. FIG. 30 is an enlarged cross sectional view showing the surface vicinity of a catalyst carrier of the apparatus for removing the flammable gas of this embodiment.

On the surface of a catalyst carrier 74, a catalyst body 75 composed of a metal unit and an oxide 76 of the catalyst metal constituting the catalyst body 75 are dispersed and carried. As the catalyst metal unit constituting the catalyst body 75, platinum or palladium is appropriately used. Also, as the oxide 76 corresponding to each of these, $Pt_3O_4$ or PdO is appropriate.

With such a constitution, when the flammable gas is generated, the recombination reaction is carried out by the catalyst body 75, with the oxide 76 being reduced by hydrogen in the atmosphere of PCV, so that the unit of platinum or palladium, that is, the catalyst body 75, is formed. Therefore, even if the catalytic function of the catalyst body 75 carried from the beginning is lowered by poisoning, the oxide 76 is reduced, so that a new activated site is formed on the surface of the catalyst carrier 74. Thus, the decrease in the catalytic performance due to the poisoning of the apparatus for removing the flammable gas can be relaxed. Also, the hydrogen that is excessively generated is consumed by the reduction reaction, and a rapid increase in the concentration of hydrogen can be suppressed. Since the reduction reaction is exothermic, the temperature of the catalyst layer is raised and the catalyst can be activated.

Furthermore, since the iodine is a catalyst poison that reacts with hydrogen on the platinum catalyst at 300° C. or higher and forms HI, poisoning of the catalyst due to the iodine can be prevented.

Each apparatus for removing the flammable gas explained in each of the above-mentioned embodiments has been explained on the assumption that it is installed in the primary containment vessel (PCV), considering a a fracture phenomenon of the primary system pipe of the atomic reactor. However, needless to say, the present invention is not limited to such and can be arranged and applied in places where the generation of all flammable gases can be predicted.

According to the present invention, the concentration change of the flammable gas in the atmosphere in PCV is detected, and the separation of the catalyst from the gas atmosphere of the apparatus for removing the flammable gas is released. Thus, the decrease in activity of the catalyst due to the catalyst poison is prevented, and the atmosphere in PCV can be maintained at less than the flammability limit for a long time.

What is claimed is:

1. An apparatus for removing a flammable gas, by using catalytic recombination means, comprising:

a catalyst for reacting the flammable gas;

a first case that houses the catalyst with at least one opening;

at least one first lid mounted to the first case to cover the at least one opening under a first condition and to uncover the opening under a second condition, each first lid having a first lid attachment mechanism mounted to the at least one opening of the first case and arranged to set the at least one first lid to a closed state under the first condition, each at least one first lid having a first lid detachment mechanism arranged to set the at least one first lid to an open state by operating the lid attachment mechanism which includes a triggering portion responsive to an increase in a concentration of the flammable gas in an atmosphere in a vicinity outside the first case, wherein the concentration of the flammable gas in the first condition is less than the concentration of the flammable gas in the second condition.

2. The apparatus for removing the flammable gas of claim 1, wherein the first lid attachment mechanism comprises an adhesive part that adheres the first lid to the first case; wherein the adhesive part is at least partially in contact with the triggering portion, wherein the triggering portion is an oxidizing catalyst of hydrogen, and further wherein the adhesive part is weakened to open the at least one first lid when the temperature reaches above a melting point of the adhesive part as a result of heat generated by the oxidizing catalyst of hydrogen coming in contact with the flammable gas.

3. The apparatus for removing the flammable gas of claim 1, wherein the first lid attachment mechanism comprises a magnetic material arranged at least partially on the opening of the first case; wherein the first lid detachment mechanism comprises a vessel for housing a substance for generating a noncondesable gas in response to an increase in the temperature, which is installed in the vicinity of an inner wall surface of the first case; and wherein the first lid is opened by transferring the noncondesable gas, which is generated in response to the increase in the temperature of the substance for generating the noncondensable gas, into the first case.

4. The apparatus for removing the flammable gas of claim 1, wherein the first lid attachment mechanism comprises a magnetic material arranged at least partially on the opening of the first case; wherein the first lid detachment mechanism comprises a vessel for housing a substance for generating a noncondensable gas in response to an increase in the temperature, which is installed in the vicinity of an inner wall surface of the first case; and wherein the first lid is opened by transferring the noncondensable gas, which is generated in response to an increase in the temperature of the substance for generating the noncondensable gas, into the first case; and further wherein the first lid detachment mechanism comprises a substance selected from the group consisting of a hydrogen occlusion alloy and an oxidizing hydrogen catalyst, arranged in a vicinity of the vessel for housing the substance for generating the noncondensable gas or the outer wall of the first case.

5. The apparatus for removing the flammable gas of claim 1, wherein the first lid attachment mechanism comprises an adhesive part that adheres to first lid and the first and is melted as soon as the temperature reaches above a predetermined level; wherein the first lid detachment mechanism comprises:
  a heating element installed at least partially at the first lid in contact with the adhesive part;
  a flammable gas sensor installed outside of the first case that sends a current in response to an increase in the concentration in the flammable gas; and
  an electroconductive substance for connecting the heated element and the flammable gas sensor.

6. The apparatus for removing the flammable gas of claim 1, wherein the first lid attachment mechanism comprises a lid support means installed in connection with the first lid and supports the first lid from the inside of the first case; and wherein the first lid detachment mechanism comprises:
  a flammable gas sensor installed outside of the first case that sends a current in response to an increase in the concentration of the flammable gas;
  a vessel for housing a substance for generating a noncondensable gas in response to an increase in temperature, which is installed inside the first case;
  a heating element installed in contact with the vessel for housing the substance for generating the noncondensable gas;
  an electroconductive substance for connecting the heating element and the flammable gas sensor; and a pressure driving means for driving the first lid support means in response to an increase in the internal pressure of the vessel for housing the substance for generating the noncondensable gas, wherein the pressure drive means is driven by the generation of the noncondensable gas so that the first lid attachment mechanism is operated, thereby opening the first lid.

7. The apparatus for removing the flammable gas of claim 1, wherein the first lid attachment mechanism comprises a wire whose one end is connected to a side surface of the fist case and the other end is connected to the first lid, and which closes the first lid by a tension level sufficient to maintain the first lid in the closed state; and wherein the first lid detachment mechanism comprises a wire cutter installed halfway at the wire that cuts the wire in response to an increase in the concentration of the flammable gas.

8. The apparatus for removing the flammable gas of claim 1, wherein the first lid attachment mechanism comprises a wire whose one end is connected to the side surface of the first case and the other end is connected to the first lid, and which closes the first lid by a tension level sufficient to maintain the first lid in the closed state; and wherein the first lid detachment mechanism comprises:
  a wire cutter installed halfway at the wire that cuts the wire in response to an increase in the concentration of the flammable gas;
  an auxiliary wire installed in a branched state of the wire cutter; and
  a dashpot for supporting one end of the auxiliary wire.

9. The apparatus for removing the flammable gas of claim 1, wherein the first lid attachment mechanism comprises a wire whose one end is connected to a side surface of the first case and the other end is connected to the first lid, and which closes the first lid by a tension level under the first conditions; and wherein the first lid detachment mechanism comprises:
  a wire cutting means installed halfway at the wire that cuts the wire in response to an increase in the concentration of the flammable gas; and further wherein
  the wire cutting means comprises:
    a heating element which is installed at an expected cut part of the wire and is melted as soon as the temperature reaches reaches above a predetermined level; and
    a heater for increasing the temperature of the heating element in response to the increase in the concentration of the flammable gas.

10. The apparatus for removing the flammable gas of claim 1, wherein the first lid attachment mechanism comprises a wire installed on a side surface of the first case, whose one end is connected to the side surface of the first case and the other end is connected to the first lid, and which closes the first lid by a tension level sufficient to maintain the first lid being closed under the first condition; and wherein the first lid detachment mechanism comprises:
  a wire cutting means installed halfway at the wire that cuts the wire in response to an increase in the concentration of the flammable gas; and wherein the wire cutting means comprises:
    a heating element which is installed at an expected cut part of the wire and is melted as soon as the temperature reaches above a predetermined level; and
    a heating means for increasing the temperature of the heating element in response to an increase in the concentration of the flammable gas, which comprises:
      a power source;
      an electroconductive circuit composed of an electroconductive substance for connecting the power source and the heating element; and
      a circuit switch, installed in the middle of the electroconductive circuit, is equipped with a vessel for housing a hydrogen occlusion alloy, and arranged to set to an ON state as a volume of the hydrogen occlusion alloy increases in response to an increase in the concentration of the hydrogen gas.

11. The apparatus for removing the flammable gas of claim 1, further comprising a second case that houses the catalyst with at least one opening, said second case is set outside of and contiguous to the first case and an atmosphere in said second case is set away from the atmosphere in the first case; and wherein the first lid detachment mechanism is arranged to set the first lid to an open state by operating the first lid attachment mechanism in response to an increase in the concentration of the flammable gas in an atmosphere in the second case.

12. The apparatus for removing the flammable gas of claim 1, further comprising:

a second case that houses the catalyst with at least one opening and is contiguous to the first case;

a shape-memory alloy being carried into the second case; and a connection means for connecting the first lid attachment mechanism and the first lid detachment mechanism; and wherein the first lid detachment mechanism is arranged to set to the first lid to an open state by operating the first lid attachment mechanism in response to an increase in the concentration of the atmosphere in the second case; and the connection means is operated by changing the shape of the shape-memory alloy in response to the temperature in the second case so that the first lid attachment mechanism is operated to set the first lid to be opened.

13. The apparatus for removing the flammable gas of claim 1, further comprising:

a second case that houses the catalyst with at least one opening and is contiguous to the first case;

a third case that houses the catalyst with at least one opening;

at least one second lid mounted to the third case to cover the opening in the first condition and to uncover the opening in the second condition; wherein each second lid having a second lid attachment mechanism and a second lid detachment mechanism;

a shape-memory alloy being carried into the first and second cases;

a first connection means for connecting the first lid attachment mechanism and the first lid detachment mechanism;

a second connection means for connecting the second lid attachment mechanism and the second lid detachment mechanism; and wherein the first lid detachment mechanism is arranged to set the first lid to an open state by operating the first lid attachment mechanism in response to an increase in the concentration of the atmosphere in the second case; and wherein the second lid detachment mechanism is arranged to set the second lid to an open state by operating the second lid attachment mechanism in response to an increase in the concentration of the atmosphere in the first case; and wherein the first and second connection means are operated first by changing the shape of the shape-memory alloy in the second case in response to the temperature in the second case so that the first lid attachment mechanism is operated to set the first lid to be opened, and is operated second by changing the shape of the shape-memory alloy in the first case in response to the temperature in the first case so that the second lid attachment mechanism is operated to set the second lid to be opened.

14. The apparatus for removing the flammable gas of claim 1, further comprising:

a second case that houses the catalyst with at least one opening and is contiguous to the first case; and wherein the first lid detachment mechanism is arranged to set the first lid to an open state by operating the first lid attachment mechanism in response to an increase in the concentration of the atmosphere in the second case, and further comprising;

a vessel for housing a substance for generating a noncondensable gas in response to an increase in the temperature which is installed in the second case; and a pressure driving means which opens the first lid of the first case by operating the first lid attachment mechanism in response to an increase in the internal pressure of the vessel for housing the substance for generating the noncondensable gas.

15. The apparatus for removing the flammable gas of claim 1, further comprising:

a second case that houses the catalyst with at least one opening and is contiguous to the first case; and wherein the first lid attachment mechanism comprises an adhesive part that adheres the first lid and the first case and is melted as soon as the temperature reaches a predetermined level; and wherein the lid detachment mechanism comprises:

a heating element installed at least partially at the first lid in contact with the adhesive part;

a flammable gas sensor installed in the second case and sends a current in response to an increase in the concentration of the flammable gas; and an electroconductive substance for connecting the heating element and the flammable gas sensor.

16. The apparatus for removing the flammable gas of claim 1, wherein the first lid attachment mechanism comprises an adhensive part that adheres the first lid and the first case and is melted as soon as the temperature reaches above a predetermined level; and wherein the first lid detachment mechanism comprises:

a heating element installed at least partially at the first lid in contact with the adhesive part;

a flammable gas sensor installed outside of the first case that sends a current in response to an increase in the concentration in the flammable gas;

an electroconductive substance for connecting the heating element and the flammable gas sensor;

a gas sensor housing vessel for housing the flammable gas sensor; and a vessel operation means for operating the gas sensor housing vessel to be moved in response to an increase in the concentration of the flammable gas surrounding the gas sensor housing vessel.

17. The apparatus for removing the flammable gas of claim 1, further comprising a heating element selected from the group consisting calcium oxide, sodium oxide, potassium oxide, magnesium oxide, rubidium oxide, strontium oxide, and hydrogen occlusion alloy, which is arranged in contact with the catalyst.

18. The apparatus for removing the flammable gas of claim 1, wherein the catalyst comprises:

at least one substance selected from the group consisting of platinum, ruthenium, and palladium; and at least one substance selected from the group consisting of silver, cobalt, manganese, copper and their oxides.

19. The apparatus for removing the flammable gas of claim 1, wherein the lid detachment mechanism comprises a vessel for housing a substance for generating a noncondensable gas installed in the vicinity of an inner wall surface of the first case, with the substance for generating the noncondensable gas comprising at least one substance selected from the group consisting of calcium-containing hydrocarbon, sodium-containing hydrocarbon, thallium (I) carbonate, iron (II) carbonate, and a metal hydride; and wherein the first lid is opened by transferring the noncondensable gas, which is generated in response to an increase in the temperature of the substance for generating the noncondensable gas, into the first case.

20. The apparatus for removing the flammable gas of claim 1, wherein the catalyst comprises at least one metallic substance unit and its oxide selected from the group consisting of platinum, ruthenium, and palladium.

21. The apparatus for removing the flammable gas of claim 1, further comprising:

a carrier for the catalyst installed in the first case, which is a porous columnar body, comprising at least one substance selected from the group consisting of aluminum oxide, silicon oxide, copper, and bronze, whose fine-hole diameter is arranged to set in the range between 1 nm and 1000 nm, with a passage for circulating gas being installed as a cavity in the columnar body.

22. The apparatus for removing the flammable gas of claim 21, wherein the columnar body comprises at least one substance selected from the group consisting of platinum, ruthenium, and palladium as the catalyst at a ratio in the range between 1 wt % and 10 wt %.

23. The apparatus for removing the flammable gas of claim 21, further comprising a catalytic support selected from the group consisting of active carbon and iron, whose specific surface area is over 500 m$^2$/g, installed by connecting with a columnar body constituting the catalyst, which is molded in a columnar shape in which a passage for gas circulation is installed as a cavity.

24. The apparatus for removing the flammable gas of claim 21, wherein the catalyst comprises at least one metallic substance unit and its oxide selected from the group consisting of platinum, ruthenium, and palladium.

* * * * *